United States Patent
Bragg

(10) Patent No.: US 8,781,284 B2
(45) Date of Patent: Jul. 15, 2014

(54) LOW PROFILE COPPER AND FIBER OPTIC CASSETTES

(75) Inventor: Charles R. Bragg, Bothell, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 106 days.

(21) Appl. No.: 13/564,495

(22) Filed: Aug. 1, 2012

(65) Prior Publication Data

US 2014/0037259 A1 Feb. 6, 2014

(51) Int. Cl.
*G02B 6/00* (2006.01)
*H01R 13/62* (2006.01)
*H02B 1/015* (2006.01)

(52) U.S. Cl.
USPC ............ 385/135; 385/147; 361/627; 439/357

(58) Field of Classification Search
USPC ......... 385/76–78, 88–92, 133, 134, 137, 147; 361/627, 633; 439/76.1, 357, 372, 484, 439/923
See application file for complete search history.

(56) References Cited

U.S. PATENT DOCUMENTS

| | | | | |
|---|---|---|---|---|
| 4,692,809 A | * | 9/1987 | Beining et al. | 348/712 |
| 4,944,568 A | | 7/1990 | Danbach et al. | |
| 5,004,866 A | * | 4/1991 | Cooke et al. | 174/366 |
| 5,312,263 A | * | 5/1994 | Zapalski et al. | 439/181 |
| 5,713,752 A | * | 2/1998 | Leong et al. | 439/358 |
| 5,781,366 A | * | 7/1998 | Matsuoka | 360/85 |
| 6,485,322 B1 | * | 11/2002 | Branch et al. | 439/357 |
| 6,607,308 B2 | | 8/2003 | Dair et al. | |
| 6,626,697 B1 | | 9/2003 | Martin et al. | |
| 6,796,715 B2 | * | 9/2004 | Chiu et al. | 385/53 |
| 7,347,633 B2 | * | 3/2008 | Minota | 385/92 |
| 7,689,089 B2 | | 3/2010 | Wagner et al. | |
| 7,841,779 B1 | * | 11/2010 | Bianchini et al. | 385/88 |
| 2005/0208822 A1 | * | 9/2005 | Ishigami et al. | 439/372 |
| 2006/0103140 A1 | * | 5/2006 | Bella et al. | 292/95 |
| 2011/0177710 A1 | | 7/2011 | Tobey | |

OTHER PUBLICATIONS

International Search Report PCT/US2012/049554 dated Feb. 28, 2013.

* cited by examiner

*Primary Examiner* — Akm Enayet Ullah
(74) *Attorney, Agent, or Firm* — Davis Wright Tremaine LLP; George C. Rondeau, Jr.; Heather M. Colburn

(57) ABSTRACT

A multi-port or multi-outlet cassette that may be configured as a low profile, high-density cassette. Selected embodiments include a bezel member having a projection positioned between each adjacent pair of outlets to help reduce crosstalk. A releasable latch mechanism may be included that is configured to selectively latch and unlatch the cassette to a patch panel. Embodiments configured for use with fiber optic cables may include a movable connector member. A cable connector may be mounted to the movable connector member to move therewith as a unit. Moving the movable connector member determines an angle of the cable connector relative to the panel. Angles may be selected to reduce stress on a cable connected to the cable connector. In particular, it may be desirable to position the cable connector such that it is orthogonal to the panel.

20 Claims, 47 Drawing Sheets

LOW PROFILE COPPER AND FIBER OPTIC CASSETTES

BACKGROUND OF THE INVENTION

1. Field of the Invention

The present invention is directed generally to multi-port or multi-outlet cassettes.

2. Description of the Related Art

Multiple communication ports or outlets may be housed inside a cassette that is mountable in a patch panel. Unfortunately, currently available cassettes suffer from a number of problems. For example, prior art cassettes lack optimal shielding of closely situated electrical connectors, sufficient connector density to support high connectivity demands, cable management and bend radius control as connector density increases, efficient patch panel latching mechanisms for multi-connector assemblies, as well as the ability to combine or mix conductive media (e.g., copper wires and optical fibers) in a single patch panel.

Therefore, a need exists for a low profile cassette configured to provide efficient high-density connectivity. In particular, a need exists for a cassette configured to house a plurality of one type of connector (e.g., copper wire connectors or optical fiber connectors) that is mountable in the same patch panel as one or more other cassettes configured to house the same or different types of connectors. A need also exists for cassettes configured to provide effective cable management and/or bend radius control. A cassette configured to provide improved and/or optimal shielding to reduce crosstalk between and among electrical connectors in close proximity within the cassette is also desirable. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1A:
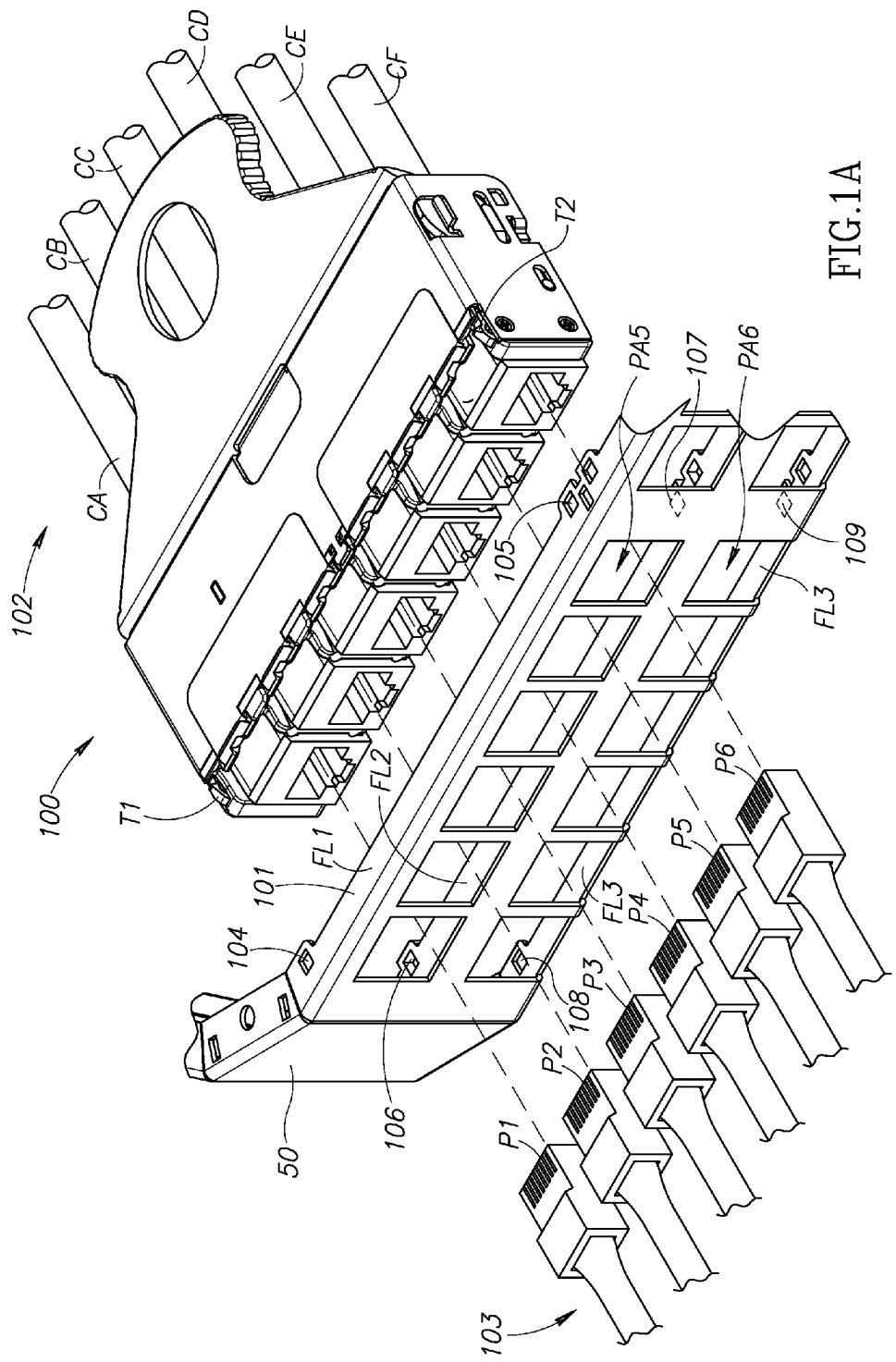
FIG. 1A is a partially exploded perspective view of a cassette connected to a plurality of cables, a patch panel, and a plurality of plugs receivable into outlet assemblies of the cassette.

FIG. 1A is perspective view of a cassette 100 configured for use with an angled patch panel 101 (see FIG. 1B), a plurality of cables 102, and one or more conventional communication plugs 103. The cassette 100 may be configured to be mounted inside the angled patch panel 101, a generally planar patch panel (not shown), and the like. The cassette 100 may be configured to be mounted inside a patch panel mountable within one rack unit of space, a patch panel mountable within multiple (e.g., four) rack units, and the like. Referring to FIGS. 1D and 1E and by way of a non-limiting example, the cassette 100 may be mounted within an assembly 112 of four patch panels 101A, 101B, 101C, and 101D each configured to be mounted within one rack unit. The assembly 112 may be characterized as being a four rack unit ("4RU") patch panel (referred to hereafter as "the 4RU patch panel 112").

Returning to FIG. 1A, for ease of illustration, the cassette 100 and alternate embodiments thereof are described as having front, top (or upper), bottom (or lower or underside), and rear portions. However, as is apparent to those of ordinary skill in the art, the cassette 100 and alternate embodiments thereof are not limited to use in a particular orientation. Therefore, terms such as front, top (or upper), bottom (or lower or underside), and rear have been assigned arbitrarily and are not intended to be limiting.

Figure 1B:
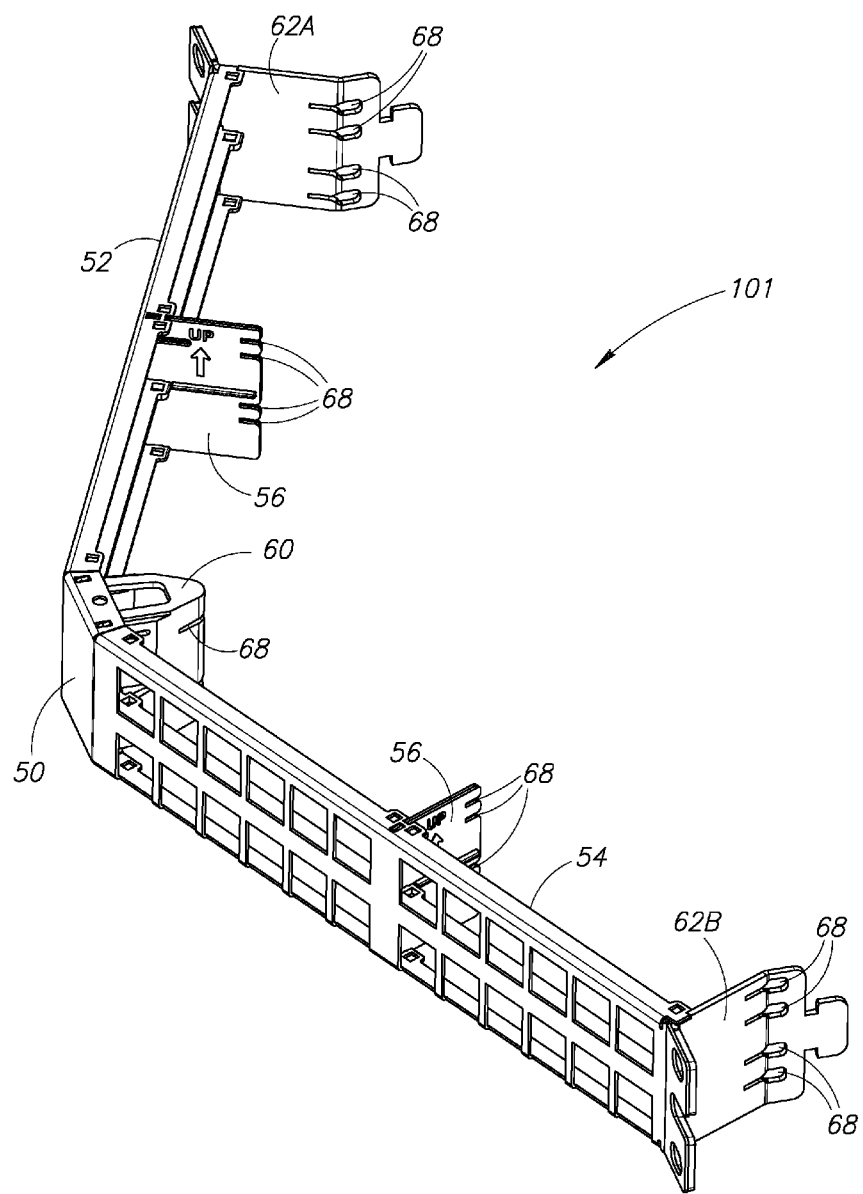
FIG. 1B is a perspective view of the front of the patch panel of FIG. 1A omitting the cassette.

Turning to FIG. 1B, the patch panel 101 may be configured to be compatible with all of the embodiments of the cassette disclosed herein. The patch panel 101 includes a center portion 50 flanked by a first angled side portion 52 and a second angled side portion 54. Each of the first and second angled side portions 52 and 54 is divided into two sections by an inwardly extending center support 56. The first angled side portion 52 is attached to a first support 60 and a first support bracket 62A. The second angled side portion 54 is attached to the first support 60 and a second support bracket 62B. In the embodiment illustrated, the first and second angled side portions 52 and 54 share the first support 60. But, this is not a requirement. Each of the center support 56, the first support 60, the first support bracket 62A, and the second support bracket 62B includes a plurality of spaced apart slots 68.

Figure 30:
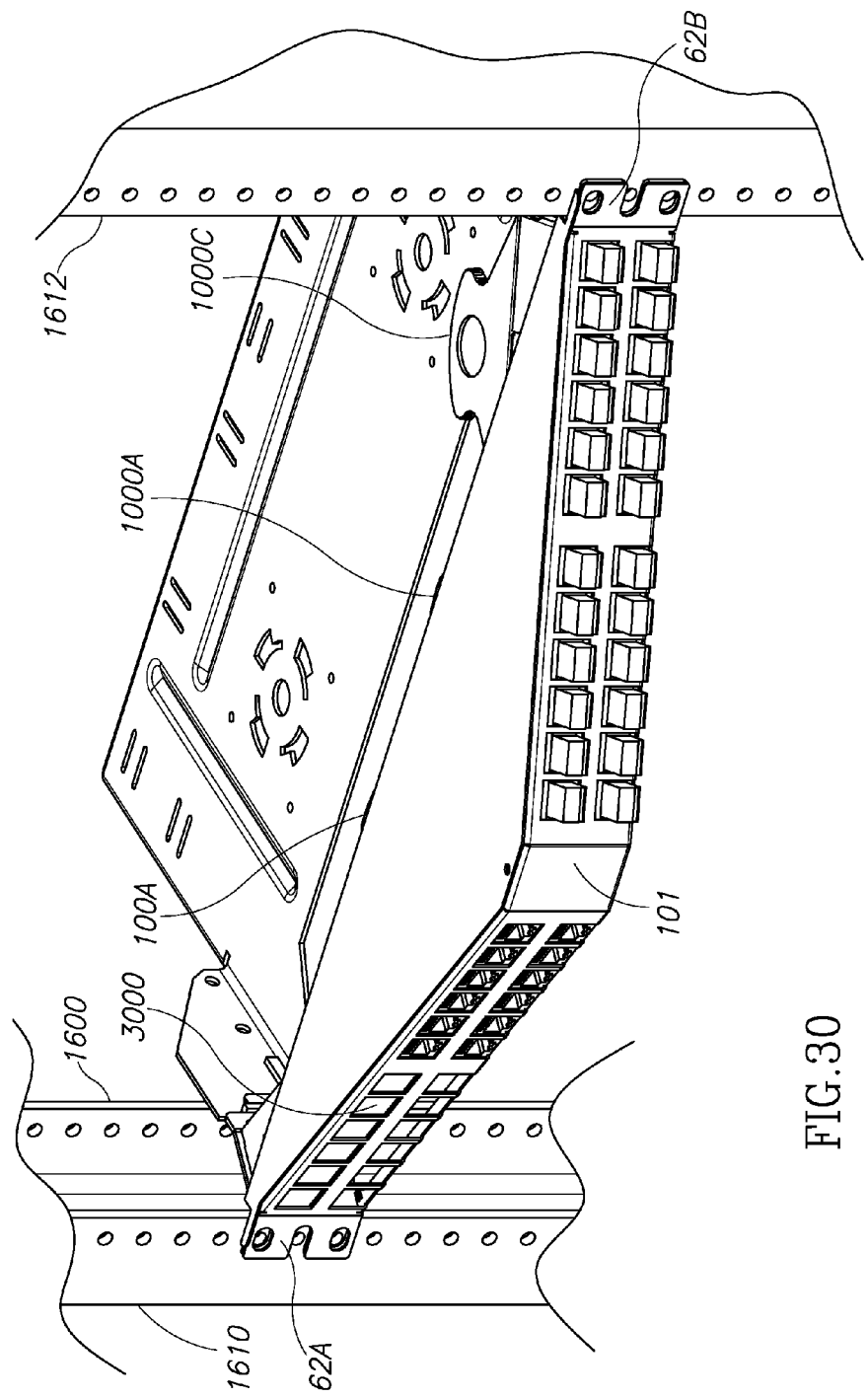
FIG. 30 is a perspective view of the assembly of FIG. 29 mounted in a rack.

The first and second support brackets 62A and 62B are configured to be mounted to a rack 1600 (see FIG. 30).

Figure 42:
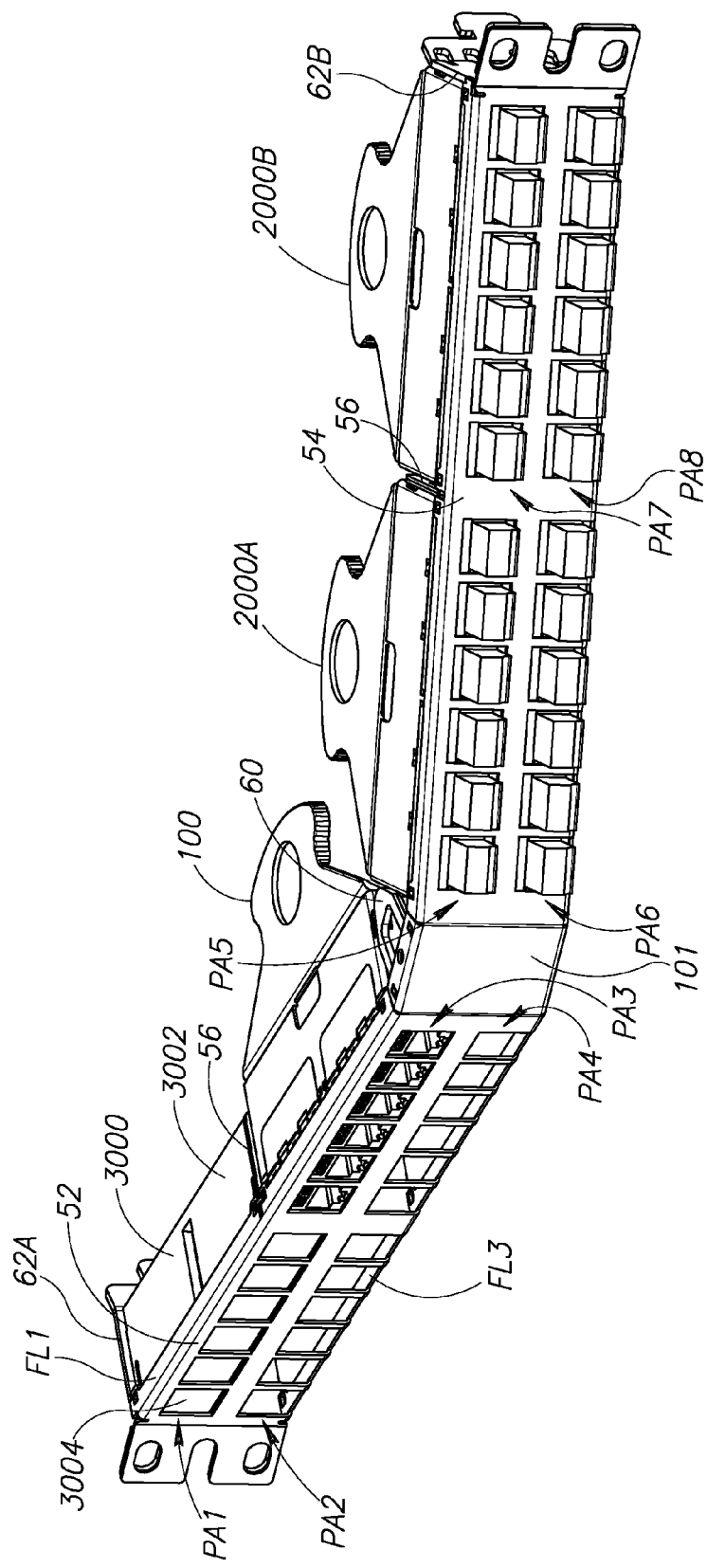
FIG. 42 is a perspective view of a frontwardly facing portion of an assembly including the cassette of FIG. 1A, embodiments of the cassette of FIG. 21, the cassette of FIG. 31, and the blank member of FIG. 40 mounted in the patch panel of FIG. 1B.
Figure 43:
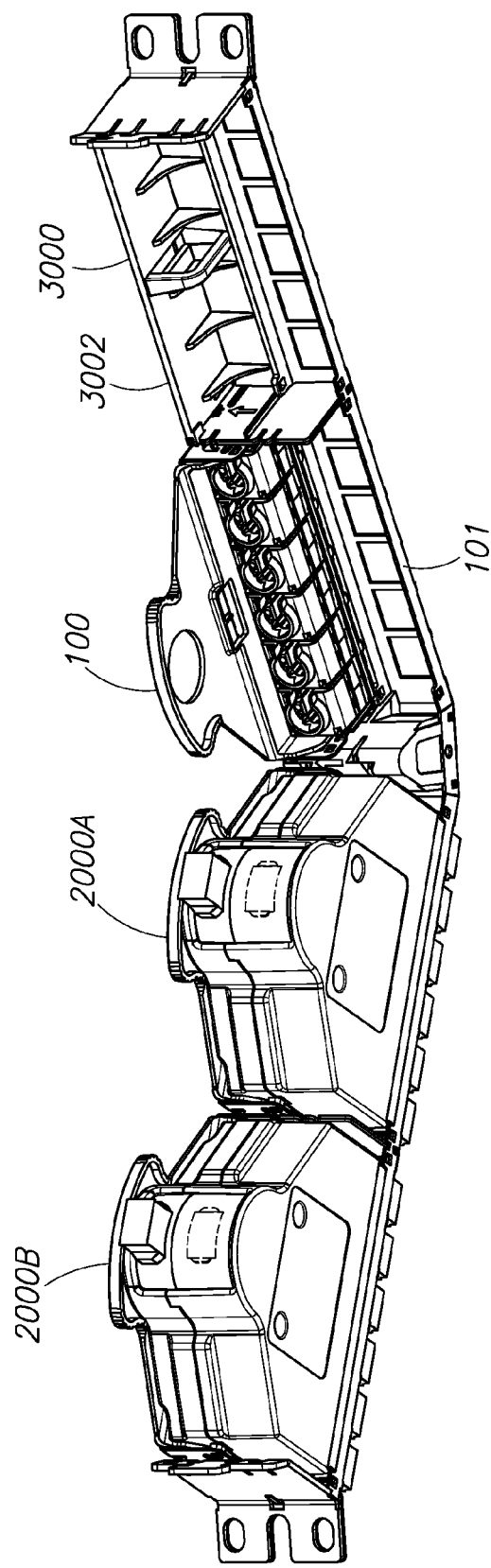
FIG. 43 is a perspective view of a rearwardly facing portion of the assembly of FIG. 42.

As may best be viewed in FIG. 42, the patch panel 101 may be characterized as including patching areas PA1-PA8. In the embodiment illustrated, the patch panel 101 includes eight patching areas. Each of the eight patching areas PA1-PA8 is configured to receive the cassette 100. Thus, up to eight cassettes like the cassette 100 may be mounted to the embodiment of the patch panel 101 illustrated.

The first angled side portion 52 includes four patching areas PA1-PA4 arranged in two vertically adjacent pairs (e.g., a first vertically adjacent pair including the patching areas PA1 and PA2, and a second vertically adjacent pair including the patching areas PA3 and PA4). The second vertically adjacent pair of patching areas PA3 and PA4 is positioned between the first support 60 and the center support 56, and the first vertically adjacent pair of patching areas PA1 and PA2 is positioned between the center support 56 and the first support bracket 62A.

The second angled side portion 54 includes four patching areas PA5-PA8 arranged in two vertically adjacent pairs (e.g., a first vertically adjacent pair including the patching areas PA5 and PA6, and a second vertically adjacent pair including the patching areas PA7 and PA8). In the second angled side portion 54, the first vertically adjacent pair of patching areas PA5 and PA6 is positioned between the first support 60 and the center support 56, and the second vertically adjacent pair of patching areas PA7 and PA8 is positioned between the center support 56 and the second support bracket 62B.

Figure 1C:
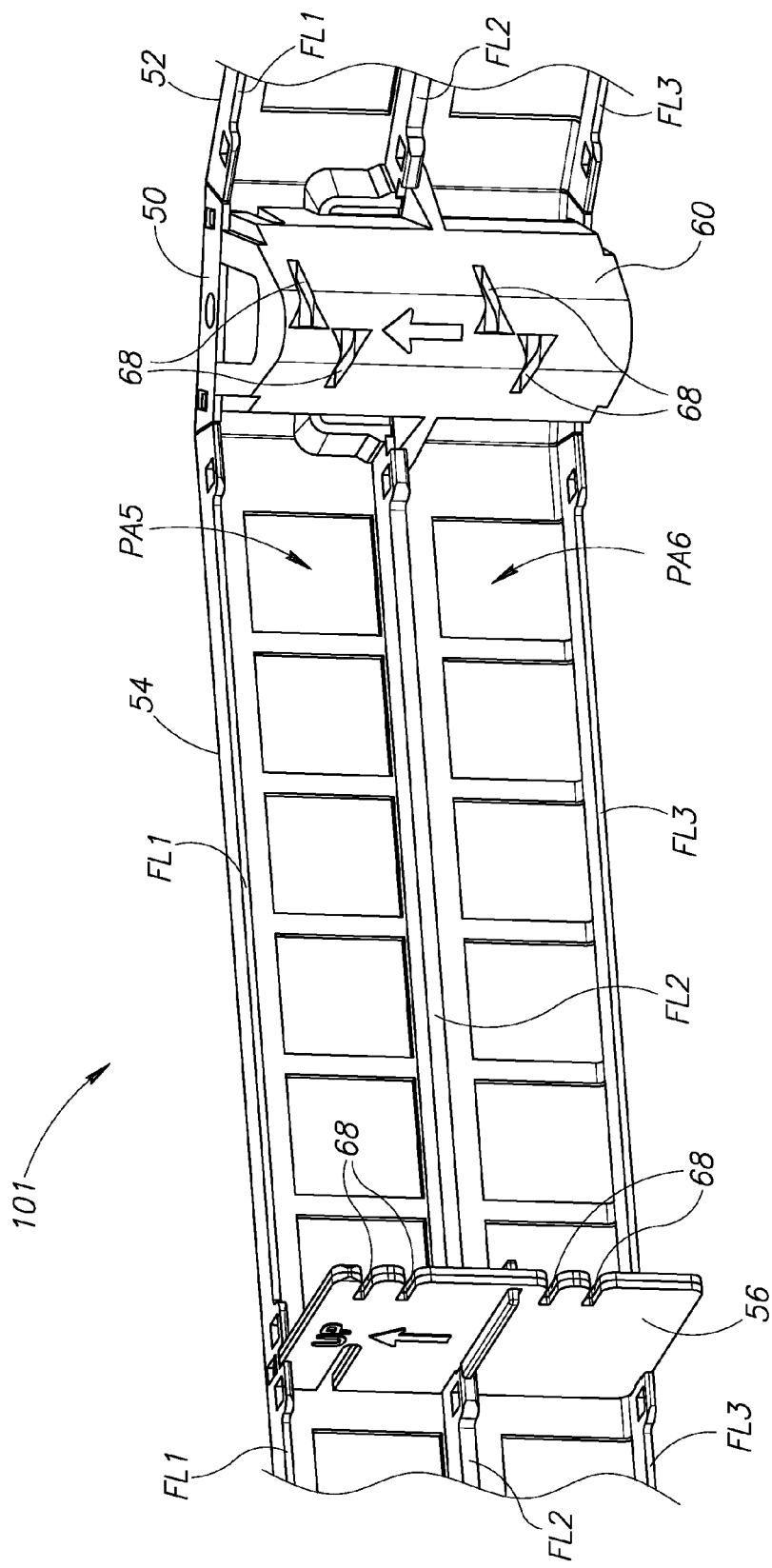
FIG. 1C is a perspective view of a portion of the back of the patch panel of FIG. 1A omitting the cassette.
Figure 1D:
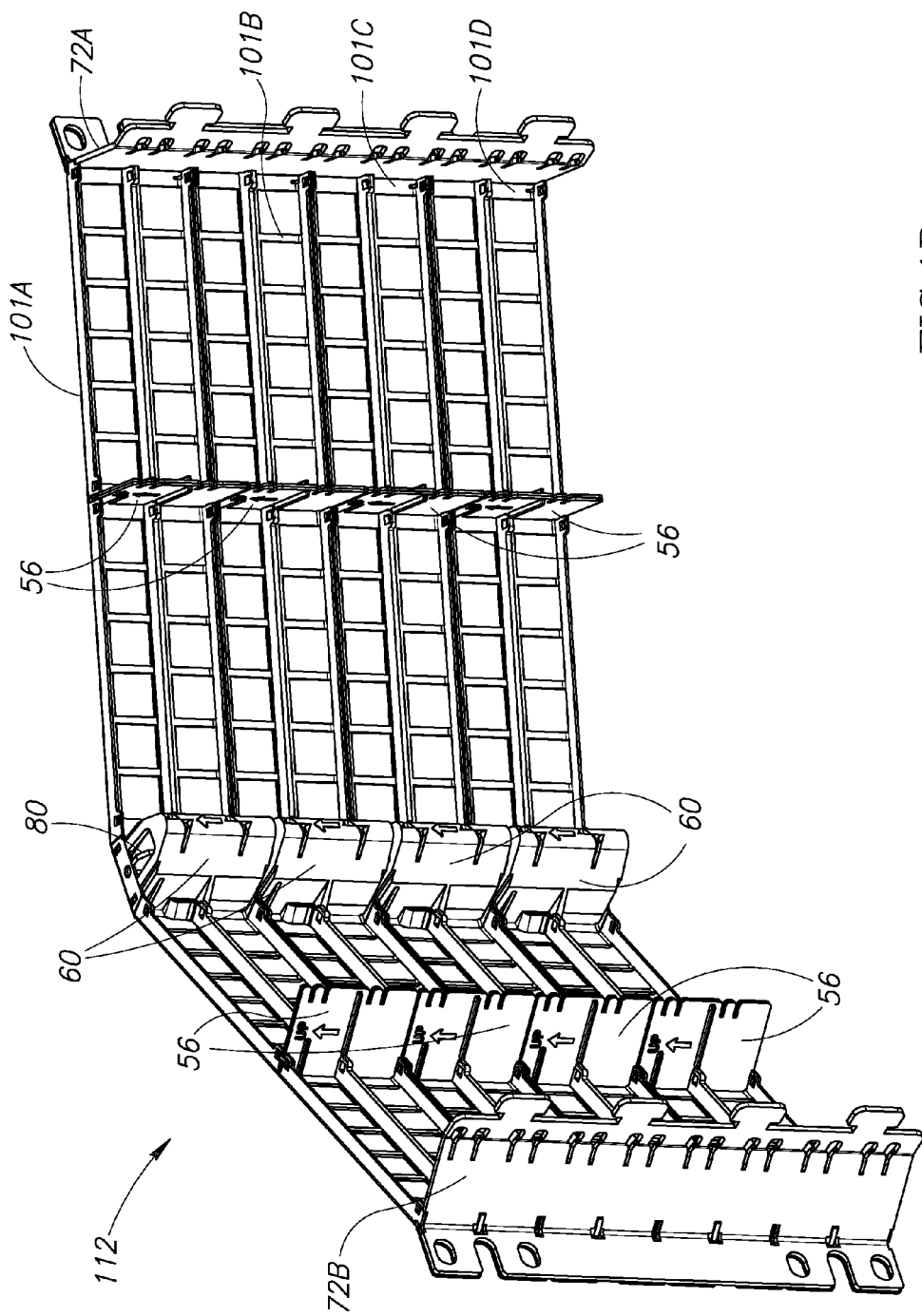
FIG. 1D is a perspective view of the back of an assembly of four patch panels configured to fit within four rack units ("4RU").
Figure 1E:
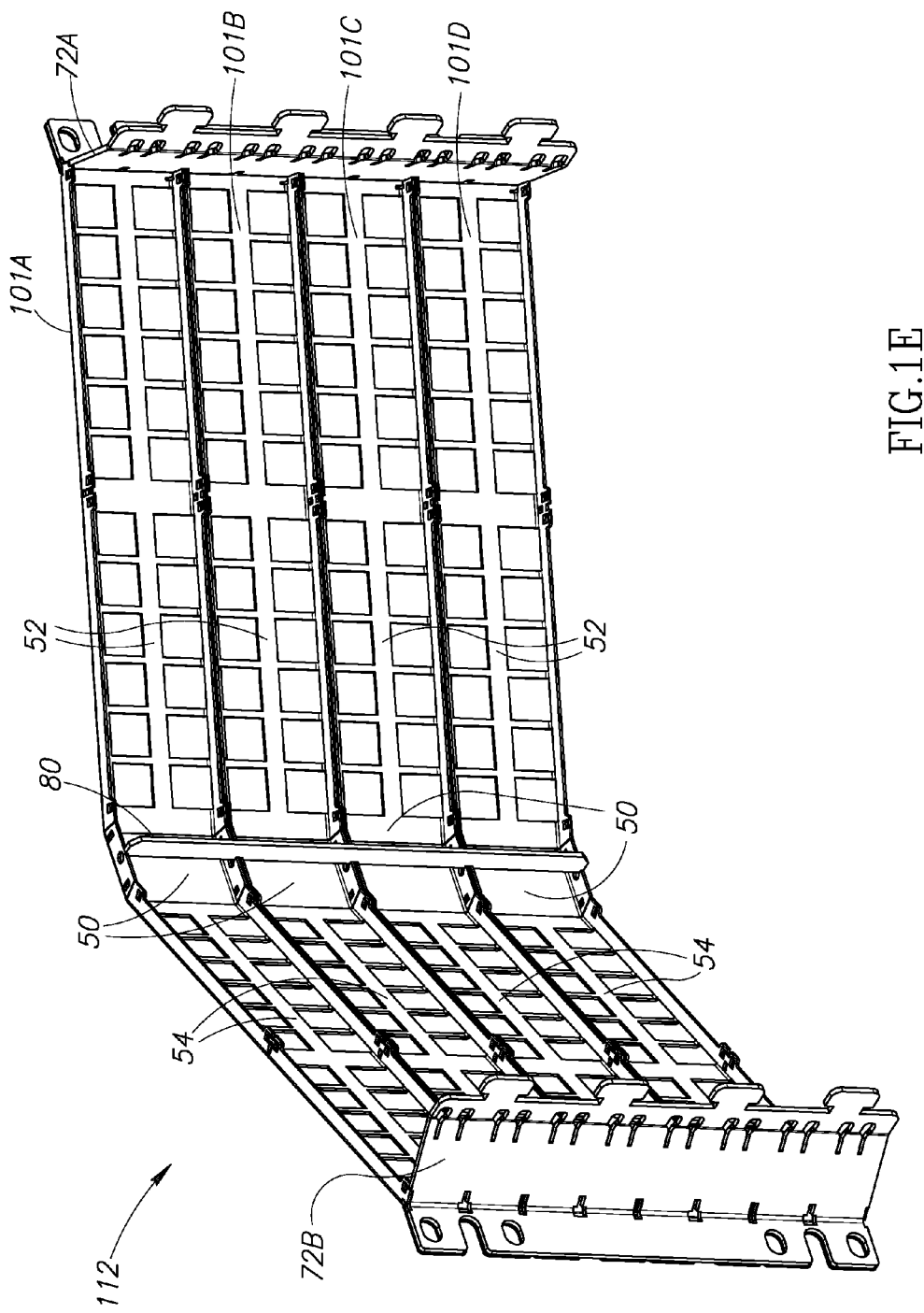
FIG. 1E is a perspective view of the back of the assembly of FIG. 1D omitting first and center supports.

FIG. 1C depicts a portion of the patch panel 101 including the first vertically adjacent pair of patching areas PA5 and PA6 of the second angled side portion 54 from the back. Each of the vertically adjacent pairs of patching areas PA1-PA8 includes an upper flange "FL1," a middle flange "FL2," and a lower flange "FL3."

Figure 21:
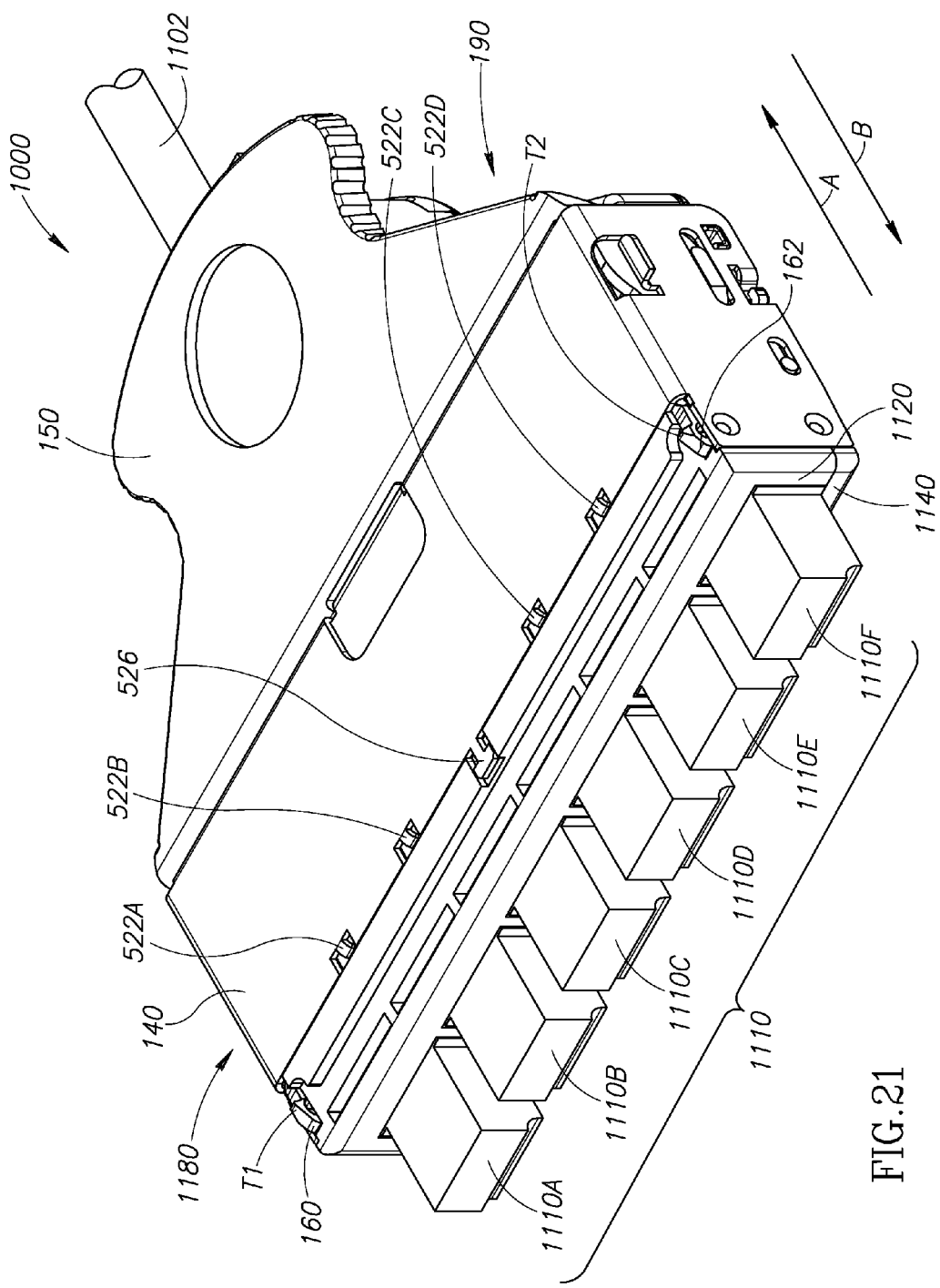
FIG. 21 is a perspective view of an upper portion of a first alternate embodiment of the cassette including a plurality of fiber optic connector assemblies and configured for use with fiber optic cables.
Figure 22:
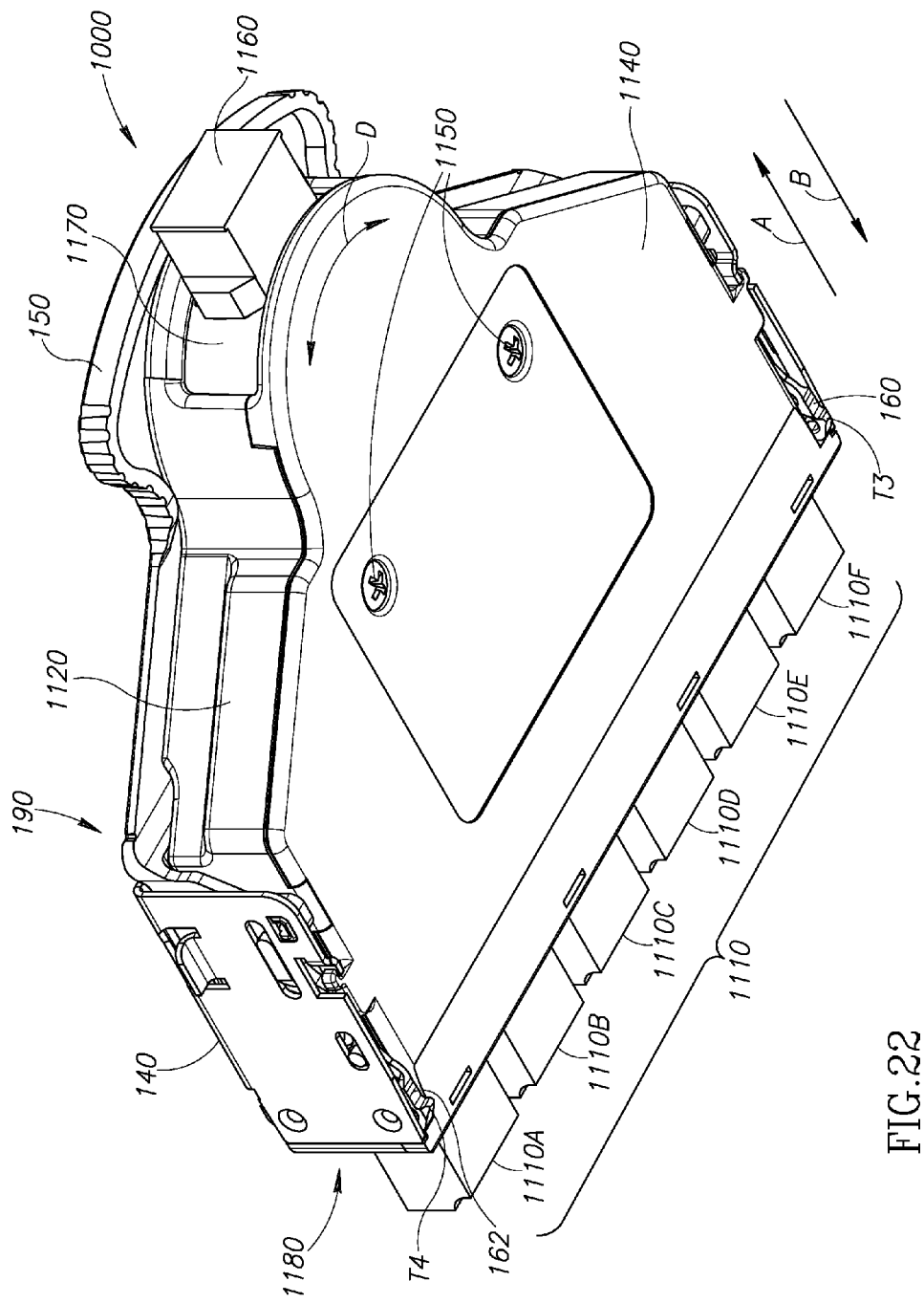
FIG. 22 is a perspective view of a lower portion of the cassette of FIG. 21.

Referring to FIGS. 1D and 1E, the patch panels 101A, 101B, 101C, and 101D of the 4RU patch panel 112 may each be substantially similar to the patch panel 101. However, the first and second support brackets 62A and 62B may be omitted from each of the patch panels 101A, 101B, 101C, and 101D. Instead, a first support bracket 72A may extend between and connects the first angled side portions 52 of the patch panels 101A, 101B, 101C, and 101D together. Similarly, a second support bracket 72B may extend between and connects the second angled side portions 54 of the patch panels 101A, 101B, 101C, and 101D together. Like the first and second support brackets 62A and 62B, the first and second support brackets 72A and 72B may be used to connect the patch panels 101A, 101B, 101C, and 101D to the rack 1600 (see FIG. 30). Turning to FIG. 1E, the 4RU patch panel 112 may also include an elongated center support 80 that extends between and connects the center portions 50 of the patch panels 101A, 101B, 101C, and 101D together FIGS. 21 and 22 illustrate a cassette 1000 for use with fiber optic cables as opposed to cables having metal wires (e.g., copper wire). The cassette 1000 is receivable inside one of the patching areas PA1-PA8. Thus, up to eight cassettes like the cassette 1000 may be mounted to the patch panel 101.

Figure 31:
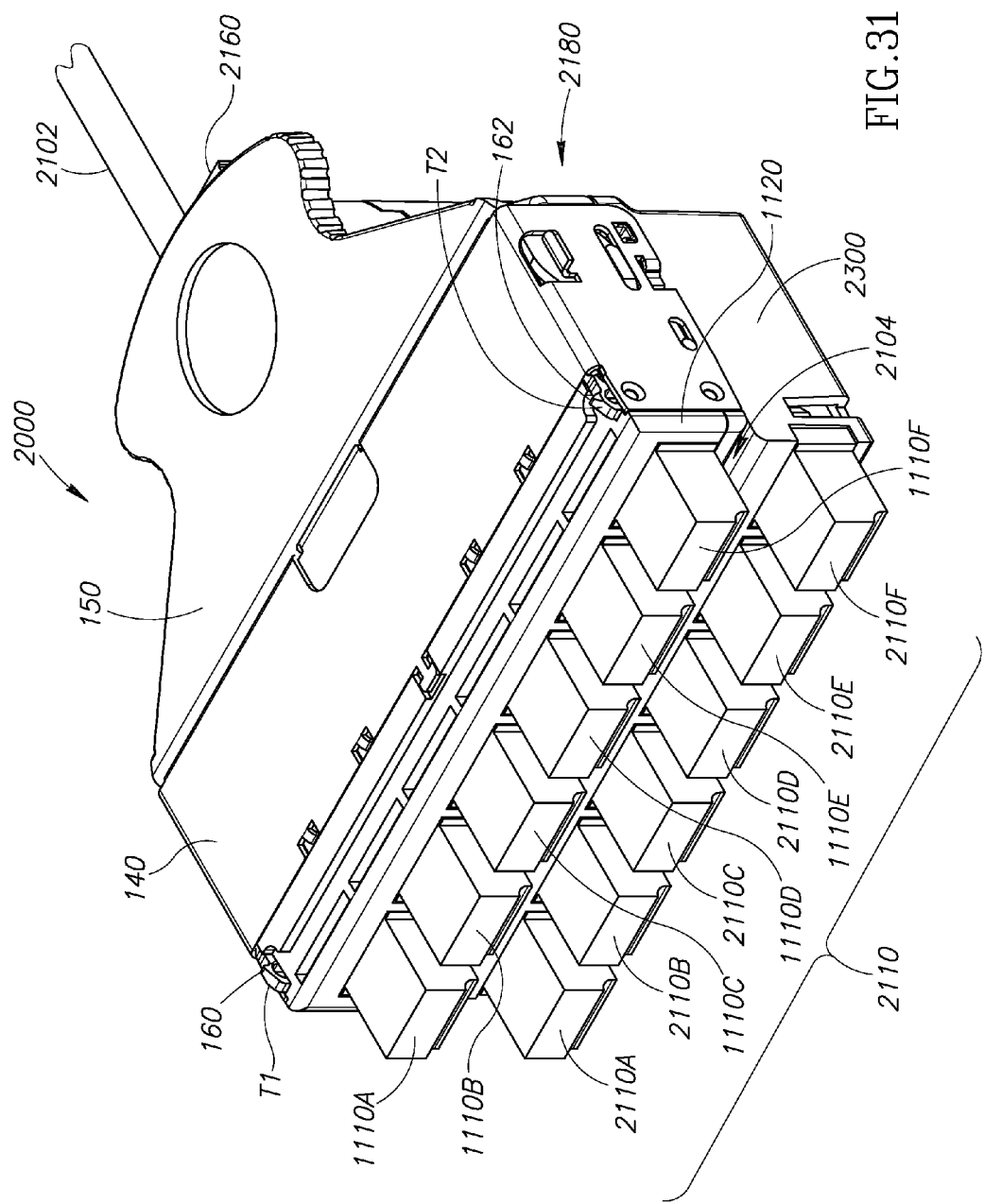
FIG. 31 is a perspective view of an upper portion of a second alternate embodiment of the cassette including a plurality of fiber optic connector assemblies and configured for use with fiber optic cables.
Figure 32:
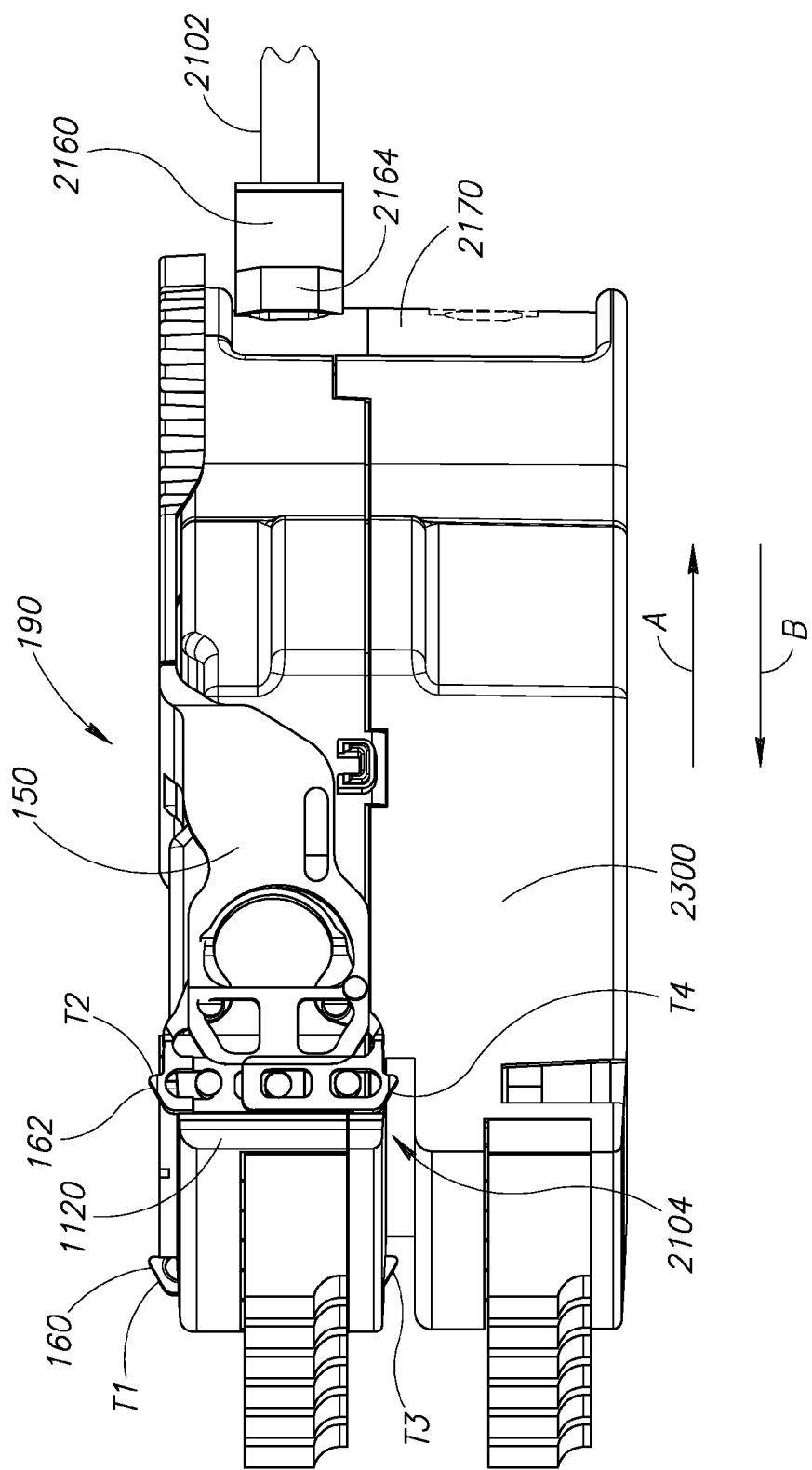
FIG. 32 is a perspective view of a side portion of the cassette of FIG. 31 omitting the cover member.

FIGS. 31 and 32 illustrate a cassette 2000. The cassette 2000 is receivable inside a vertically adjacent pair of patching areas (e.g., the vertically adjacent pair of patching areas PA5 and PA6). Thus, up to four cassettes like the cassette 2000 may be mounted to the patch panel 101.

Turning to FIG. 1A, for each vertically adjacent pair of patching areas PA1-PA8, the upper flange "FL1" includes a first aperture 104 spaced apart from a second aperture 105. Similarly, the middle flange "FL2" includes a first aperture 106 spaced apart from a second aperture 107 and the lower flange "FL3" includes a first aperture 108 spaced apart from a second aperture 109.

Figure 2:
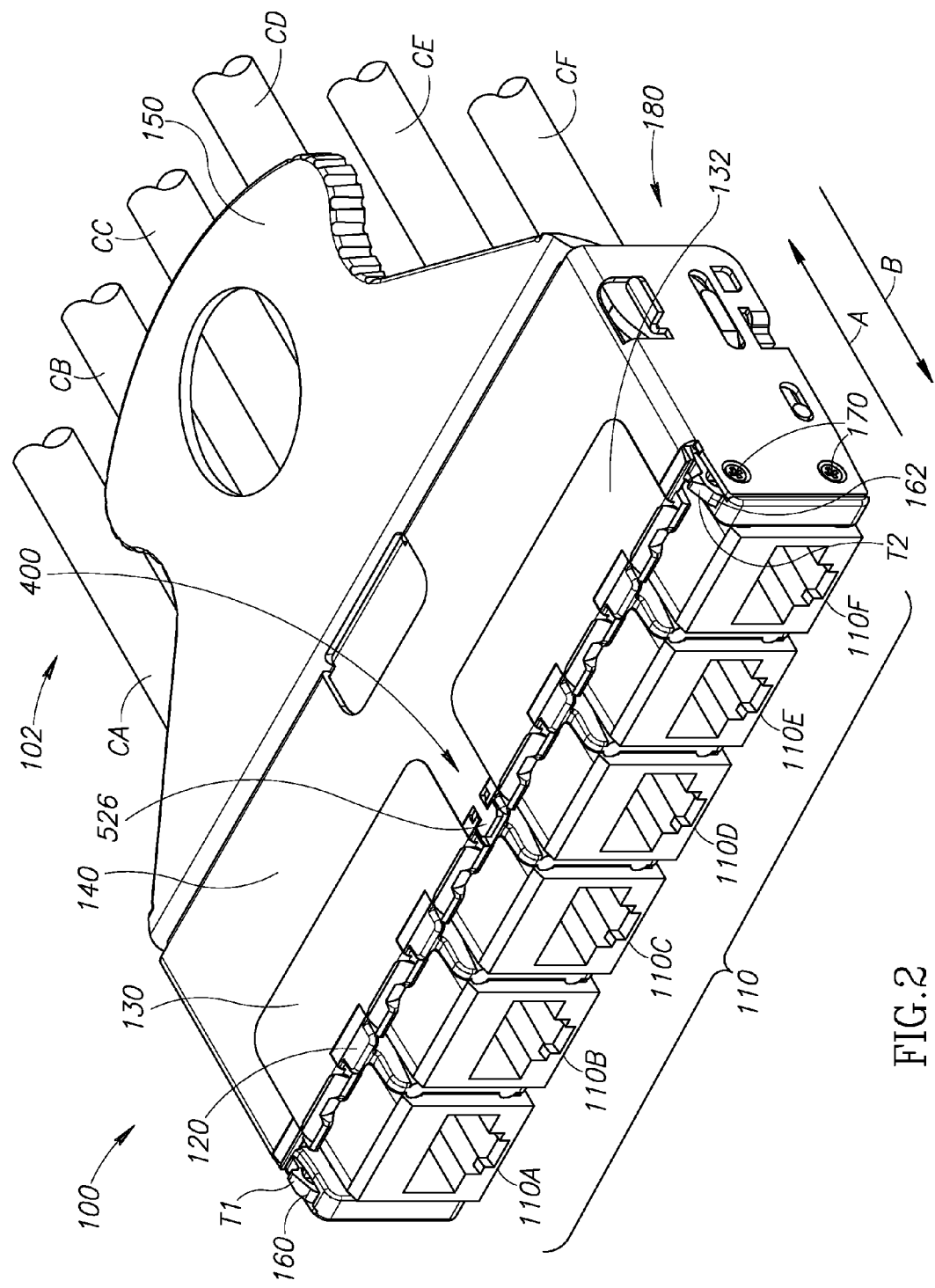
FIG. 2 is an enlarged perspective view of an upper portion of the cassette of FIG. 1A.
Figure 3:
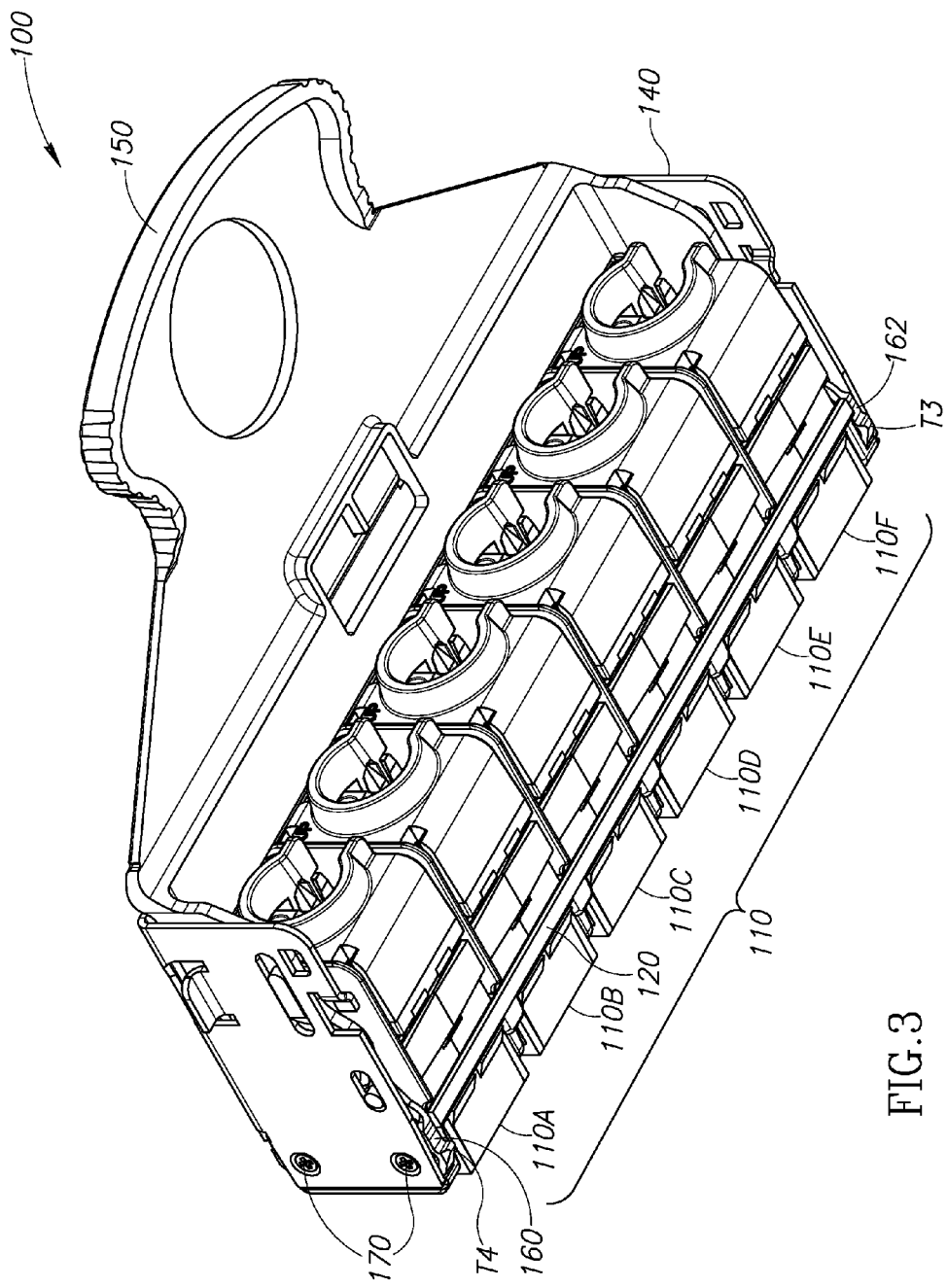
FIG. 3 is an enlarged perspective view of a lower portion of the cassette of FIG. 1A.

As will be explained below, the cassette 100 includes four retractable tabs "T1," "T2," "T3" (see FIG. 3), and "T4" (see FIG. 3) that, when extended as illustrated in FIGS. 1A, 2, and 3, are positioned to be received inside the apertures 104, 105, 106, and 107, respectively. Engagement of the tabs "T1," "T2," "T3," and "T4" with the apertures 104, 105, 106, and 107, respectively, maintains the cassette 100 securely but releasably inside the patch panel 101. When the four tabs "T1" to "T4" are retracted, the cassette 100 may be removed from the patch panel 101. As is apparent to those of ordinary skill in the art, panels (such as the patch panel 101, and the 4RU patch panel 112 illustrated in FIGS. 1D and 1E) are typically mounted in the rack 1600 (see FIG. 30).

Figure 4:
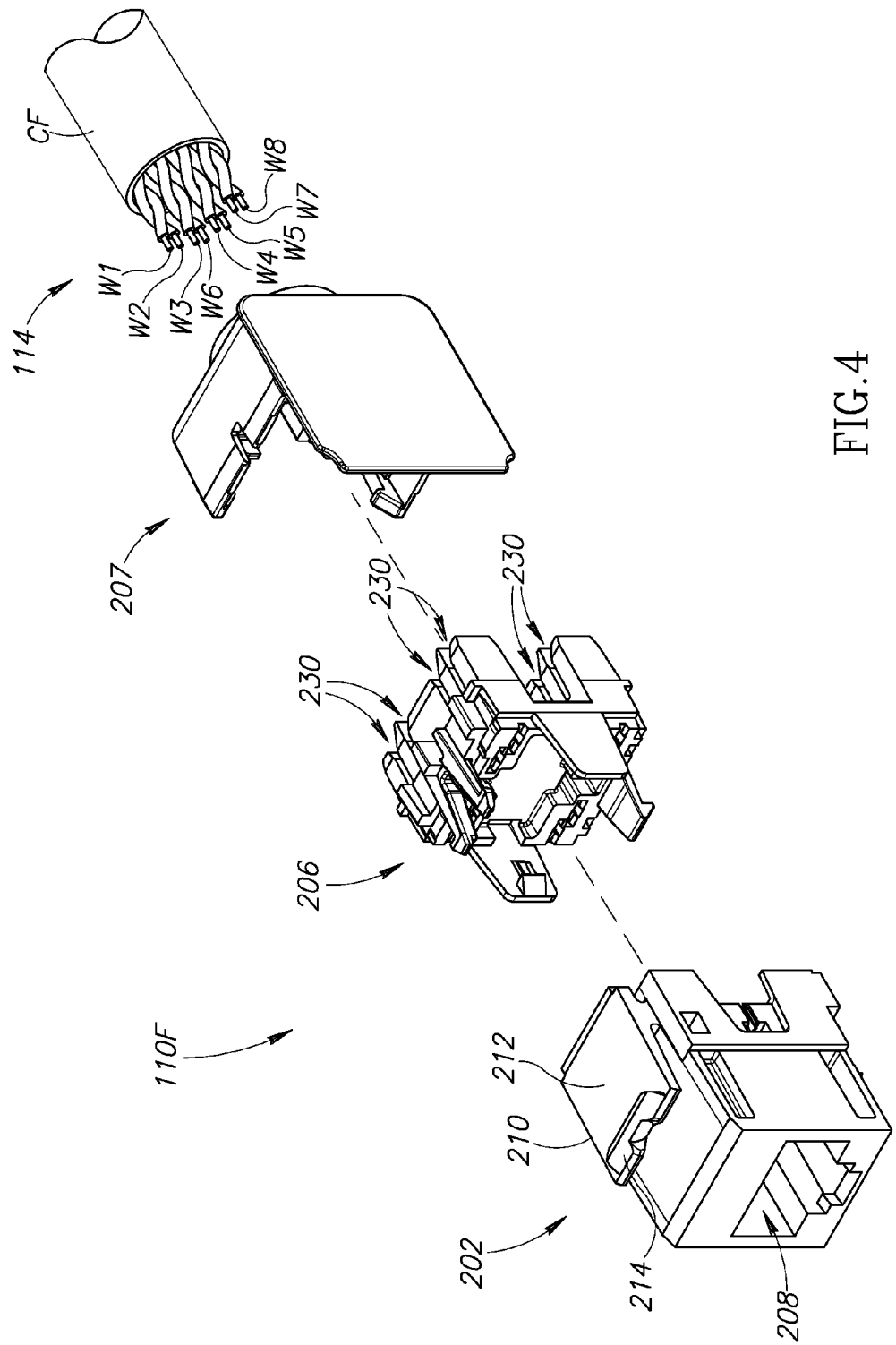
FIG. 4 is an exploded perspective view of an upper portion of one of the outlet assemblies of the cassette of FIG. 1A depicted with one of the cables.

The embodiment illustrated in FIG. 1A is configured for use with up to six cables "CA" to "CF" each including a plurality of wires 114 (see FIG. 4). As further shown in FIG. 4, by way of a non-limiting example, the plurality of wires 114 may include wires "W1" to "W8." By way of a further non-limiting example, the wires "W1" to "W8" may be implemented as electrically conductive wires, such as copper wires, or optically conductive media such as optical fibers, and the like. In implementations in which the wires "W1" to "W8" are copper wires, the wires may be arranged in four conventional twisted pairs. As explained below, in alternate embodiments, the wires "W1" to "W8" may be implemented as optical fibers terminated to fiber optic connectors situate in conventional fiber optic adapter plates, as known to those of ordinary skill in the art. In other alternate embodiments, the fiber optic cables may be terminated to a keystone optical connector such as a QUICKPORT® connector manufactured and sold by Leviton Manufacturing Co., Inc. of Melville, N.Y.

Figure 19:
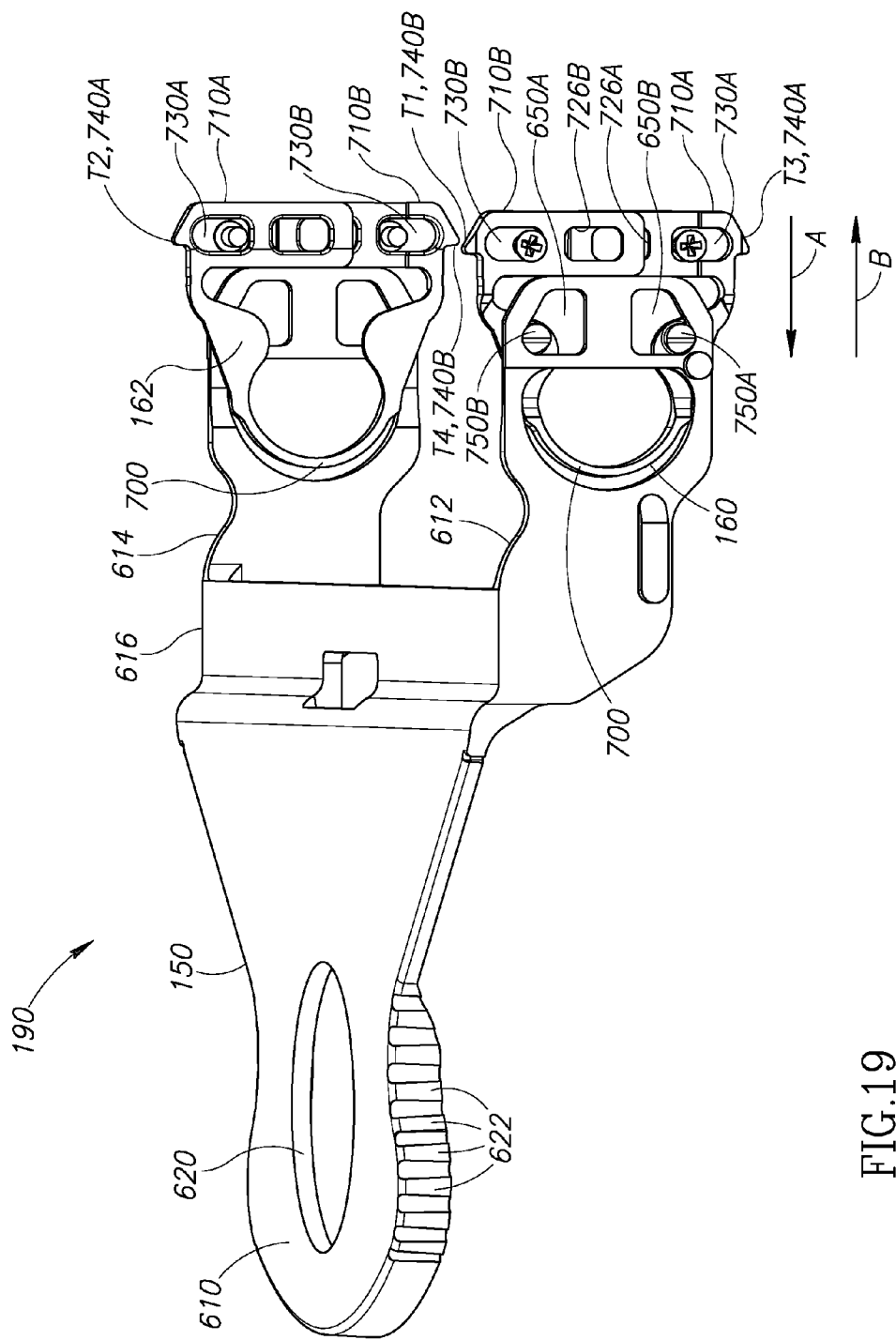
FIG. 19 is an enlarged perspective view of a latch mechanism subassembly including the first latch member, the second latch member, and the pull member depicted in a latched configuration.
Figure 20:
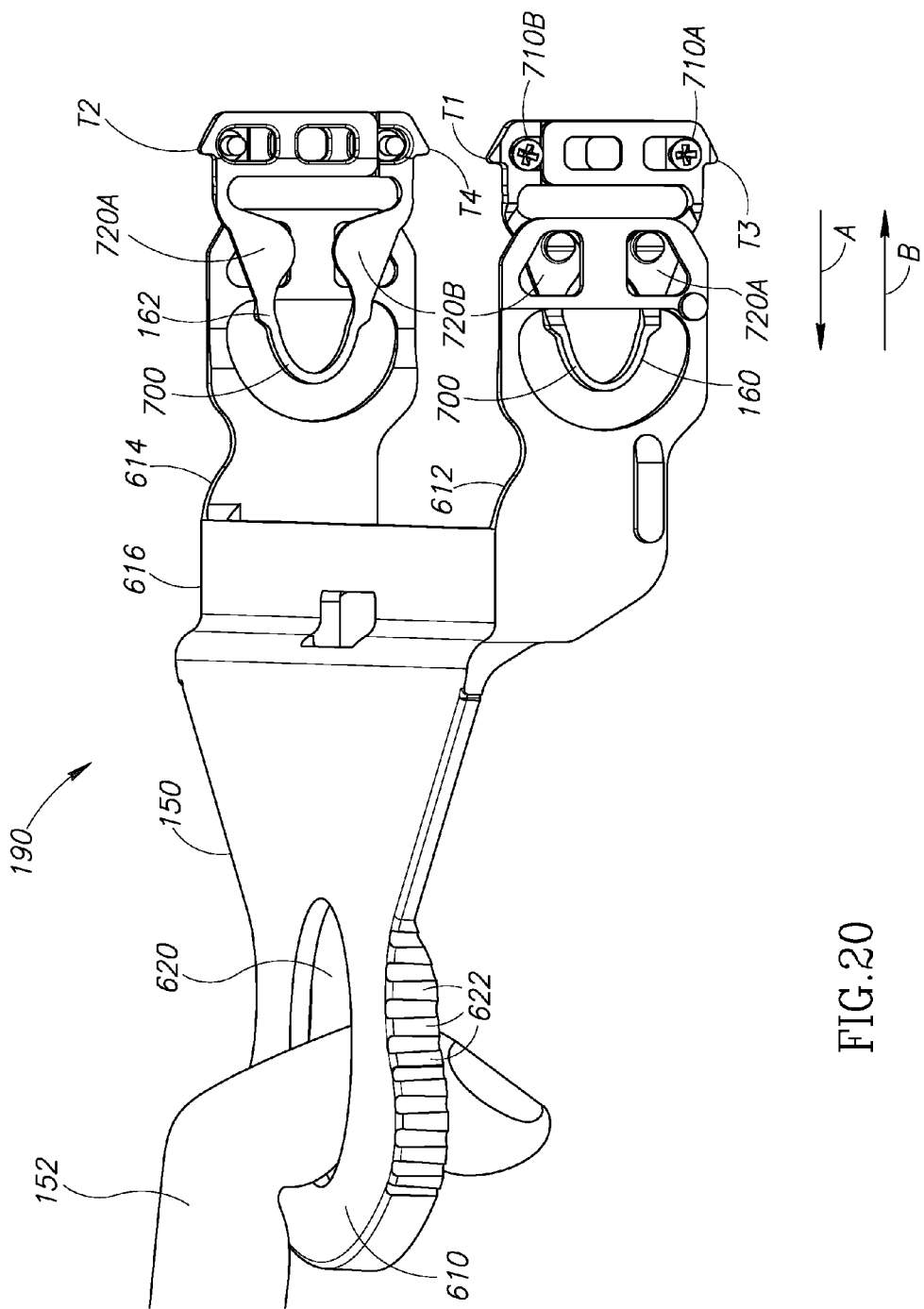
FIG. 20 is an enlarged perspective view of the latch mechanism subassembly of FIG. 19 depicted in an unlatched configuration.

FIG. 1A illustrates six communication plugs "P1" to "P6." Turning to FIG. 2, the cassette 100 includes a plurality of conventional communication outlet assemblies 110, a bezel member 120, a first transition member 130, a second transition member 132, a cover member 140, a pull member 150, a first latch member 160, a second latch member 162, and fasteners 170. The plugs 103 (see FIG. 1A) are receivable inside the outlet assemblies 110. Together the bezel member 120, the cover member 140, the first transition member 130, the second transition member 132, and the fasteners 170 may be characterized as forming a housing subassembly 180 for the outlet assemblies 110. Referring to FIGS. 19 and 20, together the pull member 150, the first latch member 160, and the second latch member 162 may be characterized as forming a latch mechanism subassembly 190. The latch mechanism subassembly 190 is connected to the housing subassembly 180 (see FIG. 2) but is moveable relative thereto.

Turning to FIG. 2, the outlet assemblies 110 are mounted inside the bezel member 120 of the housing subassembly 180. By way of a non-limiting example, the outlet assemblies 110 may be implemented as snap-in outlets snapped into the bezel member 120. The bezel member 120 is coupled to the cover member 140 by the fasteners 170 and secured thereto by a generally T-shaped projection 526 that is snap-fit into an upwardly opening recess 315 (see FIG. 6) formed in the bezel member 120 and four forwardly projecting tabs 522A-522D (see FIG. 13) that are received inside openings 316 (see FIG. 7) positioned below an upper rail 302 (see FIG. 6) of the bezel member 120. The fasteners 170 may be implemented using bolts, screws, adhesives, and the like. The fasteners 170 fixedly couple the bezel and cover members 120 and 140 together. The pull member 150 is movably coupled to the cover member 140 by the first and second latch members 160 and 162 (see FIGS. 19 and 20). The pull member 150 is slideable relative to both the bezel member 120 and the housing member 140 in directions identified by arrows "A" and "B."

Turning to FIG. 19, the latch mechanism subassembly 190 has a latched configuration (illustrated in FIGS. 1A, 2, 3, 10, 12, 18, and 19) and an unlatched configuration (illustrated in FIG. 20). The first and second latch members 160 and 162 bias the pull member 150 in a direction identified by arrow "B" and into the latched configuration. The pull member 150 may be operated by a user to selectively and manually transition the latch mechanism subassembly 190 from the latched configuration into the unlatched configuration illustrated in FIG. 20. In the embodiment illustrated, pulling on the pull member 150 in a direction identified by arrow "A" configures the latch mechanism subassembly 190 in the unlatched configuration. Releasing the pull member 150 allows the first and second latch members 160 and 162 to retract the pull member 150 in the direction identified by arrow "B" to configure the latch mechanism subassembly 190 in the latched configuration. The housing subassembly 180 (see FIG. 2) may be selectively latched inside and released from the patch panel 101 (see FIG. 1A) by selective engagement of the latch mechanism subassembly 190 with the apertures 104 to 107 (see FIG. 1A) of any of the patching areas PA1, PA3, PA5, and PA7 (see FIG. 42). Alternatively, the housing subassembly 180 (see FIG. 2) may be selectively latched inside and released from the patch panel 101 (see FIG. 1A) by selective engagement of the latch mechanism subassembly 190 with the apertures 106 to 109 (see FIG. 1A) of any of the patching areas PA2, PA4, PA6, and PA8 (see FIG. 42).

Figure 29:
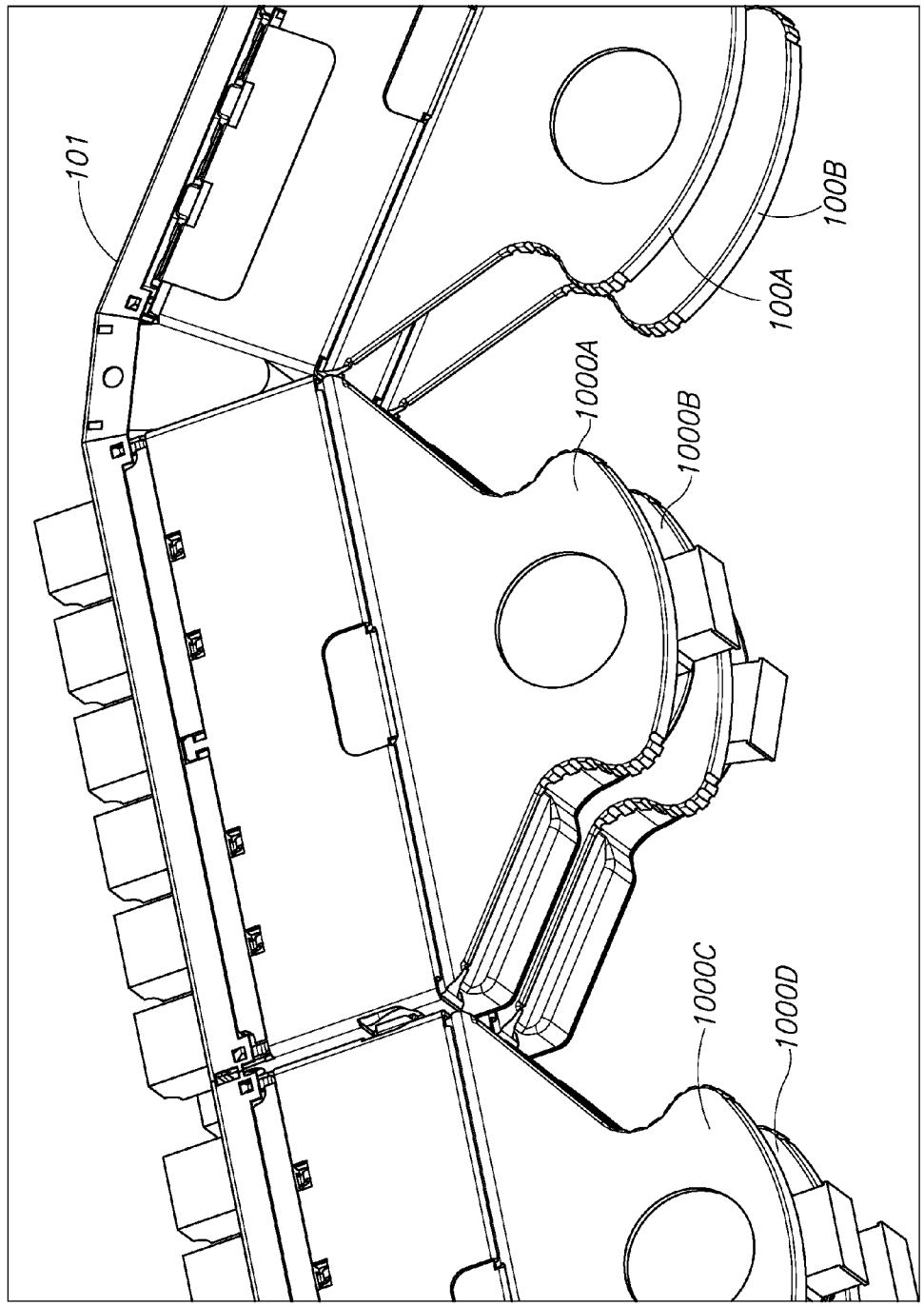
FIG. 29 is a perspective view of an assembly including embodiments of the cassette of FIG. 1A and the embodiments of the cassette of FIG. 21 mounted in the patch panel of FIG. 1B.

A pair of cassettes like the cassette 100 are mountable inside a vertically adjacent pair of patching areas PA1-PA8 (see FIG. 42). For example, FIGS. 29 and 30 illustrate cassettes 100A and 100B, which are each substantially identical to the cassette 100. The cassettes 100A and 100B are illustrated mounted in the vertically adjacent pair of the patching areas PA3 and PA4 (see FIG. 42). Thus, the housing subassembly 180 (see FIG. 2) of the cassette 100A may be selectively latched inside and released from the patch panel 101 by selective engagement of the latch mechanism subassembly 190 with the apertures 104 to 107 (see FIG. 1A) of the patching area PA3 (see FIG. 42). The housing subassembly 180 (see FIG. 2) of the cassette 100B may be selectively latched inside and released from the patch panel 101 by selective engagement of the latch mechanism subassembly 190 with the apertures 106 to 109 (see FIG. 1A) of the patching area PA4 (see FIG. 42). The middle flange "FL2" (see FIG. 1A) may be configured (e.g., have sufficient thickness) such that the top cassette 100A and the bottom cassette 100B may share apertures 106 and 107 at the same time. While the cassettes 100A and 100B are illustrated mounted in the vertically adjacent pair of the patching areas PA3 and PA4, the cassettes 100A and 100B may be mounted in any of the other vertically adjacent pairs of the patching areas (e.g., the pair of patching areas PA1 and PA2, the pair of patching areas PA5 and PA6, and the pair of patching areas PA7 and PA8).

Returning to FIG. 2, as mentioned above, the cassette 100 includes the outlet assemblies 110, the bezel member 120, the first and second transition members 130 and 132, the cover member 140, the pull member 150, the first and second latch members 160 and 162, and the fasteners 170.

Outlet Assemblies

The cassette 100 is not limited to use with any particular type of outlet assembly or number of outlet assemblies. In the embodiment illustrated in FIG. 2, the outlet assemblies 110 include six outlet assemblies 110A-110F (e.g., Category ("CAT") 6A jacks). The outlet assemblies 110A to 110F are connected to the cables "CA" to "CF," respectively. The outlet assemblies 110 illustrated are substantially identical to one another. However, this is not a requirement. Further, the outlet assemblies 110A-110F have been illustrated as CAT 6A jacks. However, this is not a requirement and one or more of the outlet assemblies 110 may be implemented using other types of communication outlets such as CAT 5e jacks, CAT 6 jacks, and the like.

Each of the outlet assemblies 110 is configured to receive one of the communication plugs 103 (see FIG. 1A) and transmit electronic signals thereto and receive electronic signals therefrom. When coupled together, one of the outlet assemblies 110 and one of the plugs 103 form a communication connection. In addition to transmitting and receiving electronic communication signals, one or more of the outlet assemblies 110 may transmit power to and/or receive power from one of the plugs 103.

Figure 5:
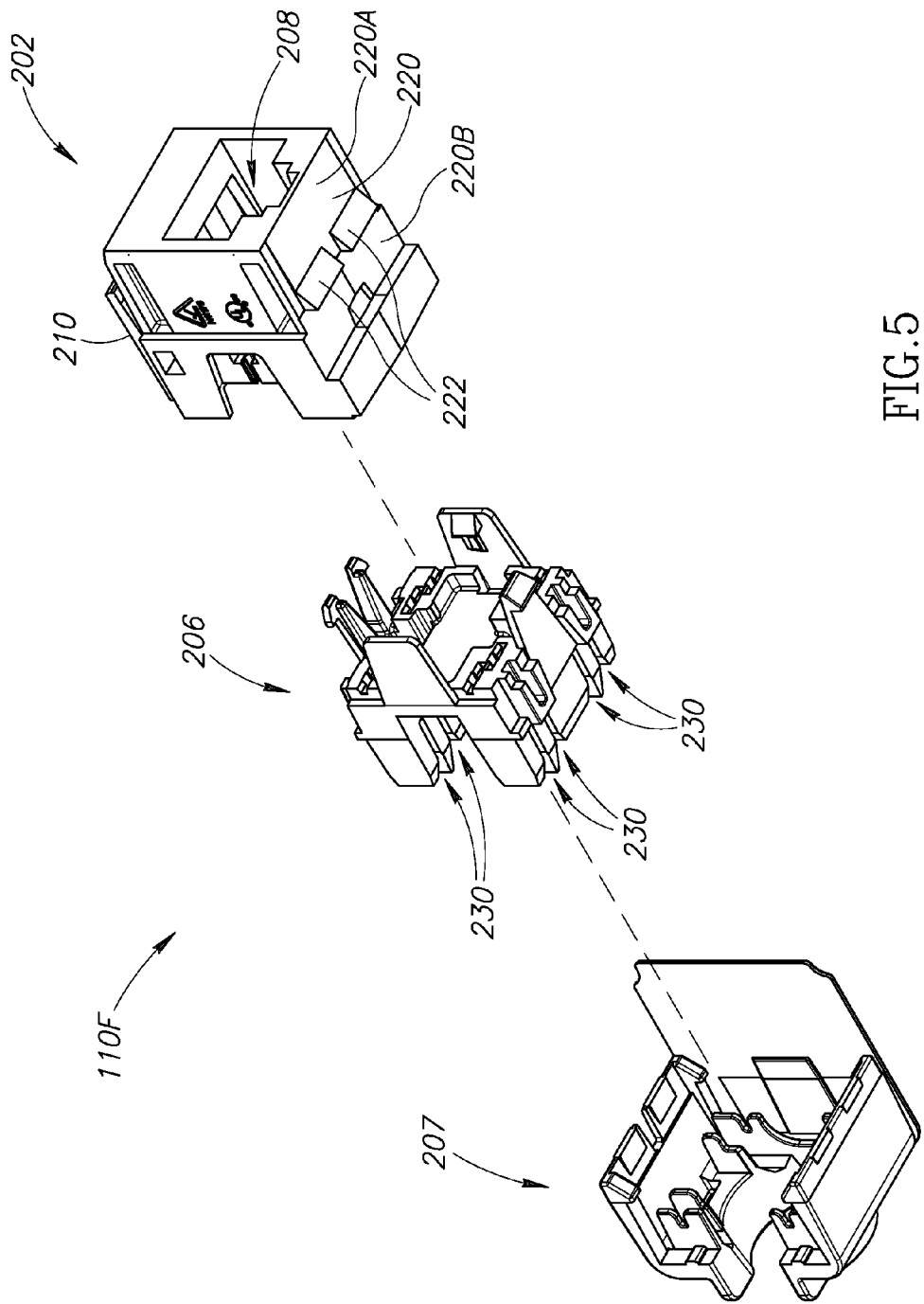
FIG. 5 is an exploded perspective view of a lower portion of the outlet assembly of FIG. 4.

FIGS. 4 and 5 are exploded views of an exemplary one of the outlet assemblies 110, specifically the outlet assembly 110F. The outlet assembly 110F is connected to the communication cable "CF" via a plurality of wire termination contacts (e.g., insulation displacement connectors 230 that are housed within termination towers of a terminal housing 206). While the wire termination contacts have been described as being the insulation displacement connectors 230 housed within the termination towers as is known to those of ordinary skill in the art, other means of electrically coupling outlet contacts (not shown) to electrically conductive elements in the cable "CF" may be used.

FIGS. 4 and 5 depict the outlet assembly 110F as having an outlet housing 202, the terminal housing 206, and an optional crosstalk shield 207. By way of a non-limiting example, the outlet housing 202, the terminal housing 206, and the optional crosstalk shield 207 may snap together in a conventional manner.

The outlet housing 202 includes an aperture 208 to provide access to the outlet contacts (not shown) for engagement with contacts (not shown) of the communication plug "P6" (see FIG. 1A) upon insertion of the plug into the aperture. In the embodiment illustrated, an upper portion of the outlet housing 202 includes a manually operated latch arm 210 having an upper surface 212 and a distal tab 214. Referring to FIG. 5, a lower portion of the outlet housing 202 includes lower surfaces 220A and 220B with at least one stop 222 situate intermediate therebetween.

The terminal housing 206 includes the insulation displacement connectors 230 for terminating the cable "CF" and connecting the outlet contacts (not shown) with the wires 114 (see FIG. 4) of the cable.

The optional crosstalk shield 207 may be implemented using a CONE OF SILENCE® crosstalk shield sold by Leviton Manufacturing Co., Inc. of Melville, N.Y.

Returning to FIG. 2, as mentioned above, the outlet assemblies 110 are mounted inside the bezel member 120 by rotating or pivoting the lower surface 220B (see FIGS. 5 and 9) about an upper edge portion 317 (see FIG. 7) of a lower rail 304 of the bezel member 120 to position the outlet assembly 110F within an aperture 380F (see FIG. 6) of the bezel member 120 and the latch arm 210 (see FIG. 4) of the outlet housing 202 into engagement with the upper rail 302 of the bezel member 120.

Bezel Member

Figure 6:
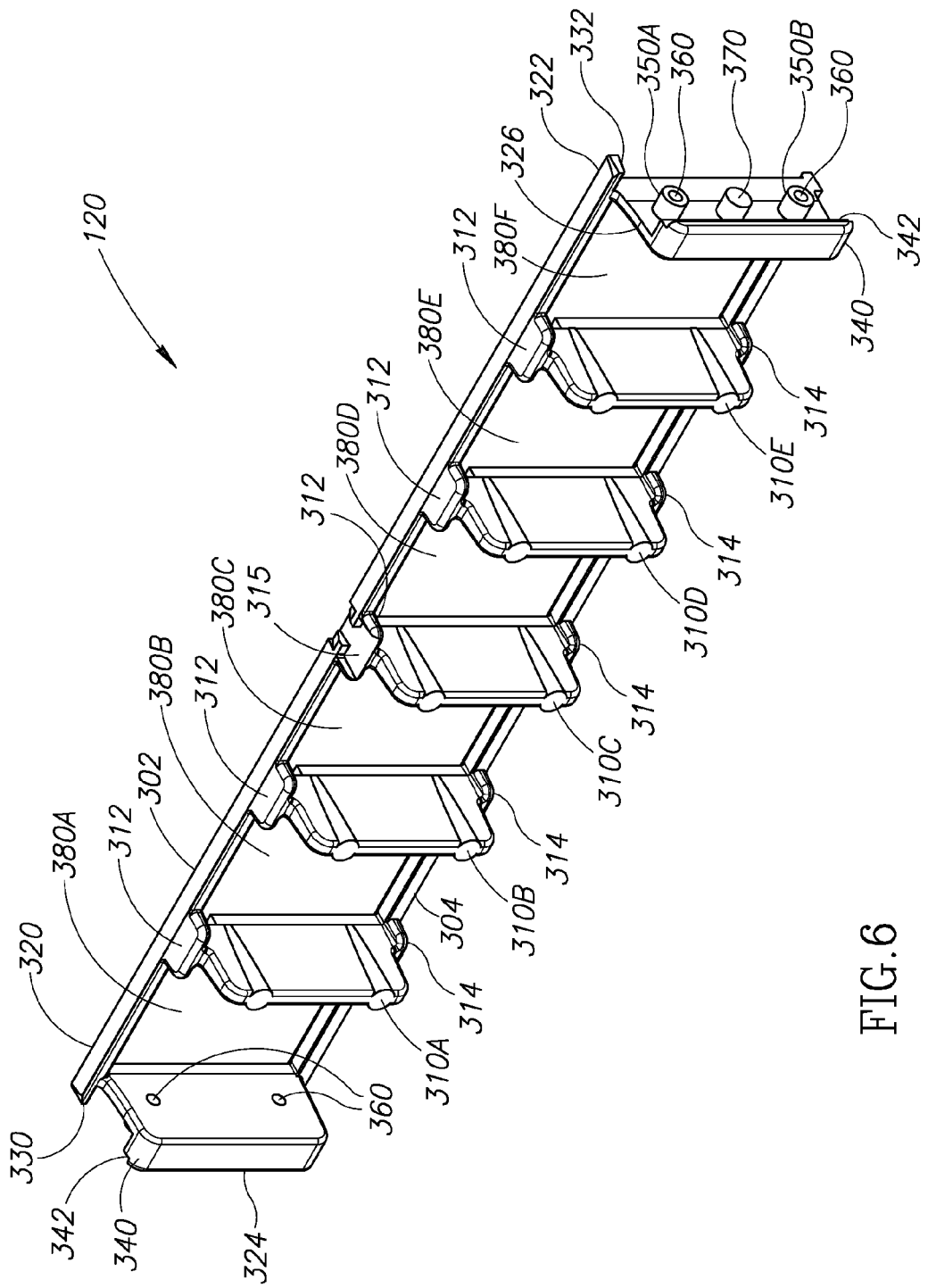
FIG. 6 is an enlarged perspective view of a frontwardly facing portion of a bezel member of the cassette of FIG. 1A.
Figure 7:
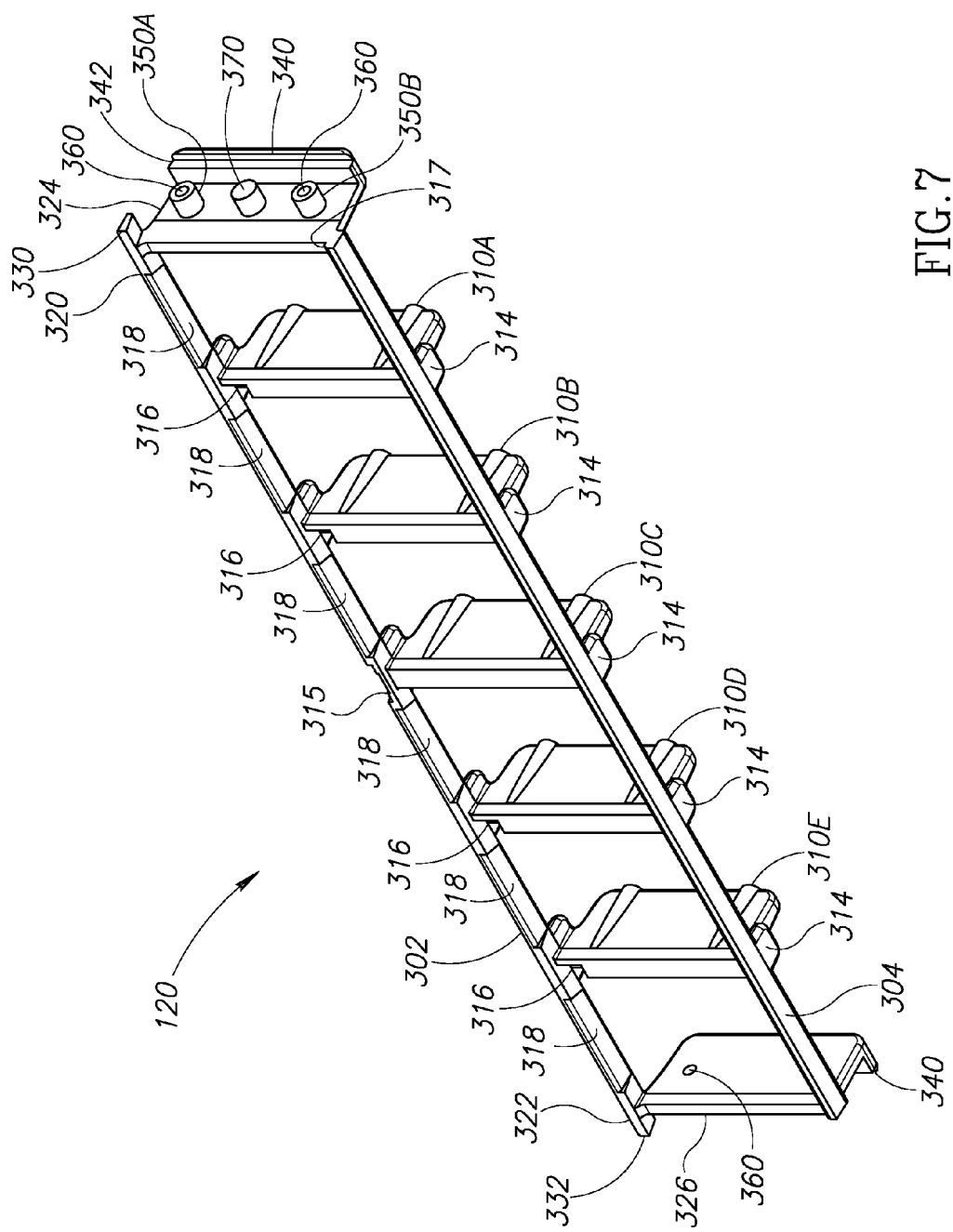
FIG. 7 is an enlarged perspective view of a backwardly facing portion of the bezel member of FIG. 6.
Figure 8:
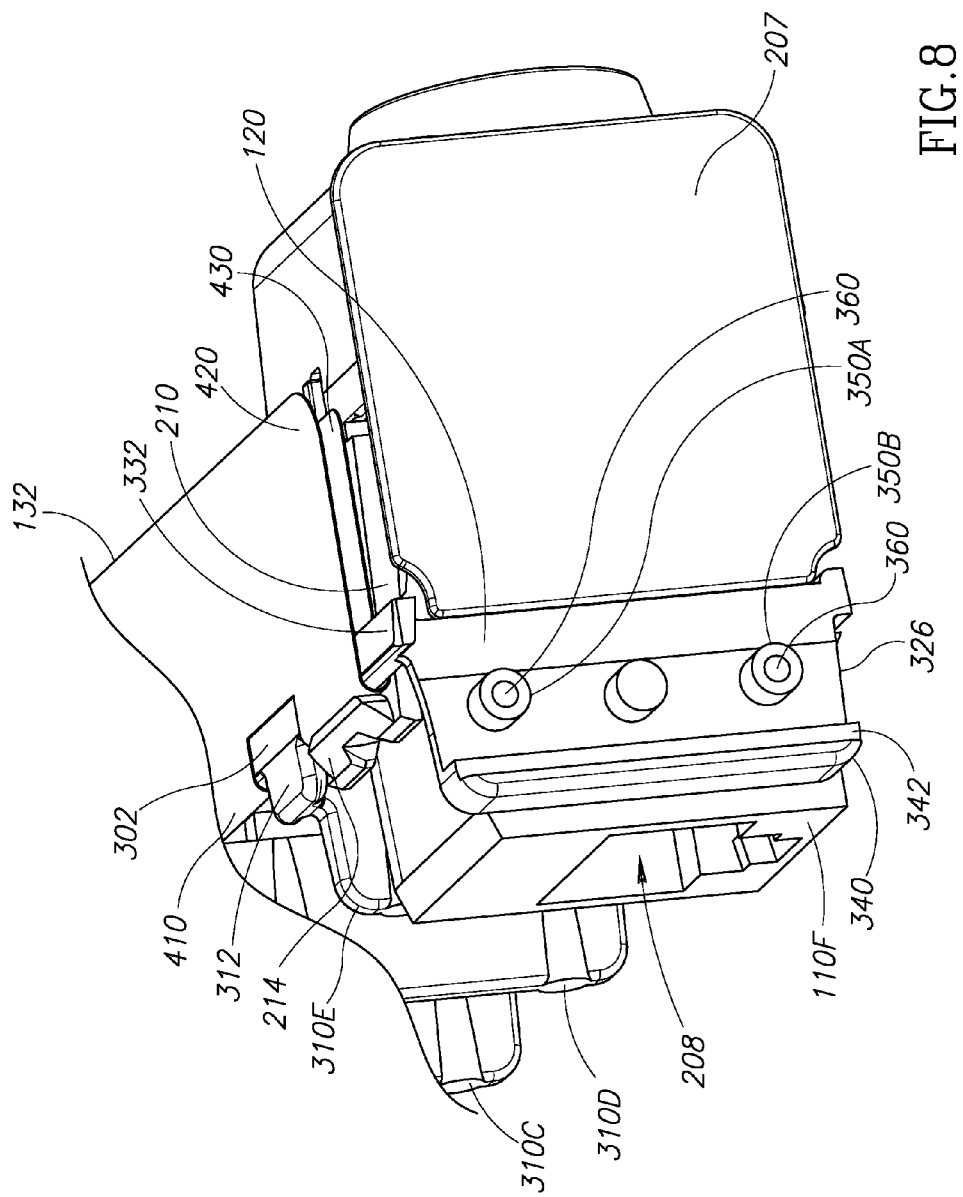
FIG. 8 is an enlarged perspective view of an upper portion of the outlet of FIGS. 4 and 5 depicted mounted in the bezel member of FIGS. 6 and 7.
Figure 9:
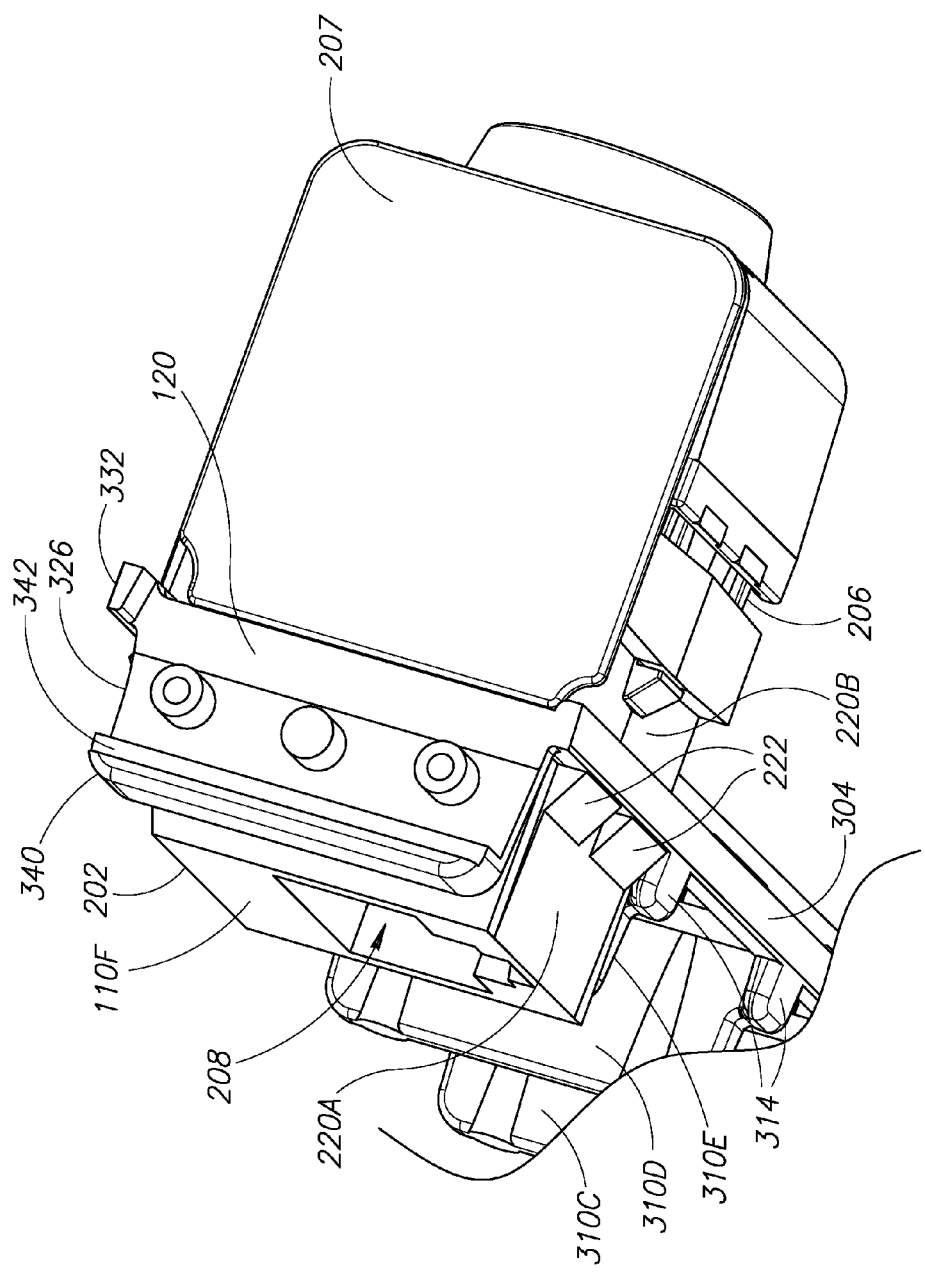
FIG. 9 is an enlarged perspective view of a lower portion of the outlet of FIGS. 4 and 5 depicted mounted in the bezel member of FIGS. 6 and 7.

FIGS. 6 and 7 provide perspective views of the bezel member 120. The bezel member 120 includes the upper rail 302 spaced apart from the lower rail 304. Optionally, the upper rail 302 may be tapered so it becomes thinner toward the terminal housing 206 (see FIGS. 4 and 5) of the outlet assemblies 110 (see FIG. 2). Referring to FIGS. 8 and 9, the outlet assembly 110F is illustrated mounted inside the aperture 380F (see FIG. 6) of the bezel member 120. Turning to FIG. 8, the latch arm 210 is positioned under the upper rail 302 with at least a portion of the upper surface 212 (see FIG. 4) of the latch arm 210 and the distal tab 214 abutting the upper rail 302. The latch arm 210 extends toward the upper rail 302 and presses the upper surface 212 (see FIG. 4) against the upper rail 302. Turning to FIG. 9, the lower surfaces 220A and 220B and the stop(s) 222 of the outlet assembly 110F abut the lower rail 304. Thus, the distal tab 214 (see FIG. 8) and the stop(s) 222 further support and retain the outlet assembly 110F within the aperture 380F of the bezel member 120. Turning to FIG. 2, the outlet assemblies 110A-110E are mounted to the bezel member 120 in a manner substantially identical to that described above with respect to the outlet assembly 110F.

Returning to FIGS. 6 and 7, ribs or projections 310A-310E extend between the upper and lower rails 302 and 304. The projections 310A-310E are spaced apart from one another such that one of the outlet assemblies 110 may be received between adjacent ones of projections 310A-310E. In the embodiment illustrated, the projection 310A is positioned between the adjacent outlet assemblies 110A and 110B (see FIG. 2), the projection 310B is positioned between the adjacent outlet assemblies 110B and 110C (see FIG. 2), the projection 310C is positioned between the adjacent outlet assemblies 110C and 110D (see FIG. 2), the projection 310D is positioned between the adjacent outlet assemblies 110D and 110E (see FIG. 2), and the projection 310E is positioned between the adjacent outlet assemblies 110E and 110F (see FIG. 2).

When the outlet assemblies 110 (see FIG. 2) are mounted to the bezel member 120, the projections 310A-310E project forwardly between adjacent ones of the outlet assemblies 110 to help prevent crosstalk between the outlet assemblies 110. The projections 310A-310E may be constructed from a metallic shielding material, such as metallic zinc. The projections 310A-310E extend alongside a portion of the outlet housing 202 (see FIGS. 4 and 5) of each of the outlet assemblies 110 (see FIG. 2 and FIG. 8). In some implementations, it is desirable for the projections 310A-310E to extend forwardly from the upper and lower rails 302 and 304 along a portion of the otherwise unshielded outlet housing 202 of each of the outlet assembles 110A-110F whereat the contacts (not shown) of the outlet assembles 110A-110F form connections with the contacts (not shown) of the plugs "P1" to "P6" (see FIG. 1A), respectively, when the plugs "P1" to "P6" are received inside the outlet assemblies 110A-110F, respectively.

Returning to FIGS. 6 and 7, an upper spacer member 312 is positioned adjacent each of the projections 310A-310E along the upper rail 302 and a lower spacer member 314 is positioned adjacent each of the projections 310A-310E along the lower rail 304. The upper and lower spacer members 312 and 314 project forwardly between adjacent ones of the outlet assemblies 110 (see FIG. 2 and FIG. 6). The upper and lower spacer members 312 and 314 provide structural strength to the bezel member 120 and also act as stops or limiting elements configured to prevent the cassette 100 from moving relative to the patch panel 101, the 4RU patch panel 112 (see FIGS. 1D and 1E), and the like, when mounted thereto. By way of a non-limiting example, when the cassette 100 is mounted between the flanges "FL1" and "FL2" of a selected one of the vertically adjacent pairs of patching areas of the patch panel 101, the upper and lower spacer members 312 and 314 may frictionally engage the flanges "FL1" and "FL2" to resist movement of the cassette 100 relative to the patch panel 101. By way of another non-limiting example, when the cassette 100 is mounted between the flanges "FL2" and "FL3" of a selected one of the vertically adjacent pairs of patching areas of the patch panel 101, the upper and lower spacer members 312 and 314 may frictionally engage the flanges "FL2" and "FL3" to resist movement of the cassette 100 relative to the patch panel 101.

The upwardly opening recess 315 is formed in the upper spacer member 312 adjacent the central projection 310C. The upper edge portion 317 of the lower rail 304 opposite the lower spacer members 314 is relieved (e.g., chamfered, rounded, and the like) to provide a pivot surface for rotational insertion of the outlet assemblies 110A-110F within the apertures 380A-380F of the bezel member 120. Along a lower portion of the upper rail 302, tapered recessed portions 318 flank each of the projections 310A-310E. Each of the tapered recessed portions 318 may act as a ramp upon which the latch arm 210 of the outlet housing 202 may slide when inserted into the bezel member 120.

The projections 310A, 310B, 310D and 310E each include the opening 316 positioned below the upper rail 302 and configured to receive the forwardly projecting tabs 522A, 522B, 522C and 522D (see FIG. 13), respectively, for engagement with, and retention between, the cover member 140 and the bezel member 120 (see FIGS. 11 and 12). Likewise, the projection 526 of the cover member 140 is configured to be engaged with, and retained by, the upwardly opening recess 315 of the bezel member 120 (see FIGS. 6 and 13).

Referring to FIG. 6, the bezel member 120 has a first end portion 320 opposite a second end portion 322. A first end portion 320 has a first anchor portion 324 that extends between the upper and lower rails 302 and 304. The first anchor portion 324 is adjacent the outlet assembly 110A (see FIG. 2). The outlet assembly 110A (see FIG. 2) is positioned between the first anchor portion 324 and the projection 110A. A second end portion 322 has a second anchor portion 326 that extends between the upper and lower rails 302 and 304. The second anchor portion 326 is adjacent the outlet assembly 110F (see FIG. 2). The outlet assembly 110F (see FIG. 2) is positioned between the second anchor portion 326 and the projection 110E. A first overhang portion 330 of the upper rail 302 overhangs the first anchor portion 324 and a second overhang portion 332 of the upper rail 320 overhangs the second anchor portion 326.

Each of the first and second anchor portions 324 and 326 includes a stop wall 340, at least one projection 350A and 350B each having an aperture 360 for receiving one of the fasteners 170 (see FIG. 2), and at least one guide projection 370. In the embodiment illustrated, the stop wall 340 has a relieved edge portion 342.

Returning to FIG. 2, as mentioned above, the bezel member 120 is coupled to the cover member 140 by the forwardly projecting tabs 522A-522D (see FIG. 13) and the projection 526 as well as the fasteners 170.

Transition Members

Figure 10:
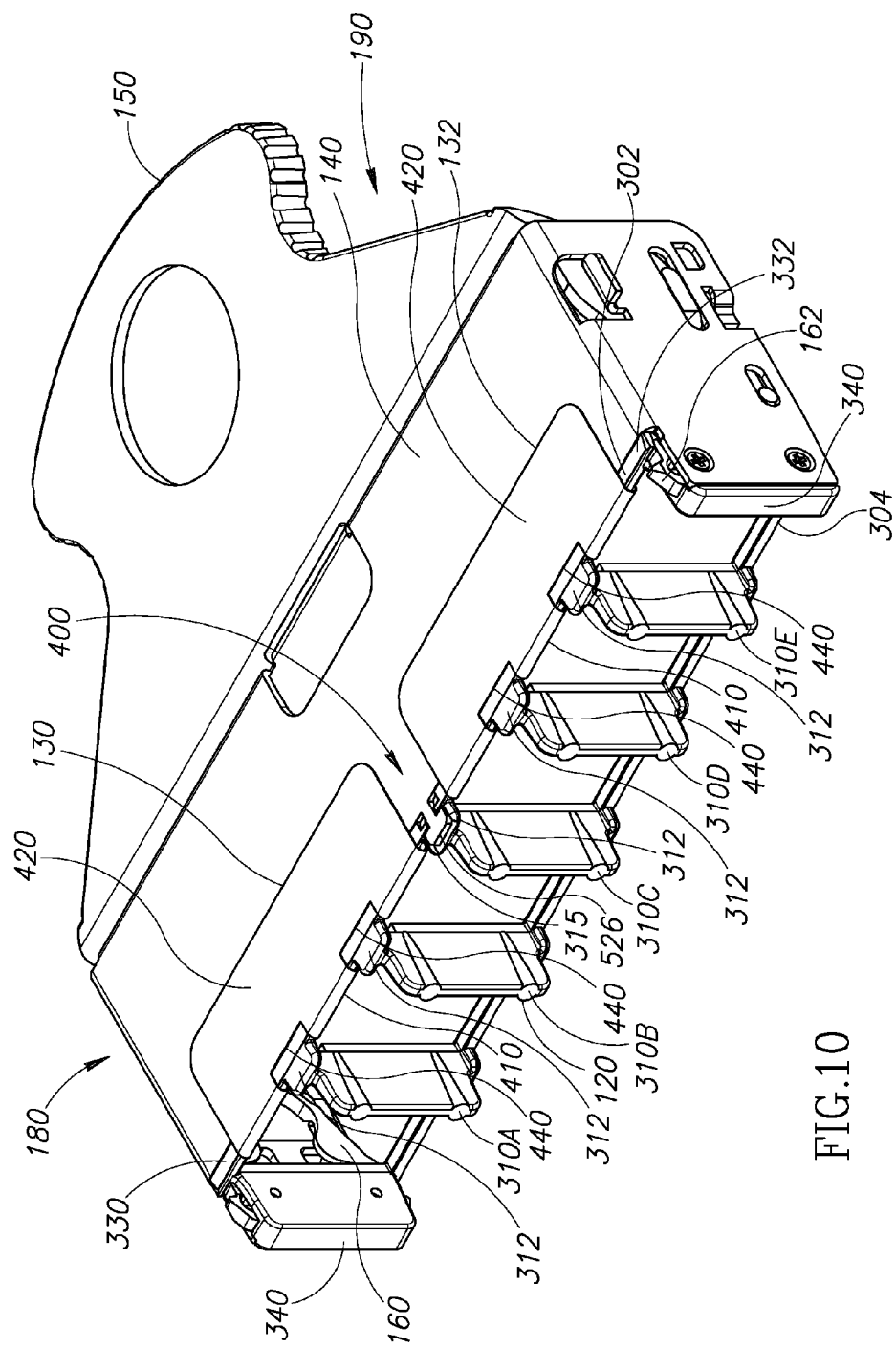
FIG. 10 is an enlarged perspective view of a front portion of the cassette of FIG. 1A with the outlets removed.

Turning to FIG. 2, the first and second transition members 130 and 132 may be substantially identical to one another. In the embodiment illustrated in FIG. 2, the first transition member 130 is configured to be positioned alongside half of the outlet assemblies 110 (e.g., the outlet assemblies 110A to 110C), and the second transition member 132 is configured to be positioned alongside half of the outlet assemblies 110 (e.g., the outlet assemblies 110D to 110F). In FIG. 10, the outlet assemblies 110 have been omitted to provide a better view of the housing subassembly 180 and the latch mechanism subassembly 190. The first and second transition members 130 and 132 may be spaced apart from one another to define a gap 400 therebetween. The projection 310C may be positioned adjacent the gap 400 and between the first and second transition members 130 and 132.

Figure 11:
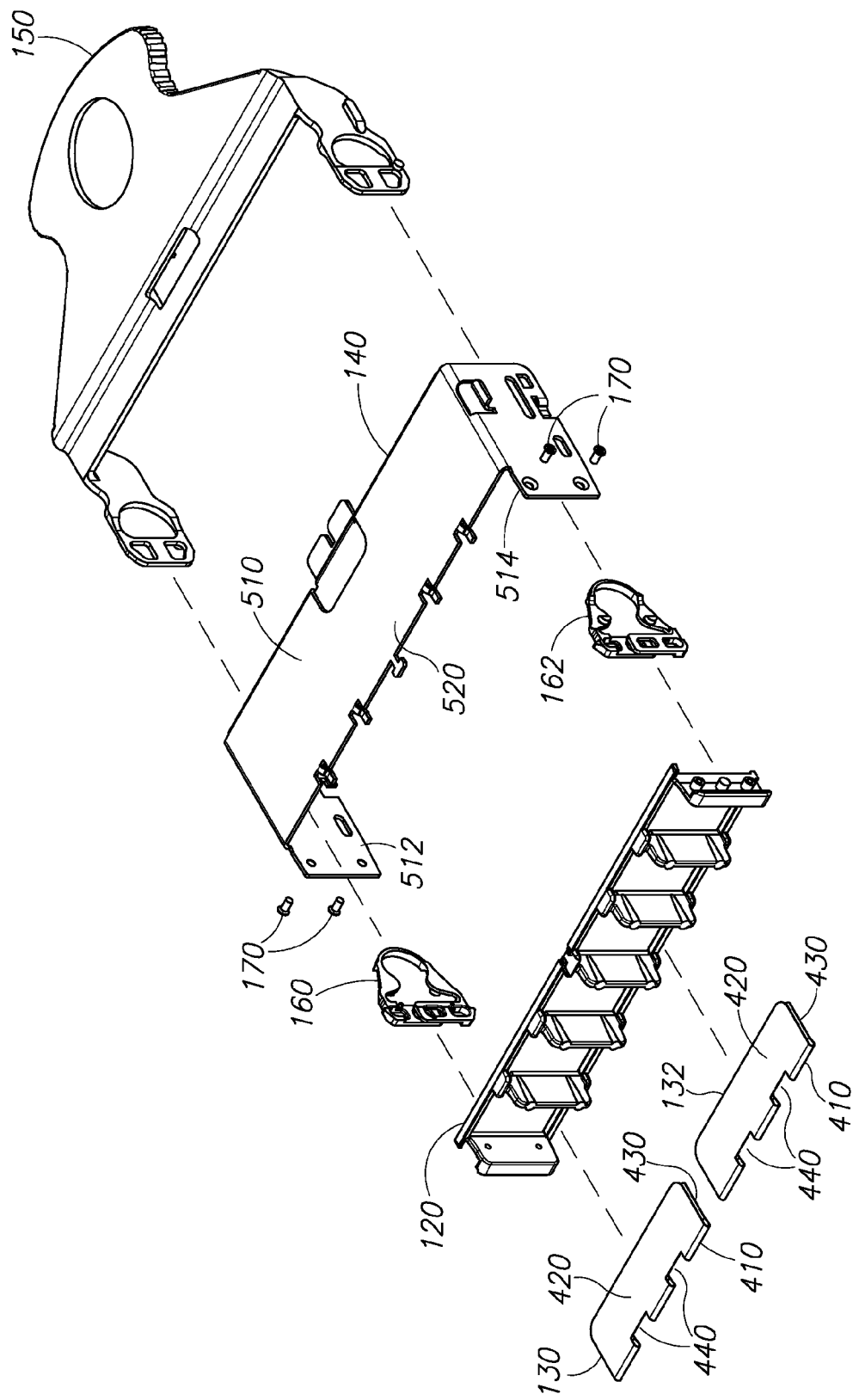
FIG. 11 is an exploded perspective view of the cassette of FIG. 1A omitting the outlets.

FIG. 11 is an exploded view of the components illustrated in FIG. 10. The first and second transition members 130 and 132 each include a folded portion 410 flanked by an upper portion 420 and a lower portion 430. In the embodiment illustrated, the first and second transition members 130 and 132 are each constructed from a substantially planar, generally E-shaped polyester film. The upper portion 420 may be adhesively coupled to the cover member 140. Turning to FIG. 12, the lower portion 430 of each of the first and second transition members 130 and 132 includes finger members, "F1," "F2," and "F3," that may be wrapped around the front portion of the upper rail 302 of the bezel member 120. Each of the finger members, "F1," "F2" and "F3," may be positioned along the tapered recessed portions 318 (see FIG. 7), and adhesively coupled to an underside 525 of the cover member 140.

Figure 12:
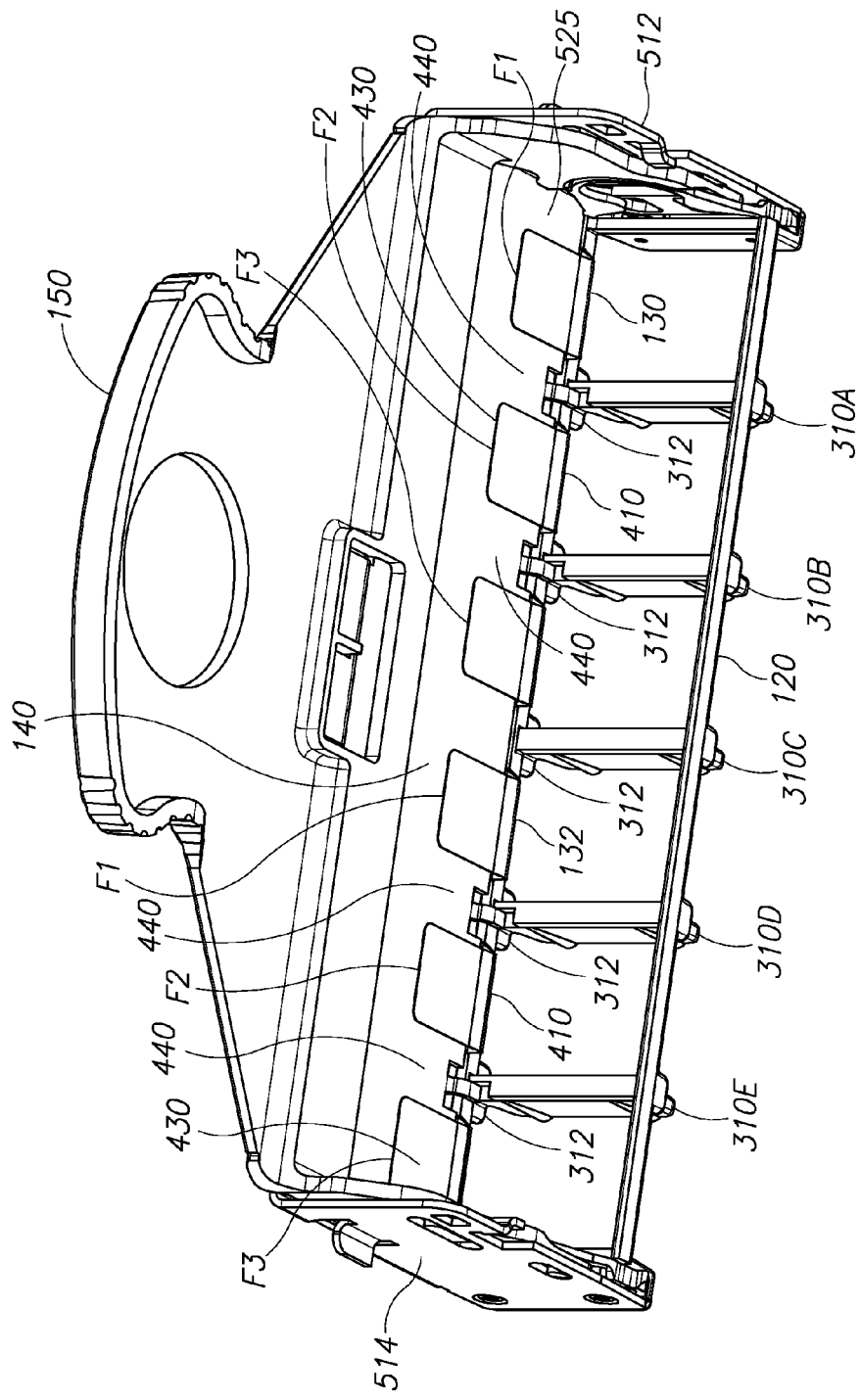
FIG. 12 is an enlarged perspective view of a rear portion of the cassette of FIG. 1A with the outlets removed.

As further shown in FIG. 12, the first and second transition members 130 and 132 also include cutout portions 440. Each of the cutout portions 440 is configured to clear one of the upper spacer members 312 positioned adjacent one of the projections 310A-310E. The cutout portions 440 are formed in the folded portion 410 and the lower portion 430 of the transition members 130 and 132 to define the finger members "F1," "F2," and "F3." In the embodiment illustrated in FIG. 11, the cutout portions 440 extend partially into the upper portion 420 of the first and second transition members 130 and 132.

Returning to FIG. 12, in the embodiment illustrated, the lower portion 430 of each of the first and second transition members 130 and 132 includes the three finger members "F1," "F2" and "F3." The finger member "F1" of the first transition member 130 is positioned alongside the outlet assembly 110A (see FIG. 2), the finger member "F2" of the first transition member 130 is positioned alongside the outlet assembly 110B (see FIG. 2), and the finger member "F3" of the first transition member 130 is positioned alongside the outlet assembly 110C (see FIG. 2). The finger member "F1" of the second transition member 132 is positioned alongside the outlet assembly 110D (see FIG. 2), the finger member "F2" of the second transition member 132 is positioned alongside the outlet assembly 110E (see FIG. 2), and the finger member "F3" of the second transition member 132 is positioned alongside the outlet assembly 110F (see FIG. 2). Thus, adjacent ones of the fingers members "F1" to "F3" flank one of the upper spacer members 312.

Turning to FIG. 2, depending upon the implementation details, the first and second transition members 130 and 132 may provide a smooth surface to facilitate movement and aid in transitioning the latch arm 210 (see FIG. 4) of the outlet housing 202 (see FIG. 4) into the latched position when the outlet assemblies 110A-110F are inserted into the bezel member 120. The first and second transition members 130 and 132 may be used to bond the cover member 140 to the bezel member 120, which may help prevent separation of the cover member 140 from the bezel member 120 when the outlet assemblies 110A-110F are inserted into the bezel member 120.

Cover Member

Figure 13:
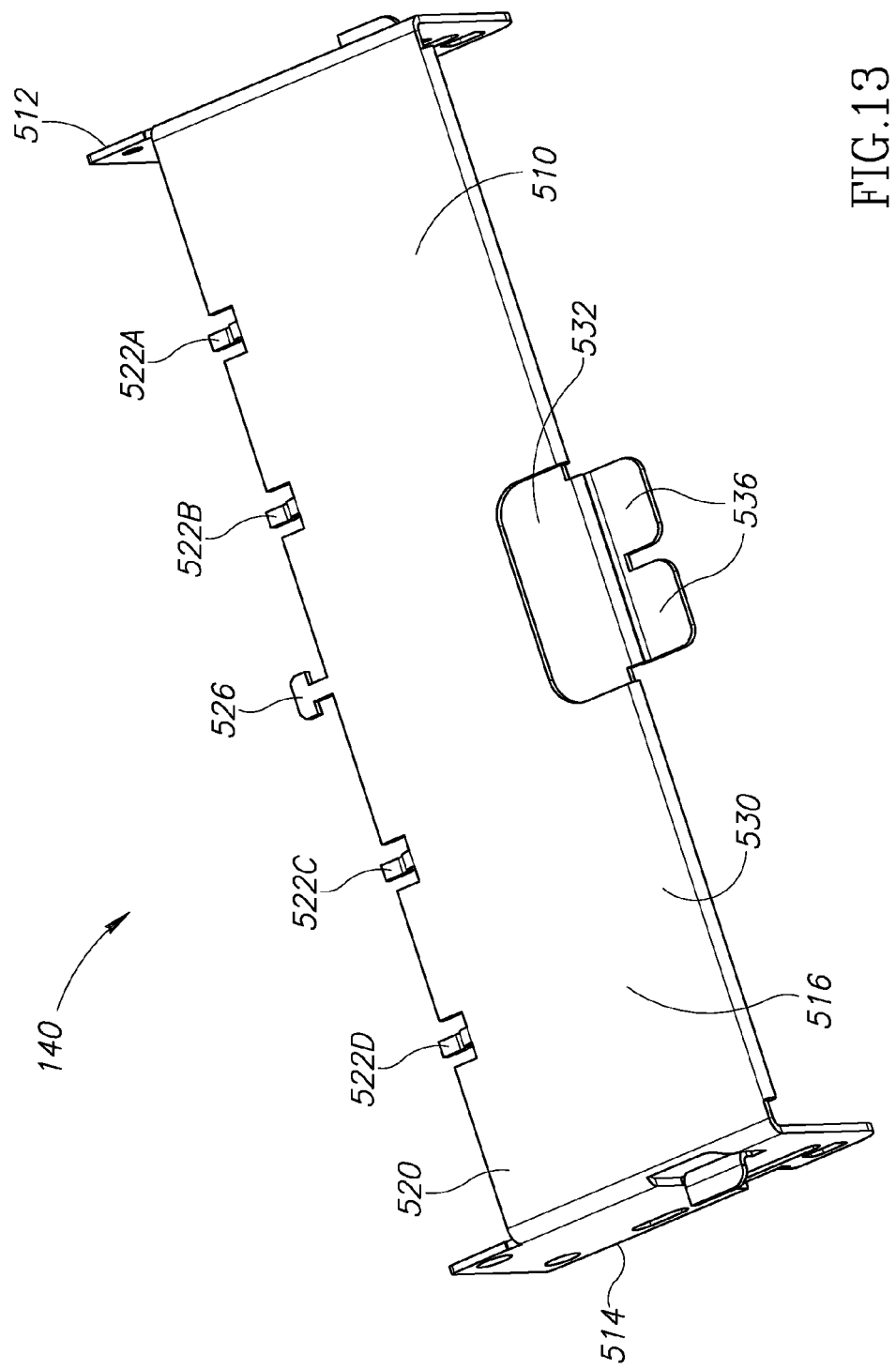
FIG. 13 is an enlarged perspective view of an upper portion of a cover member of the cassette of FIG. 1A.

Turning to FIG. 13, the cover member 140 has an upper portion 510 flanked by a first side portion 512, and a second side portion 514. Turning to FIG. 12, the bezel member 120 extends between the first and second side portions 512 and 514. Returning to FIG. 13, the cover member 140 may be constructed from a single sheet of material (e.g., metal) bent to define the upper, first side, and second side portions 510, 512, and 514. Alternatively, the cover member 140 may be molded or cast (e.g., die cast).

The upper portion 510 has an upper surface 516. The upper portion 510 has a front portion 520 that receives the first and second transition members 130 and 132 (see FIG. 11). As previously discussed, the front portion 520 includes the forwardly projecting tabs 522A to 522D, and the projection 526. The tabs 522A, 522B, 522C, and 522D are configured (e.g., bent) to be received inside the openings 316 (see FIG. 7) of the projections 310A, 310B, 310D, and 310E, respectively. The projection 526 is configured to be received and retained, for example by snap-fit retention, inside the upwardly opening recess 315 (see FIG. 6) formed in the upper spacer member 312 adjacent the central projection 310C. In the embodiment illustrated, the recess 315 and the projection 526 are both generally T-shaped such that when the projection 526 is received inside the recess 315, movement of the cover member 140 relative to the bezel member 120 along the directions indicated by the arrows "A" and "B" (see FIG. 2) is restricted by the engagement of the projection 526 with the rear portion of the recess 315. Thus, the projection 526 acts as a key within a keyway formed by the recess 315.

Figure 14:
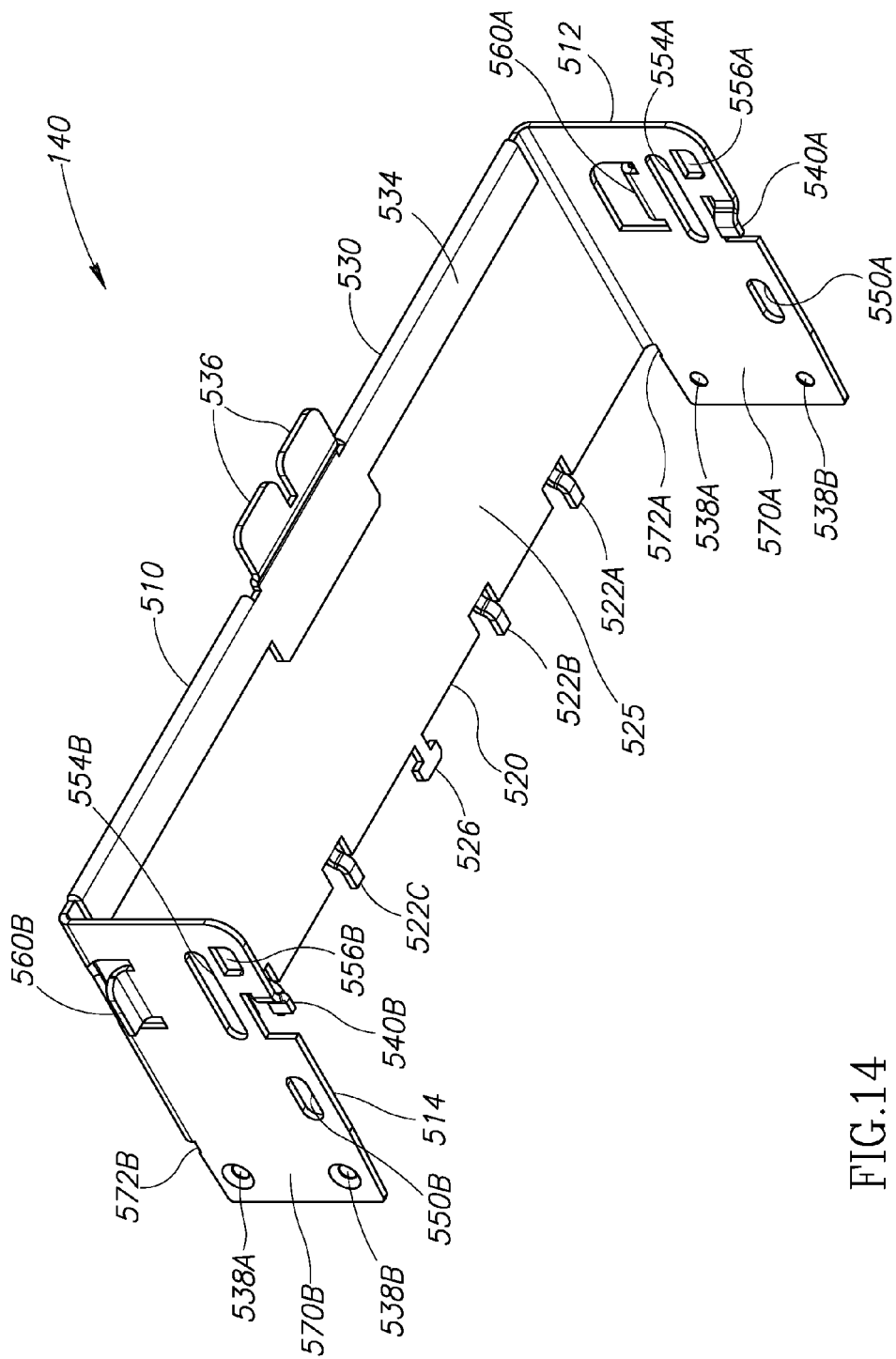
FIG. 14 is an enlarged perspective view of a lower portion of the cover member of FIG. 13.

The upper portion 510 has a rear portion 530 having a recess 532 and at least one pair of rearwardly extending support fingers 536. Turning to FIG. 14, optionally, a stiffener or support portion 534 may be formed along the underside of the rear portion 530.

The first and second side portions 512 and 514 may be mirror images of one another. In the embodiment illustrated, the first and second side portions 512 and 514 each include through-holes 538A and 538B each configured to receive one of the fasteners 170 and allow the fastener to pass therethrough. However, the through-holes 538A and 538B formed in the first side portion 512 are configured not to allow the projections 350A and 350B (see FIGS. 6 and 7), respectively, of the first anchor portion 324 of the bezel member 120 to pass therethrough. Similarly, the through-holes 538A and 538B formed in the second side portion 514 are configured not to allow the projections 350A and 350B (see FIGS. 6 and 7), respectively, of the second anchor portion 326 of the bezel member 120 to pass therethrough.

The first side portion 512 includes a first slot 550A and a second slot 554A. The second side portion 514 includes a first slot 550B and a second slot 554B. As will be explained below, the first slots 550A and 550B and the second slots 554A and 554B help limit and guide the movement of the pull member 150 (see FIG. 2) relative to the cover member 140 (see FIG. 2).

Optionally, the first and second side portions 512 and 514 may include inwardly extending tabs 540A and 540B as well as apertures 556A and 556B that may be used in alternate embodiments such as those described below (e.g., the cassette 1000 illustrated in FIGS. 21 and 22) that are configured for use with fiber optic cables.

The first side portion 512 includes an outwardly projecting flange 560A, and the second side portion 514 includes an outwardly projecting flange 560B. The flanges 560A and 560B may be used to control the vertical placement and alignment of the rearward facing end of the cassette 100 upon insertion into the patch panel 101 (see FIG. 1A), the 4RU patch panel 112 (see FIGS. 1D and 1E), and the like. The flanges 560A and 560B are configured to be received in the slots 68 (see FIGS. 1B and 1C) of the center support 56, the first support 60, the first support bracket 62A, and the second support bracket 62B. The flanges 560A and 560B may help prevent torque on the latched interface caused by the weight of cables "CA" to "CF" when the cables are terminated to the outlet assemblies 110A to 110F, respectively.

In the embodiment illustrated in FIG. 14, a front-most portion 570A of the first side portion 512 and a front-most portion 570B of the second side portion 514 extend forwardly farther than the front portion 520 of the upper portion 510. In such embodiments, the through-holes 538A and 538B may be positioned on each of the front-most portions 570A and 570B of the first and second side portions 512 and 514, respectively. The front-most portion 570A of the first side portion 512 may be received inside the relieved edge portion 342 (see FIG. 6) of the stop wall 340 (see FIG. 6) of the first anchor portion 324 (see FIG. 6). Similarly, the front-most portion 570B of the second side portion 514 may be received inside the relieved edge portion 342 (see FIG. 6) of the stop wall 340 (see FIG. 6) of the second anchor portion 326 (see FIG. 6).

Optionally, the front-most portion 570A of the first side portion 512 includes a notch 572A configured to receive the first overhang portion 330 (see FIG. 6) of the upper rail 320 (see FIG. 6) of the bezel member 120 (see FIG. 6), and the front-most portion 570B of the second side portion 514 includes a notch 570B configured to receive the second overhang portion 332 (see FIG. 6) of the upper rail 320 (see FIG. 6) of the bezel member 120 (see FIG. 6). Thus, the first and second overhang portions 330 and 332 may be seated in the notches 572A and 572B, respectively, to help limit movement of the bezel member 120 relative to the cover member 140.

As mentioned above, the pull member 150 is movably coupled to the bezel member 120.

Pull Member

Figure 15:
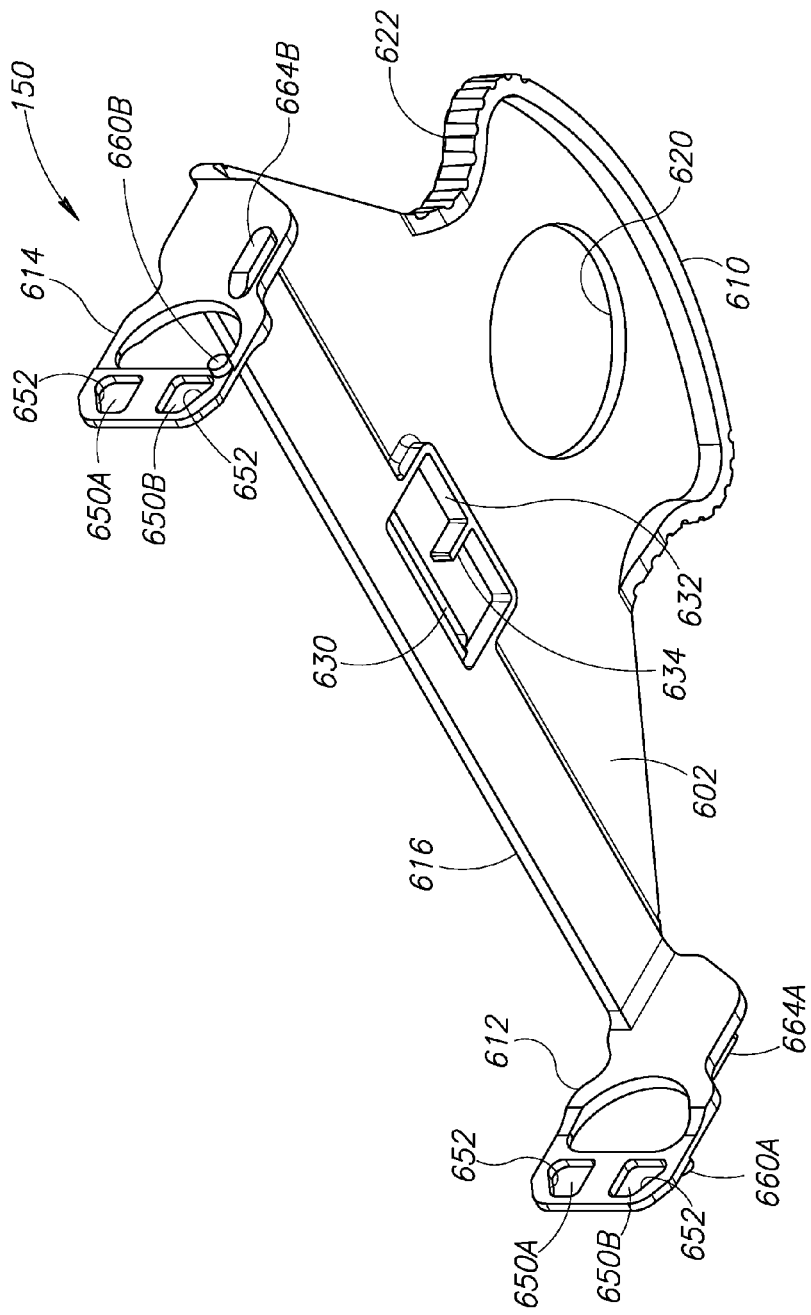
FIG. 15 is an enlarged perspective view of a lower portion of a pull member of the cassette of FIG. 1A.
Figure 16:
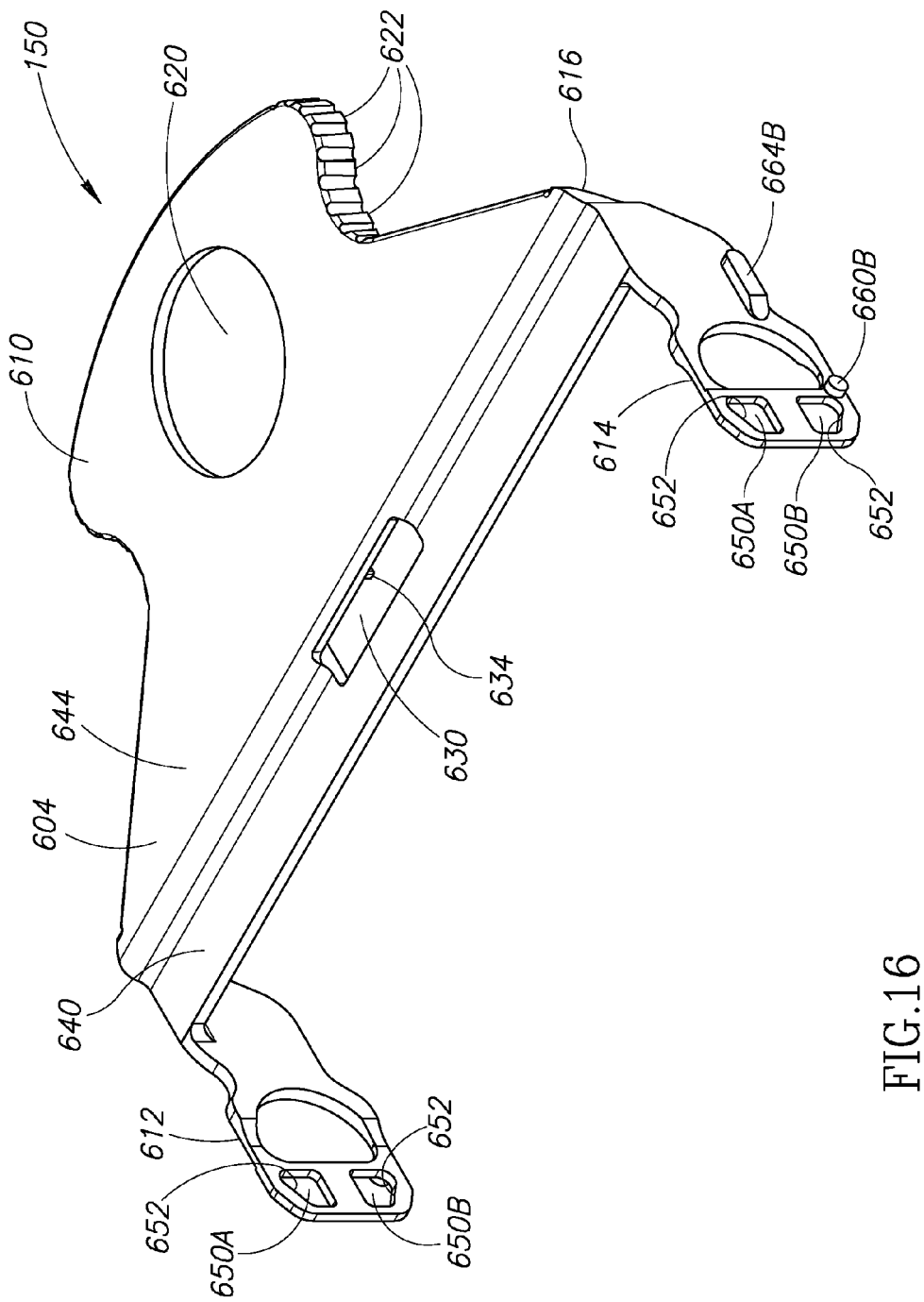
FIG. 16 is an enlarged perspective view of an upper portion of the pull member of FIG. 15.
Figure 17:
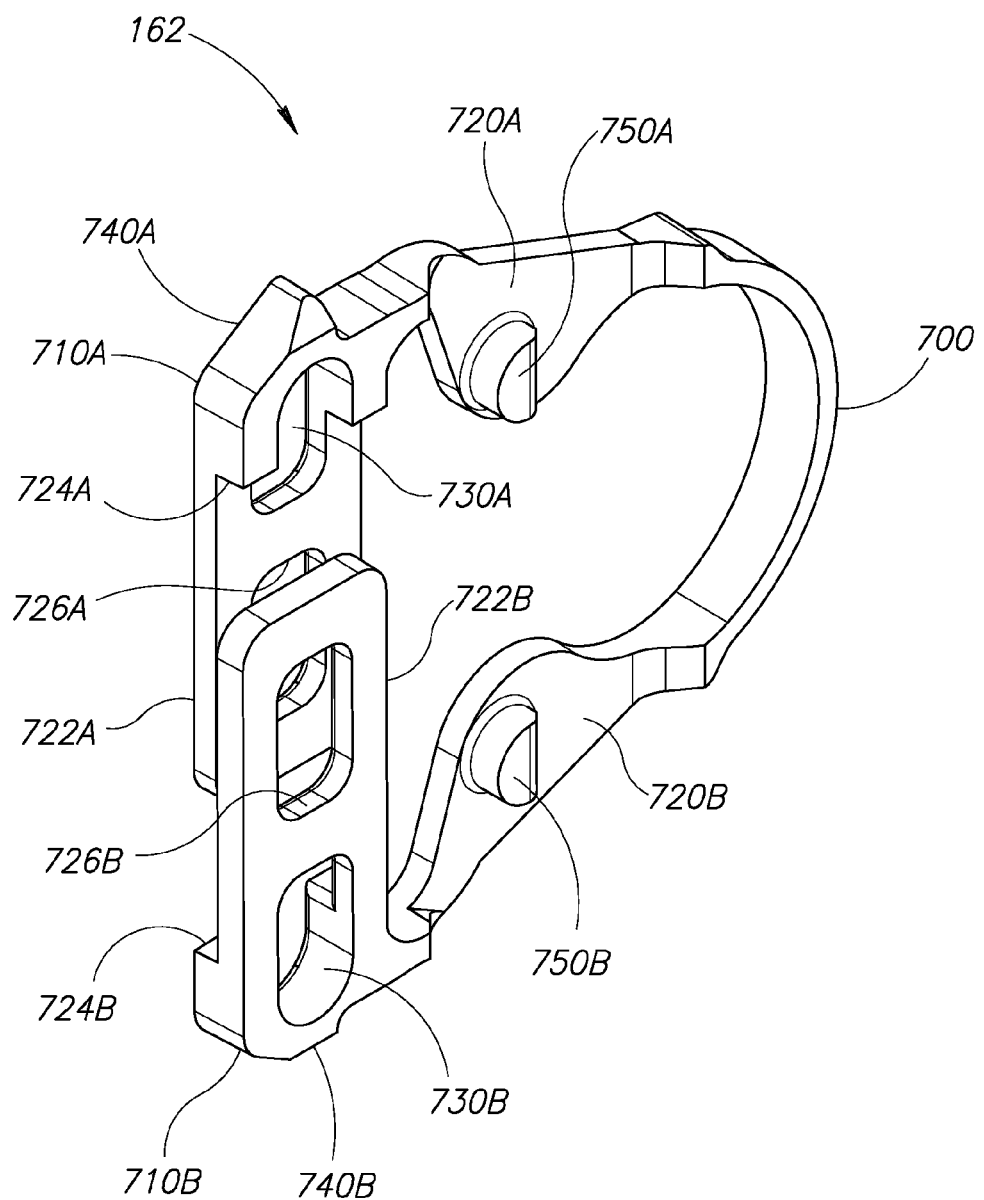
FIG. 17 is an enlarged perspective view of a second latch member of the cassette of FIG. 1A.
Figure 18:
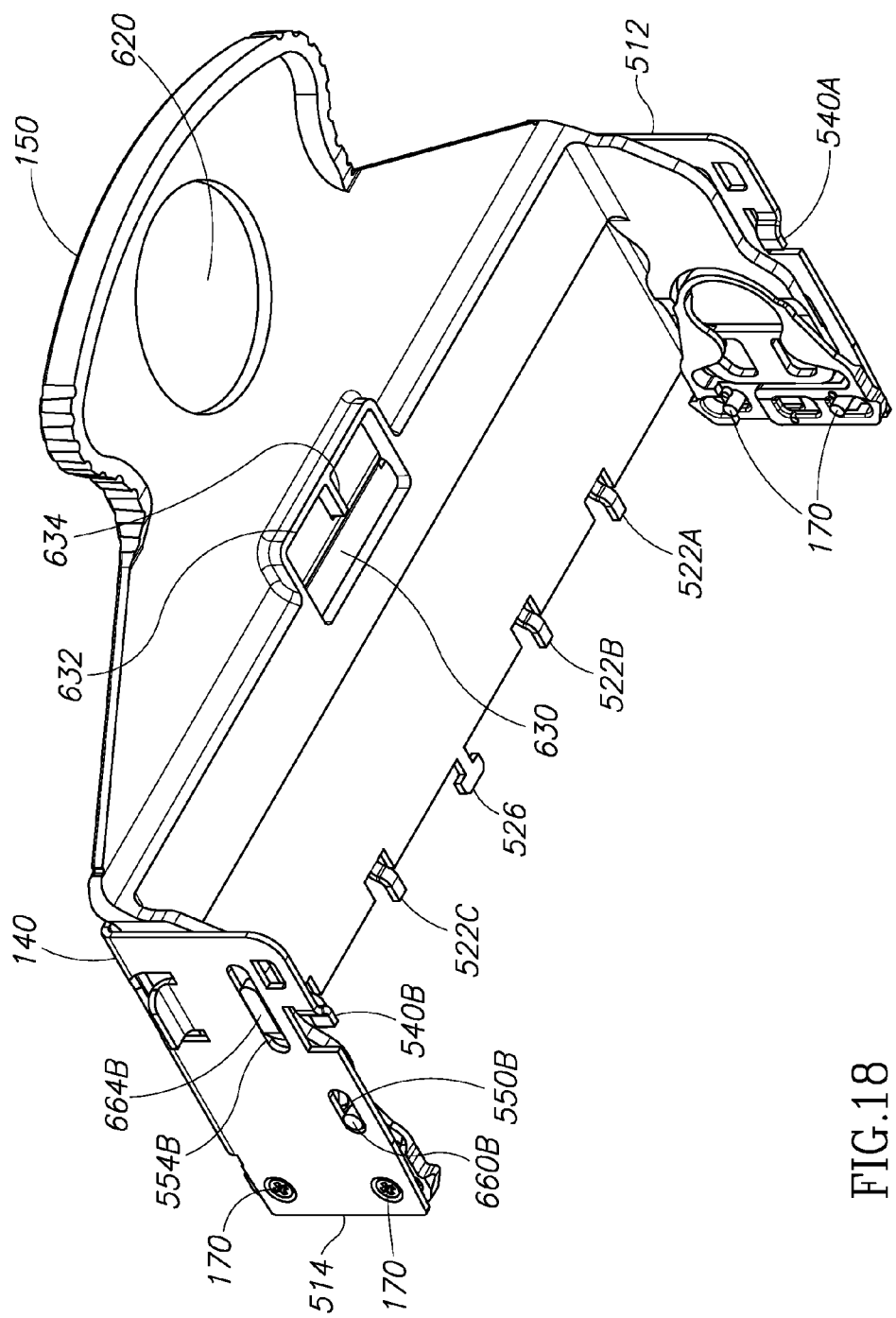
FIG. 18 is an enlarged perspective view of a lower portion of a subassembly including the bezel member, a first latch member, the second latch member, the cover member, the pull member, and fasteners.

FIG. 15 is a perspective view of an underside 602 of the pull member 150, and FIG. 16 is a perspective view of an upper side 604 of the pull member 150. Turning to FIGS. 15 and 16, the pull member 150 has a handle portion 610 connected to first and second arms 612 and 614 by a body portion 616.

The handle portion 610 has an opening 620 configured to receive a user's finger 152 (see FIG. 20), a tool (not shown), and the like. Turning to FIG. 20, once the user's finger 152 or tool has been received inside the opening 620, the user may pull the pull member 150 rearwardly along the direction indicted by arrow "A" to transition the latch mechanism subassembly 190 from the latched configuration (see FIG. 19) to the unlatched configuration (see FIG. 20). The handle portion 610 may optionally have a graspable outer shape, a texture, and/or gripping projections 622 configured to help a user grasp the handle portion 610.

Returning to FIGS. 15 and 16, the body portion 616 has a through-hole 630 configured to receive the rearwardly extending support fingers 536 (see FIGS. 13 and 14) of the cover member 140. The support fingers 536 of the cover member 140 are configured to extend along a portion of the underside 602 (see FIG. 15) of the body portion 616 to help support the pull member 150 and limit its rotation relative to the cover member 140. Turning to FIG. 15, the underside 602 of the body portion 610 may include a stop wall 632 and a divider 634. The stop wall 632 may help limit the rearward movement of the support fingers 536 relative to the pull member 150. The divider 634 may extend between adjacent ones of the support fingers 536 and help prevent rotation of the pull member 150 relative to the cover member 140. Turning to FIG. 16, optionally, the body portion 616 includes a recessed portion 640 configured to be adjacent the rear portion 530 (see FIGS. 13 and 14) of the upper portion 510 of the cover member 140 such that the top surface 516 (see FIG. 13) of the upper portion 510 of the cover member 140 is flush with an upper surface 644 of the body portion 616 of the pull member 150.

The first and second arms 612 and 614 may be mirror images of one another. In the embodiment illustrated, the first and second arms 612 and 614 each include through-holes 650A and 650B. The through-holes 650A and 650B of the first arm 612 are configured to receive the projections 350A and 350B (see FIG. 7), respectively, of the first anchor portion 324 (see FIG. 7) of the bezel member 120 and allow the projections 350A and 350B to pass therethrough. Each of the through-holes 650A and 650B has a tapered inside surface 652. The tapered inside surfaces 652 of the through-holes 650A and 650B are closer to one another toward the front of the cassette 100 and farther away from one another toward the rear (from which the cables "CA" to "CF" extend away from the cassette) of the cassette 100.

The through-holes 650A and 650B of the second arm 614 are configured to receive the projections 350A and 350B (see FIG. 6), respectively, of the second anchor portion 326 (see FIG. 6) and allow the projections 350A and 350B to pass therethrough. Each of the through-holes 650A and 650B has a tapered inside surface 652. The tapered inside surfaces 652 of the through-holes 650A and 650B are closer to one another toward the front of the cassette 100 and farther away from one another toward the rear of the cassette 100.

Turning to FIG. 15, the first arm 612 includes a first projection 660A (e.g., a peg, and the like), and a second projection 664A. The second arm 614 includes a first projection 660B (e.g., a peg, and the like), and a second projection 664B. The first projection 660A (of the first arm 612) is configured to be received inside the first slot 550A (see FIG. 14) of the first side portion 512 (see FIG. 14) of the cover member 140, and the first projection 660B (of the second arm 614) is configured to be received inside the first slot 550B (see FIG. 14) of the second side portion 514 of the cover member 140. The first projections 660A and 660B slide within the first slots 550A and 550B, respectively, when the pull member 150 moves relative to the bezel and cover members 120 and 140.

The second projection 664A (of the first arm 612) is configured to be received inside the second slot 554A (see FIG. 14) of the first side portion 512 (see FIG. 14) of the cover member 140, and the second projection 664B (of the second arm 614) is configured to be received inside the second slot 554B (see FIG. 14) of the second side portion 514 (see FIG. 14) of the cover member 140. The second projections 664A and 664B slide within the second slots 554A and 554B, respectively, when the pull member 150 moves relative to the bezel and cover members 120 and 140.

Engagement between the first projections 660A and 660B and the first slots 550A and 550B (see FIG. 14), respectively, as well as engagement between the second projections 664A and 664B and the second slots 554A and 554B (see FIG. 14), respectively, helps limit the movement of the pull member 150 relative to the bezel and cover members 120 and 140 along a substantially linear path.

Referring to FIG. 10, as mentioned above, the pull member 150 is movably coupled to the bezel member 120 by the first and second latch members 160 and 162.

Latch Members

In the embodiment illustrated in FIGS. 11 and 17-20, the first and second latch members 160 and 162 are substantially identical to one another. However, this is not a requirement and embodiments may be constructed in which the first latch member 160 differs structurally (or otherwise) from the second latch member 162.

For ease of illustration, the second latch member 162 will be described below. However, as is appreciated by those of ordinary skill in the art, the first latch member 160 may be substantially identical to the second latch member 162. Further, in embodiments in which the first and second latch members 160 and 162 are substantially identical, the first latch member 160 may be rotated 180 degrees relative to the second latch member 162 when the cassette 100 is assembled. Thus, the first and second latch members 160 and 162 may be symmetric about a central axis extending between first and second end portions 710A and 710B (see FIG. 17).

Each of the first and second latch members 160 and 162 includes a biasing portion 700 connected to the first end portion 710A by a first intermediate portion 720A and the second end portion 710B by a second intermediate portion 720B.

The biasing portion 700 is configured to bias the first end portion 710A away from the second end portion 710B. The first and second end portions 710A and 710B extend inwardly toward one another. In the embodiment illustrated, a free end portion 722A of the first end portion 710A extends alongside (or overlaps) a free end portion 722B of the second end portion 710B. Further, the first end portion 710A has a stop portion 724A configured to limit the travel of the free end portion 722B of the second end portion 710B toward the first end portion 710A. Similarly, the second end portion 710B has a stop portion 724B configured to limit the travel of the free end portion 722A of the first end portion 710A toward the second end portion 710B.

The free end portion 722A includes a slot 726A at least partially aligned or juxtaposed with a corresponding slot 726B of the free end portion 722B. The aligned slots 726A and 726B of the second latch member 162 are configured to receive the guide projection 370 (see FIG. 6) of the second anchor portion 326 (see FIG. 6) of the bezel member 120. Similarly, the slots 726A and 726B (see FIG. 19) of the first latch member 160 are configured to receive the guide projection 370 (see FIG. 7) of the first anchor portion 324 (see FIG. 7) of the bezel member 120.

The first end portion 710A of the second latch member 162 has a through-slot 730A configured to allow the projection 350A (see FIG. 6) of the second anchor portion 326 (see FIG. 6) of the bezel member 120 to pass therethrough. The first end portion 710A of the second latch member 162 also has an outwardly extending tab 740A. As may be viewed in FIG. 19, the outwardly extending tab 740A of the second latch member 162 is the tab "T2" of the cassette 100 (see FIGS. 1-3). Thus, the tab 740A of the second latch member 162 is configured to engage the aperture 105 (see FIG. 1A) in the patch panel 101 (see FIG. 1A) when the cassette 100 is received between the flanges "FL1" and "FL2." The tab 740A of the second latch member 162 is also configured to engage the aperture 107 (see FIG. 1A) in the patch panel 101 (see FIG. 1A) when the cassette 100 is received between the flanges "FL2" and "FL3."

The through-slot 730A is configured to allow the first end portion 710A to slide along the projection 350A (see FIG. 6) of the second anchor portion 326 (see FIG. 6) of the bezel member 120 to position the tab 740A relative to the aperture 105 (see FIG. 1A) or the aperture 107 (see FIG. 1A). Similarly, referring to FIG. 19, the through-slot 730A of the first latch member 160 (which is rotated 180 degrees relative to the second latch member 162) is configured to allow the first end portion 710A to slide along the projection 350B (see FIG. 7) of the first anchor portion 324 (see FIG. 7) of the bezel member 120 to position the tab 740A (which is the tab "T3" of the cassette 100 illustrated in FIG. 1A) relative to the aperture 106 (see FIG. 1A) when the cassette 100 is received between the flanges "FL1" and "FL2," and relative to the aperture 108 (see FIG. 1A) when the cassette 100 is received between the flanges "FL2" and "FL3."

Returning to FIG. 17, the second end portion 710B of the second latch member 162 has a through-slot 730B configured to allow the projection 350B (see FIG. 6) of the second anchor portion 326 (see FIG. 6) of the bezel member 120 to pass therethrough. The second end portion 710B of the second latch member 162 also has an outwardly extending tab 740B. As may be viewed in FIG. 19, the tab 740B of the second latch member 162 is the tab "T4" (see FIG. 3) of the cassette 100 (see FIG. 3). The tab 740B of the second latch member 162 is configured to engage the aperture 107 (see FIG. 1A) in the patch panel 101 (see FIG. 1A) when the cassette 100 is received between the flanges "FL1" and "FL2," and to engage the aperture 109 (see FIG. 1A) when the cassette 100 is received between the flanges "FL2" and "FL3."

The through-slot 730B is configured to allow the second end portion 710B to slide along the projection 350B (see FIG. 6) of the second anchor portion 326 (see FIG. 6) of the bezel member 120 to position the tab 740B of the second latch member 162 relative to the aperture 107 (see FIG. 1A) or the aperture 109 (see FIG. 1A). Similarly, the through-slot 730B of the first latch member 160 (which is rotated 180 degrees relative to the second latch member 162) is configured to allow the second end portion 710B to slide along the projection 350A (see FIG. 7) of the first anchor portion 324 (see FIG. 7) of the bezel member 120 to position the tab 740B (which is the tab "T1" of the cassette 100 illustrated in FIGS. 1-3) relative to the aperture 104 (see FIG. 1A) when the cassette 100 is received between the flanges "FL1" and "FL2," and relative to the aperture 106 (see FIG. 1A) when the cassette 100 is received between the flanges "FL2" and "FL3."

A lubricant (e.g., grease) may be disposed on the projections, 350A, 350B, and 370 (see FIG. 6) of the first and second anchor portions 324 and 326 (see FIGS. 6 and 7) of the bezel member 120 to help facilitate the sliding described above.

Returning to FIG. 17, the first intermediate portion 720A includes a first projection 750A (e.g., a peg, and the like) and the second intermediate portion 720B includes a second projection 750B (e.g., a peg, and the like). The first and second projections 750A and 750B are generally cylindrical in shape and tapered toward the biasing portion 700.

In the embodiment illustrated, the first and second projections 750A and 750B are substantially identical to one another. However, this is not a requirement. The first and second projections 750A and 750B of the second latch member 162 are configured to be received inside the through-holes 650A and 650B (see FIGS. 15 and 16), respectively, of the second arm 614 (see FIGS. 15 and 16) of the pull member 150, and when received therein, to slide along their tapered inside surfaces 652 (see FIGS. 15 and 16). As may be viewed in FIG. 19, the second and first projections 750B and 750A of the first latch member 160 are configured to be received inside the through-holes 650A and 650B, respectively, of the first arm 612 of the pull member 150, and when received therein, to slide along their tapered inside surfaces 652 (see FIGS. 15 and 16).

If the cassette 100 is positioned between the flanges "FL1" and "FL2," when the pull member 150 moves rearwardly along the direction indicated by the arrow "A," the first and second projections 750A and 750B (see FIG. 17) of the second latch member 162 bear against the tapered inside surfaces 652 (see FIGS. 15 and 16) of the second arm 614, pushing the first and second end portions 710A and 710B (which slide along the projections 350A and 350B, respectively, of the bezel member 120 illustrated in FIG. 6) closer together, and moving the first and second projections 740A and 740B (which are the tabs "T2" and "T4" of the cassette 100) inwardly thereby retracting the tabs from the apertures 105 and 107 (see FIG. 1A), respectively, of the patch panel 101 (see FIG. 1A). On the other hand, if the cassette 100 is positioned between the flanges "FL2" and "FL3," when the pull member 150 moves rearwardly along the direction indicated by the arrow "A," the first and second projections 740A and 740B (which are the tabs "T2" and "T4" of the cassette 100) are retracted from the apertures 107 and 109 (see FIG. 1A), respectively, of the patch panel 101 (see FIG. 1A).

Similarly, if the cassette 100 is positioned between the flanges "FL1" and "FL2," when the pull member 150 moves rearwardly along the direction indicated by the arrow "A," the second and first projections 750B and 750A of the first latch member 160 bear against the tapered inside surfaces 652 (see FIGS. 15 and 16) of the through-holes 650A and 650B, respectively, of the first arm 612, pushing the second and first end portions 710B and 710A (which slide along the projections 350A and 350B, respectively) closer together, and moving the second and first projections 740B and 740A (which are the tabs "T1" and "T3" of the cassette 100) inwardly thereby retracting the tabs from the apertures 104 and 106, respectively, of the patch panel 101 (see FIG. 1A). On the other hand, if the cassette 100 is positioned between the flanges "FL2" and "FL3," when the pull member 150 moves rearwardly along the direction indicated by the arrow "A," the second and first projections 740B and 740A (which are the tabs "T1" and "T3" of the cassette 100) are retracted from the apertures 106 and 108 (see FIG. 1A), respectively, of the patch panel 101 (see FIG. 1A).

Conversely, if the cassette 100 is positioned between the flanges "FL1" and "FL2," when the pull member 150 moves forwardly along the direction indicated by the arrow "B," the first and second projections 750A and 750B of the second latch member 162 slide along the tapered inside surfaces 652 (see FIGS. 15 and 16) of the second arm 614, allowing the biasing portion 700 to bias the first and second end portions 710A and 710B (which slide along the projections 350A and 350B, respectively, of the bezel member 120) further apart, and moving the first and second projections 740A and 740B outwardly and if desired, inserting the tabs into the apertures 105 and 107 (see FIG. 1A), respectively, of the patch panel 101 (see FIG. 1A). On the other hand, if the cassette 100 is positioned between the flanges "FL2" and "FL3," when the pull member 150 moves forwardly along the direction indicated by the arrow "B," the first and second projections 740A and 740B (which are the tabs "T2" and "T4" of the cassette 100) may be inserted into the apertures 107 and 109 (see FIG. 1A), respectively, of the patch panel 101 (see FIG. 1A).

Similarly, when the pull member 150 moves forwardly along the direction indicated by the arrow "B," the second and first projections 750B and 750A of the first latch member 160 slide along the tapered inside surfaces 652 (see FIGS. 15 and 16) of the first arm 612, allowing the biasing portion 700 to bias the second and first end portions 710B and 710A (which slide along the projections 350A and 350B, respectively, of the bezel member 120) further apart, and moving the second and first projections 740B and 740A outwardly and if desired, inserting the tabs into the apertures 104 and 106, respectively, of the patch panel 101 (see FIG. 1A). On the other hand, if the cassette 100 is positioned between the flanges "FL2" and "FL3," when the pull member 150 moves forwardly along the direction indicated by the arrow "B," the second and first projections 740B and 740A (which are the tabs "T1" and "T3" of the cassette 100) may be inserted into the apertures 106 and 108 (see FIG. 1A), respectively, of the patch panel 101 (see FIG. 1A).

Turning to FIG. 2, the cassette 100 may be configured to provide improved shielding for reducing alien crosstalk (interference between adjacent ones of the outlet assemblies 110) compared to prior art cassettes. In particular, the side-to-side shielding projections 310A-310E (see FIG. 6) may be configured to reduce crosstalk between the outlet assemblies 110. Further, the bezel member 120 may be constructed using die cast metal instead of plastic to improve the strength of the cassette 100. The cover member 140 may be constructed from cold-rolled steel to provide a thinner wall across the top than can be achieved with die cast materials. The pull member 150 may also not be die cast. The flexibility of the pull member 150 may be achieved by manufacturing the pull member 150 from a less rigid material such as, by way of non-limiting example, glass-filled nylon and the like. The latch mechanism subassembly 190 (see FIGS. 19 and 20) of the cassette 100 allows the cassette to be easily mounted to and removed from a rack-mounted patch panel (e.g., the patch panel 101). The latch mechanism subassembly 190 may be configured such that a user may release the cassette 100 from the patch panel 101 by pulling on the pull member 150 with the user's finger 152 (see FIG. 20), a tool (not shown), and the like.

Alternate Embodiment

FIGS. 21 and 22 depict a cassette 1000 that is an alternate embodiment of the cassette 100 illustrated in FIGS. 1A, 2, 3, and 6-20. For ease of illustration, reference numbers identical to those used in FIGS. 1A, 2, 3, and 6-20 with respect to the cassette 100 have been used in FIGS. 21-23 to identify like components of a cassette 1000.

The cassette 1000 may be configured for use with fiber optic cables as opposed to cables having metal wires (e.g., copper wire). The embodiment of the cassette 1000 illustrated is configured for use with a patch panel (e.g., the patch panel 101 depicted in FIG. 1A, the 4RU patch panel 112 depicted in FIGS. 1D and 1E, and the like), a cable 1102 including multiple optical fibers (not shown) terminated by a connector (not shown) that may be connected to a conventional multi-fiber connector 1160 (see FIG. 22), and one or more conventional fiber optic connectors (not shown) that may each be connected to at least one of a plurality of conventional fiber optic adapter or connector assemblies 1110 and each terminate a cable (not shown). The cassette 1000 may be configured for use with 12 optical fibers.

Like the cassette 100 illustrated in the FIG. 1A, the cassette 1000 is receivable between the flanges "FL1" and "FL2" or the flanges "FL2" and "FL3" of a selected one of the vertically adjacent pairs of patching areas of the patch panel 101. The cassette 1000 includes the tabs "T1" to "T4" for selective insertion into the apertures 104-107, respectively, of the selected one of the vertically adjacent pairs of patching areas of the patch panel 101 (see FIG. 1A). Alternatively, the tabs "T1" to "T4" may be inserted into the apertures 106-109, respectively, of the selected one of the vertically adjacent pairs of patching areas of the patch panel 101 (see FIG. 1A). The cassette 1000 may be configured to be mounted inside the patch panel 101, the 4RU patch panel 112 (see FIGS. 1D and 1E), a generally planar patch panel (not shown), and the like. Engagement of the tabs "T1" to "T4" with the apertures 104, 105, 106, and 107, respectively, maintains the cassette 1000 inside the patch panel 101 between the flanges "FL1" and "FL2" of the selected one of the vertically adjacent pairs of patching areas of the patch panel 101. Alternatively, engagement of the tabs "T1" to "T4" with the apertures 106, 107, 108, and 109, respectively, maintains the cassette 1000 inside the patch panel 101 between the flanges "FL2" and "FL3" of the selected one of the vertically adjacent pairs of patching areas of the patch panel 101. When the tabs "T1" to "T4" are retracted, the cassette 1000 may be removed from the patch panel 101.

A pair of cassettes like the cassette 1000 are mountable inside a vertically adjacent pair of patching areas PA1-PA8 (see FIG. 42). For example, FIGS. 29 and 30 illustrate cassettes 1000A and 1000B, which are each substantially identical to the cassette 1000. The cassettes 1000A and 1000B are illustrated mounted in the vertically adjacent pair of the patching areas PA5 and PA6 (see FIG. 42). Thus, engagement of the tabs "T1" to "T4" of the cassette 1000A with the apertures 104, 105, 106, and 107, respectively, of the patching area PA5 (see FIG. 42) maintains the cassette 1000A inside the patch panel 101 between the flanges "FL1" and "FL2." Engagement of the tabs "T1" to "T4" with the apertures 106, 107, 108, and 109, respectively, of the patching area PA6 (see FIG. 42) maintains the cassette 1000B inside the patch panel 101 between the flanges "FL2" and "FL3." The middle flange "FL2" (see FIG. 1A) may be configured (e.g., have sufficient thickness) such that the top cassette 1000A and the bottom cassette 1000B may share apertures 106 and 107 at the same time. While the cassettes 1000A and 1000B are illustrated mounted in the vertically adjacent pair of the patching areas PA5 and PA6, the cassettes 1000A and 1000B may be mounted in any of the other vertically adjacent pairs of the patching areas (e.g., the pair of patching areas PA1 and PA2, the pair of patching areas PA3 and PA4, and the pair of patching areas PA7 and PA8). For example, cassettes 1000C and 1000D, which are each substantially identical to the cassette 1000, are illustrated mounted in the vertically adjacent pair of the patching areas PA7 and PA8.

The cassette 1000 includes the plurality of conventional fiber optic adapter or connector assemblies 1110, an upper cassette housing member 1120, a lower housing member 1140, fasteners 1150 (see FIG. 22), the cover member 140, the pull member 150, the first latch member 160, the second latch member 162, the conventional multi-fiber connector 1160 (see FIG. 22), and a moveable housing member 1170 (see FIG. 22). Together the upper cassette housing member 1120, the lower housing member 1140, the cover member 140, the moveable housing member 1170, and the fasteners 1150 may be characterized as forming a housing subassembly 1180 for the connector assemblies 1110 and the multi-fiber connector 1160. Inside the housing subassembly 1180, one or more fibers (not shown) fan-out from the multi-fiber connector 1160 to each of the connector assemblies 1110 as would be understood by those of ordinary skill in the art. As in the cassette 100, the pull member 150, the first latch member 160, and the second latch member 162 of the cassette 1000 form the latch mechanism subassembly 190. The latch mechanism subassembly 190 is connected to the housing subassembly 1180 but is moveable relative thereto.

The embodiment of the cassette 1000 illustrated is configured to reduce bends and stress imposed on the optic fiber cable 1102 to thereby maintain bend radius control for optical fibers. Referring to FIG. 29, the cassettes 1000A-1000D, which are each substantially identical to the cassette 1000, are illustrated installed in the angled patch panel 101 alongside the cassettes 100A and 100B, which are each substantially identical to the cassette 100 (see FIGS. 1A, 2, and 3). Thus, the patch panel 101 may be used for mixed transmission media (e.g., concurrent use of copper connectors and fiber optic connectors). The multi-fiber connector 1160 and the moveable housing member 1170 of the cassette 1000B are illustrated in a rotated position relative to the housing subassembly 1180 (see FIG. 21). By adjusting the exit angle (or direction) of the multi-fiber connector 1160 relative to the angled patch panel 101, the multi-fiber connector 1160 may be positioned orthogonally to the front face of the portion of the patch panel 101 to which the cassette 1000 is mounted (or the rack 1600 (see FIG. 30) in which the patch panel is mounted) regardless of where the cassette is installed in the patch panel.

Turning to FIG. 21, the connector assemblies 1110 are mounted inside the upper cassette housing member 1120 of the housing subassembly 1180. By way of a non-limiting example, the connector assemblies 1110 may be implemented as snap-in outlets (or adapters) snapped into the upper cassette housing member 1120. Referring to FIG. 22, the upper cassette housing member 1120 is coupled to the lower housing member 1140 by the fasteners 1150. The fasteners 1150 may be implemented using bolts, screws, adhesives, and the like. The moveable housing member 1170 is positioned between and slidable relative to the upper cassette housing member 1120 and the lower housing member 1140 along a curved path of motion indicated by double-headed arrow "D." The multi-fiber connector 1160 is mounted in the moveable housing member 1170 and is slidable therewith as a unit relative to the upper cassette housing member 1120 and the lower housing member 1140. The pull member 150 is movably coupled to the upper cassette housing member 1120 by the first and second latch members 160 and 162. The pull member 150 is slideable relative to the housing subassembly 1180 in directions identified by arrows "A" and "B."

As mentioned above, in addition to the cover member 140, the pull member 150, the first latch member 160, and the second latch member 162, the cassette 1000 includes the connector assemblies 1110, the upper cassette housing member 1120, the lower housing member 1140, the fasteners 1150, the conventional multi-fiber connector 1160, and the moveable housing member 1170.

Connector Assemblies

The cassette 1000 is not limited for use with any particular type of connector assembly or number of connector assemblies. In the embodiment illustrated, the connector assemblies 1110 include six connector assemblies 1110A-1110F. The connector assemblies 1110 may be implemented using any type of optical fiber connector configured to terminate one or more optical fibers. Examples of suitable connectors include snap-in connectors (e.g., Lucent Connector ("LC") and Standard or Subscriber Connector ("SC")), and the like.

Upper Cassette Housing Member

Figure 23:
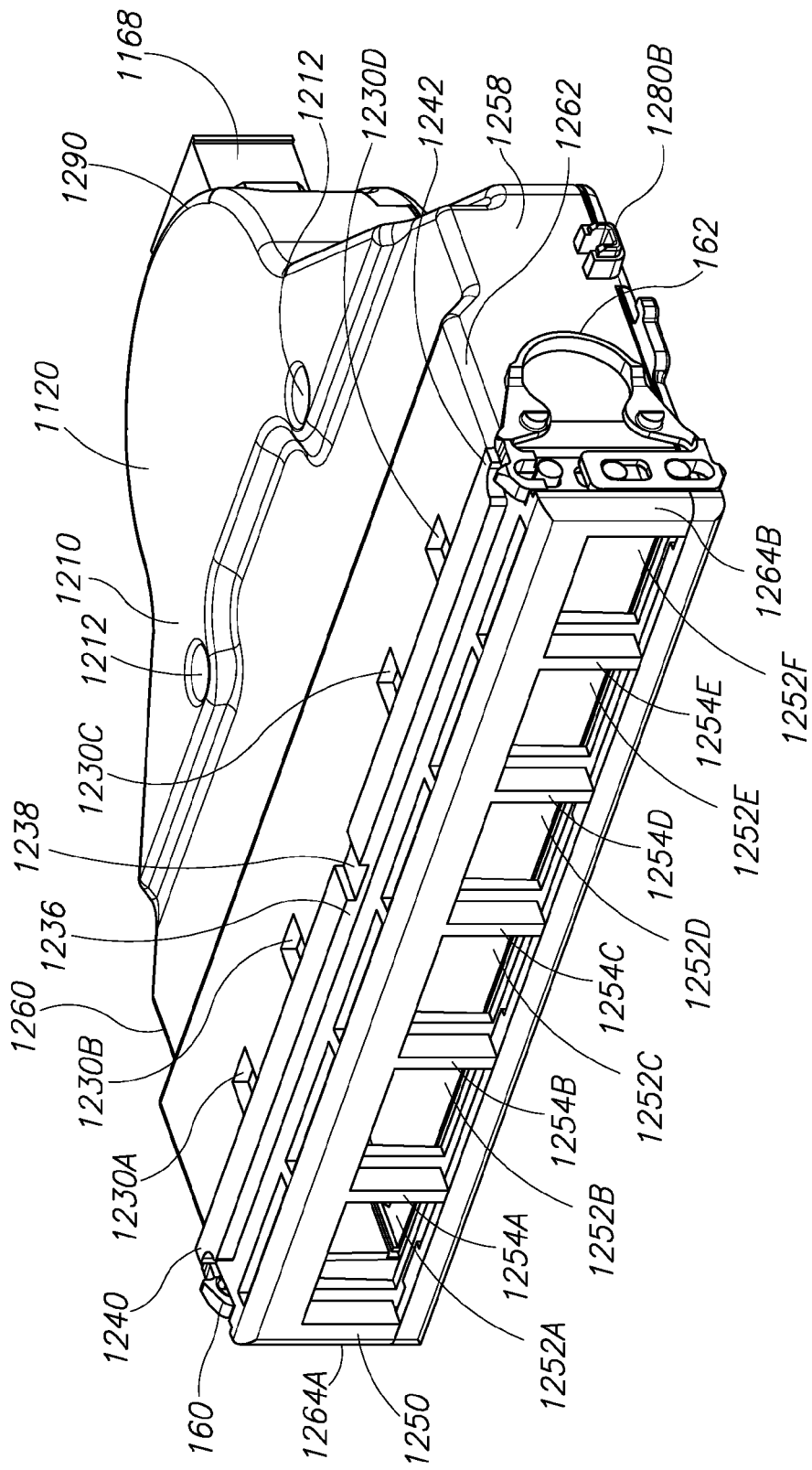
FIG. 23 is a perspective view of the cassette of FIG. 21 omitting the plurality of fiber optic connector assemblies, the cover member, the pull member, and fasteners.

Turning to FIG. 23, the cover member 140, the pull member 150, and the connector assemblies 1110 have been omitted to provide a better view of other components of the cassette 1000. The upper cassette housing member 1120 has an upper portion 1210 contoured to be positioned under the pull member 150 (see FIG. 21) and between the first and second arms 612 and 614 (see FIGS. 15 and 16) of the pull member. The upper portion 1210 has an aperture 1212 for each of the fasteners 1150 (see FIG. 22) formed therein. In the embodiment illustrated, the upper portion 1210 of the upper cassette housing member 1120 includes recesses 1230A to 1230D for the forwardly projecting tabs 522A to 522D (see FIG. 13), respectively, of the cover member 140. As may be viewed in FIG. 25, adjacent the recesses 1230A to 1230D, the upper cassette housing member 1120 has through-holes 1232A to 1232D, respectively, for receiving the forwardly projecting tabs 522A to 522D (see FIG. 13), respectively, of the cover member 140. Returning to FIG. 23, the upper portion 1210 includes an upwardly extending wall 1236 having a transverse channel 1238 formed therein. The transverse channel 1238 is configured to receive at least a portion of the projection 526 (see FIG. 13) of the cover member 140. The upwardly extending wall 1236 has a first outwardly extending end portion 1240 opposite a second outwardly extending end portion 1242. The first outwardly extending end portion 1240 is substantially similar in structure to the first overhang portion 330 (see FIGS. 6 and 7) of the upper rail 302 of the bezel member 120 and is configured to be seated in the notch 572A (see FIG. 14) formed in the front-most portion 570A (see FIG. 14) of the first side portion 512 (see FIG. 14) of the cover member 140. The second outwardly extending end portion 1242 is substantially similar in structure to the second overhang portion 332 (see FIGS. 6 and 7) of the upper rail 302 of the bezel member 120 and is configured to be seated in the notch 572B (see FIG. 14) formed in the front-most portion 570B (see FIG. 14) of the second side portion 514 (see FIG. 14) of the cover member 140.

The upper cassette housing member 1120 has a front portion 1250 with openings 1252A to 1252F for receiving the connector assemblies 1110A-1110F (see FIGS. 21 and 22), respectively. The front portion 1250 includes a rib or divider that extends between each adjacent pair of the connector assemblies 1110. In the embodiment illustrated, the front portion 1250 includes dividers 1254A-1254E. The divider 1254A is positioned between the opening 1252A (for the connector assembly 1110A) and the opening 1252B (for the connector assembly 1110B). The divider 1254B is positioned between the opening 1252B (for the connector assembly 1110B) and the opening 1252C (for the connector assembly 1110C). The divider 1254C is positioned between the opening 1252C (for the connector assembly 1110C) and the opening 1252D (for the connector assembly 1110D). The divider 1254D is positioned between the opening 1252D (for the connector assembly 1110D) and the opening 1252E (for the connector assembly 1110E). The divider 1254E is positioned between the opening 1252E (for the connector assembly 1110E) and the opening 1252F (for the connector assembly 1110F).

A sidewall 1258 extends downwardly from the upper portion 1210 along a first side portion 1260, a second side portion 1262, and a rear portion 1290 of the upper cassette housing member 1120. At the first side portion 1260, a stop wall 1264A is positioned at the intersection of the sidewall 1258 and the front portion 1250. At the second side portion 1262, a stop wall 1264B is positioned at the intersection of the sidewall 1258 and the front portion 1250. The stop wall 1264A is substantially identical to the stop wall 340 (see FIGS. 6 and 7) of the first anchor portion 324 (see FIGS. 6 and 7) of the bezel member 120. The stop wall 1264B is substantially identical to the stop wall 340 (see FIGS. 6 and 7) of the second anchor portion 326 (see FIGS. 6 and 7) of the bezel member 120.

Figure 37:
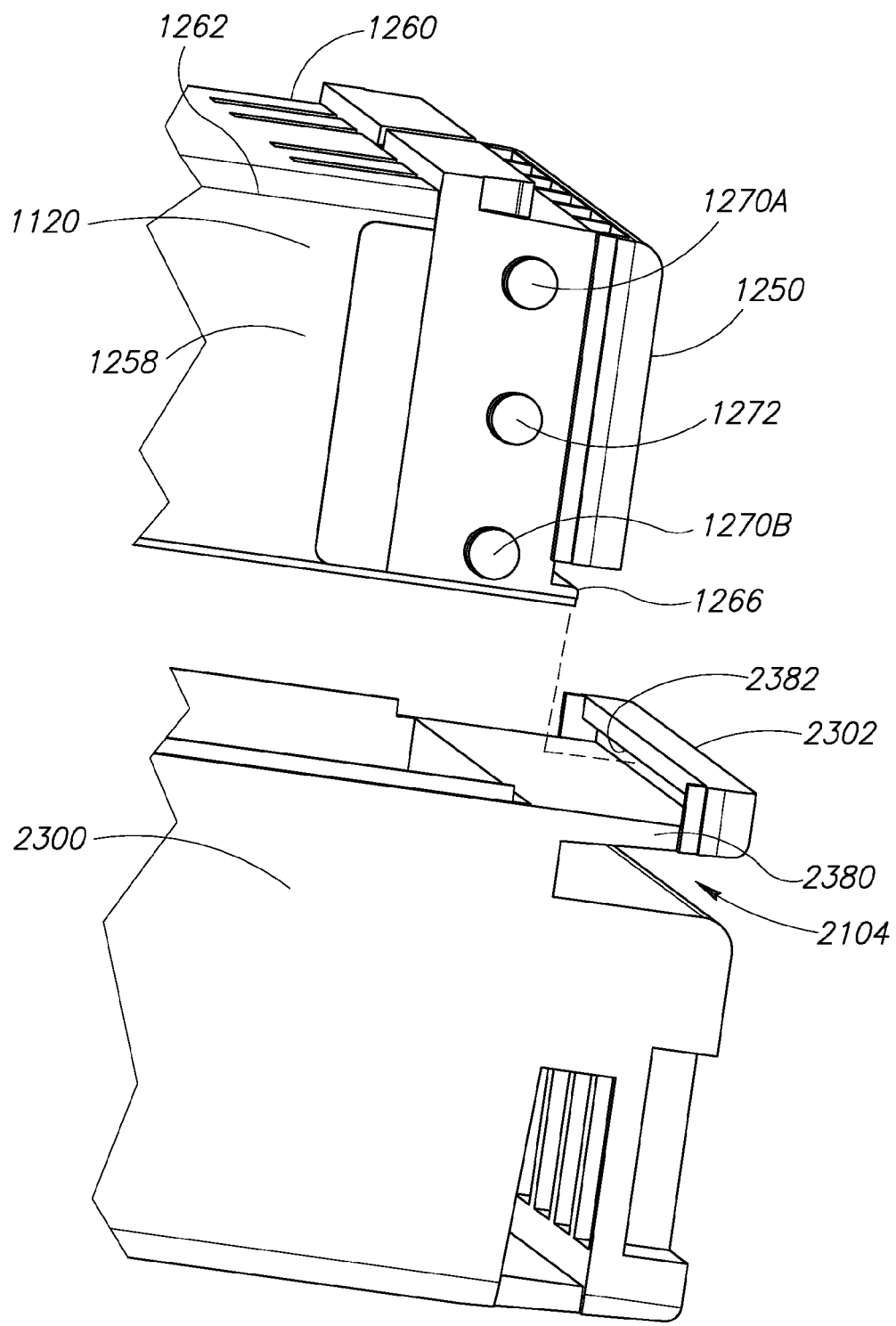
FIG. 37 is an enlarged exploded view of the upper and lower cassette housing members of the cassette of FIG. 31.

Referring to FIG. 37, a forwardly extending projection 1266 is positioned behind the front portion 1250. The projection 1266 is connected to the lower edge of the sidewall 1258 at the first and second side portions 1260 and 1262, and extends therebetween.

Figure 25:
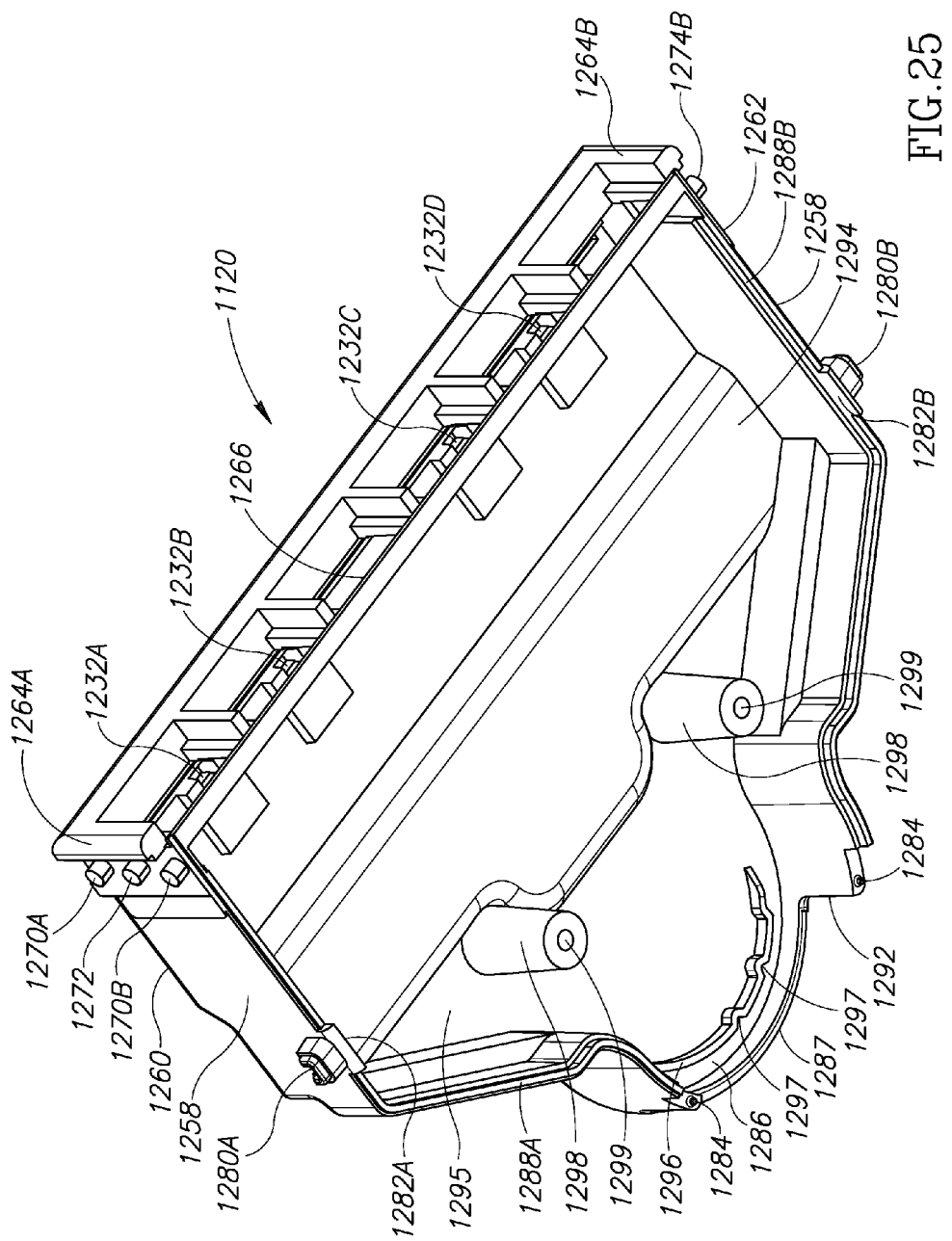
FIG. 25 is a second enlarged perspective view of the lower portion of the upper cassette housing member of the cassette of FIG. 21.

Turning to FIG. 25, along the first side portion 1260, the sidewall 1258 includes projections 1270A and 1270B substantially identical to the projections 350A and 350B (see FIG. 7), respectively, of the first anchor portion 324 (see FIG. 7) of the bezel member 120. Optionally, the projections 1270A and 1270B may include apertures (not shown) substantially identical to the apertures 360 (see FIG. 7) of the projections 350A and 350B, respectively. However, this is not a requirement. Further, the sidewall 1258 includes an outwardly extending projection 1272 substantially identical to the projection 370 (see FIG. 7) of the first anchor portion 324 (see FIG. 7) of the bezel member 120.

Figure 24:
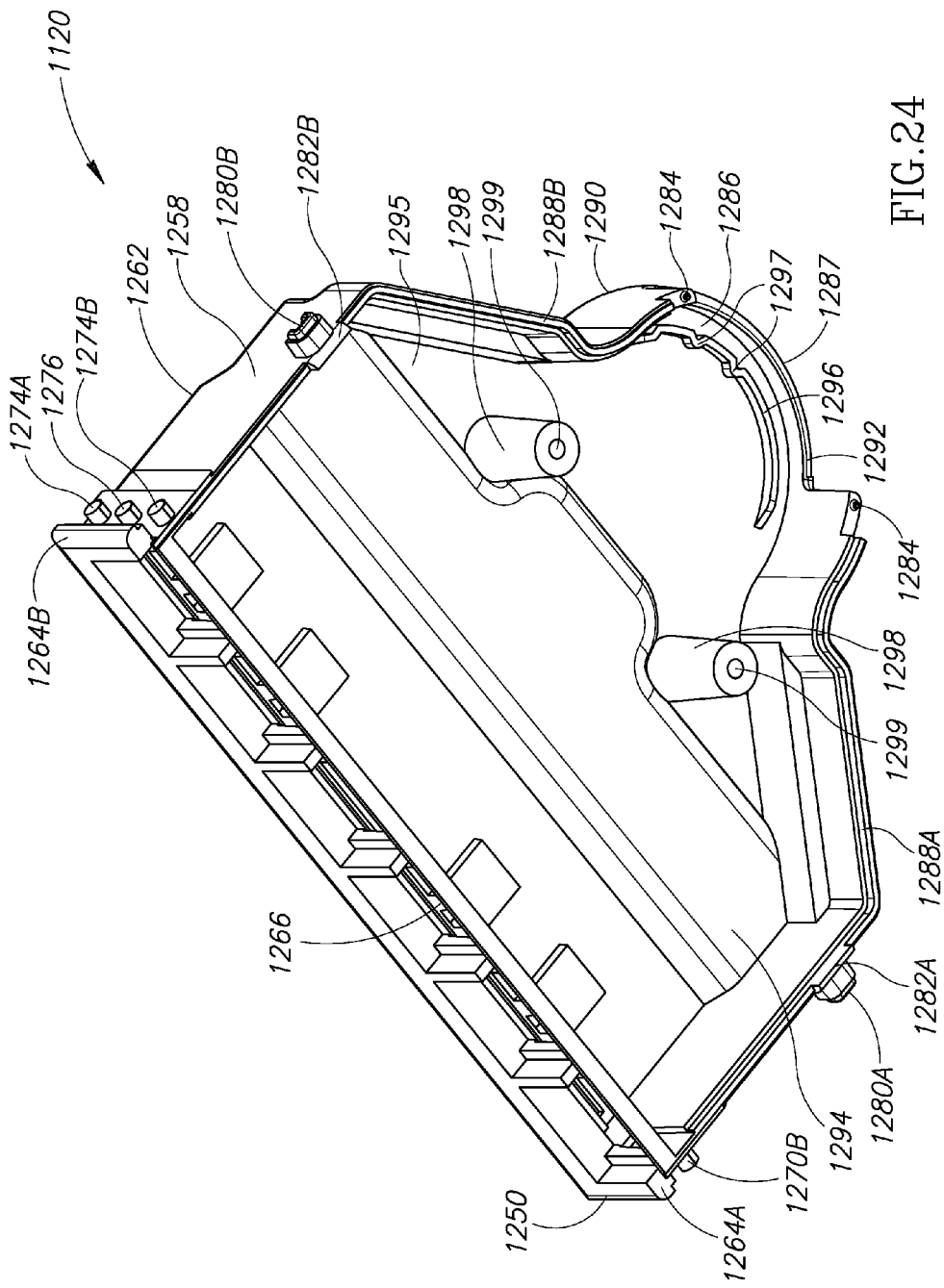
FIG. 24 is an enlarged perspective view of a lower portion of an upper cassette housing member of the cassette of FIG. 21.

Turning to FIG. 24, along the second side portion 1262, the sidewall 1258 includes projections 1274A and 1274B substantially identical to the projections 350A and 350B (see FIG. 6), respectively, of the second anchor portion 326 (see FIG. 6) of the bezel member 120. Optionally, the projections 1274A and 1274B may include apertures (not shown) substantially identical to the apertures 360 (see FIG. 6) of the projections 350A and 350B, respectively. However, this is not a requirement. Further, the second side portion 1262 includes an outwardly extending projection 1276 substantially identical to the projection 370 (see FIG. 6) of the second anchor portion 326 (see FIG. 6) of the bezel member 120.

The sidewall 1258 includes an outwardly extending projection 1280A along the first side portion 1260 (see FIG. 25) and an outwardly extending projection 1280B along the second side portion 1262. The sidewall 1258 includes a downwardly extending tab 1282A adjacent the projection 1280A along the first side portion 1260 (see FIG. 25) and a downwardly extending tab 1282B adjacent the projection 1280B along the second side portion 1262.

The sidewall 1258 has an opening 1292 formed therein along the rear portion 1290. One or more projections 1284 extend downwardly from the sidewall 1258 into the opening 1292.

Together the upper portion 1210, the front portion 1250, and the sidewall 1258 define a substantially hollow downwardly opening enclosure 1294. An underside 1295 of the enclosure includes a curved guide 1296, and at least one projection 1298 having an aperture 1299 formed therein to receive one of the fasteners 1150. Optionally, the guide 1296 may include one or more depressions 1297 configured to provide stops or markers along the guide. A downwardly opening channel 1286 is defined between the guide 1296 and a portion 1287 of the sidewall 1258 adjacent the opening 1292.

The sidewall 1258 includes a first relieved edge portion 1288A positioned along the first side portion 1260. The first relieved edge portion 1288A opens into the enclosure 1294 and extends from the front portion 1250 to the opening 1292. The sidewall 1258 includes a second relieved edge portion 1288B positioned along the second side portion 1262. The second relieved edge portion 1288B opens into the enclosure 1294 and extends from the front portion 1250 to the opening 1292.

As mentioned above, the upper cassette housing member 1120 is coupled to the lower housing member 1140 (see FIGS. 21 and 22).

Lower Housing Member

Figure 26:
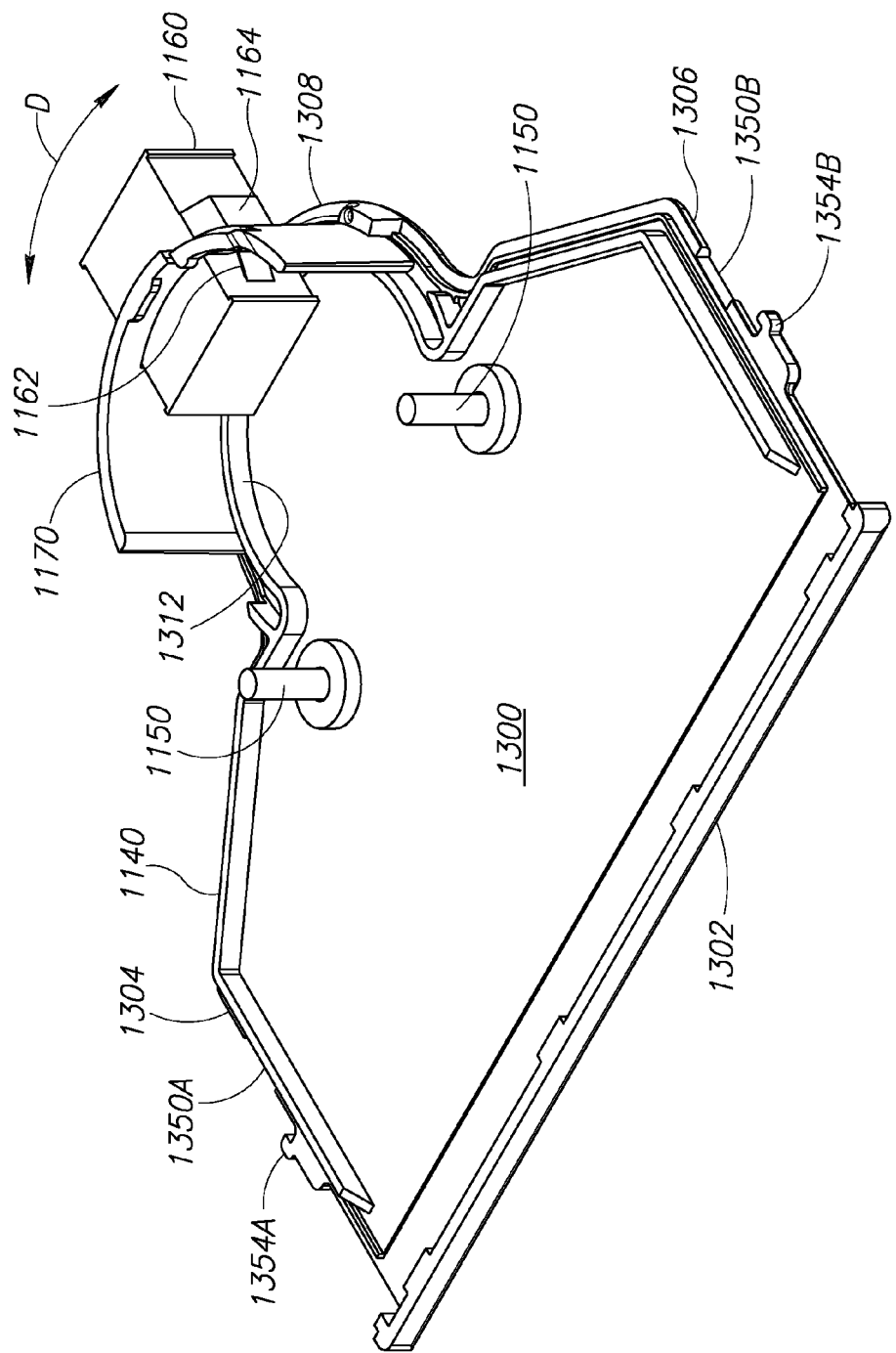
FIG. 26 is an enlarged perspective view of an upper portion of a subassembly of the cassette of FIG. 21 including a lower housing member, a multi-fiber connector, a moveable housing member, and fasteners.
Figure 27:
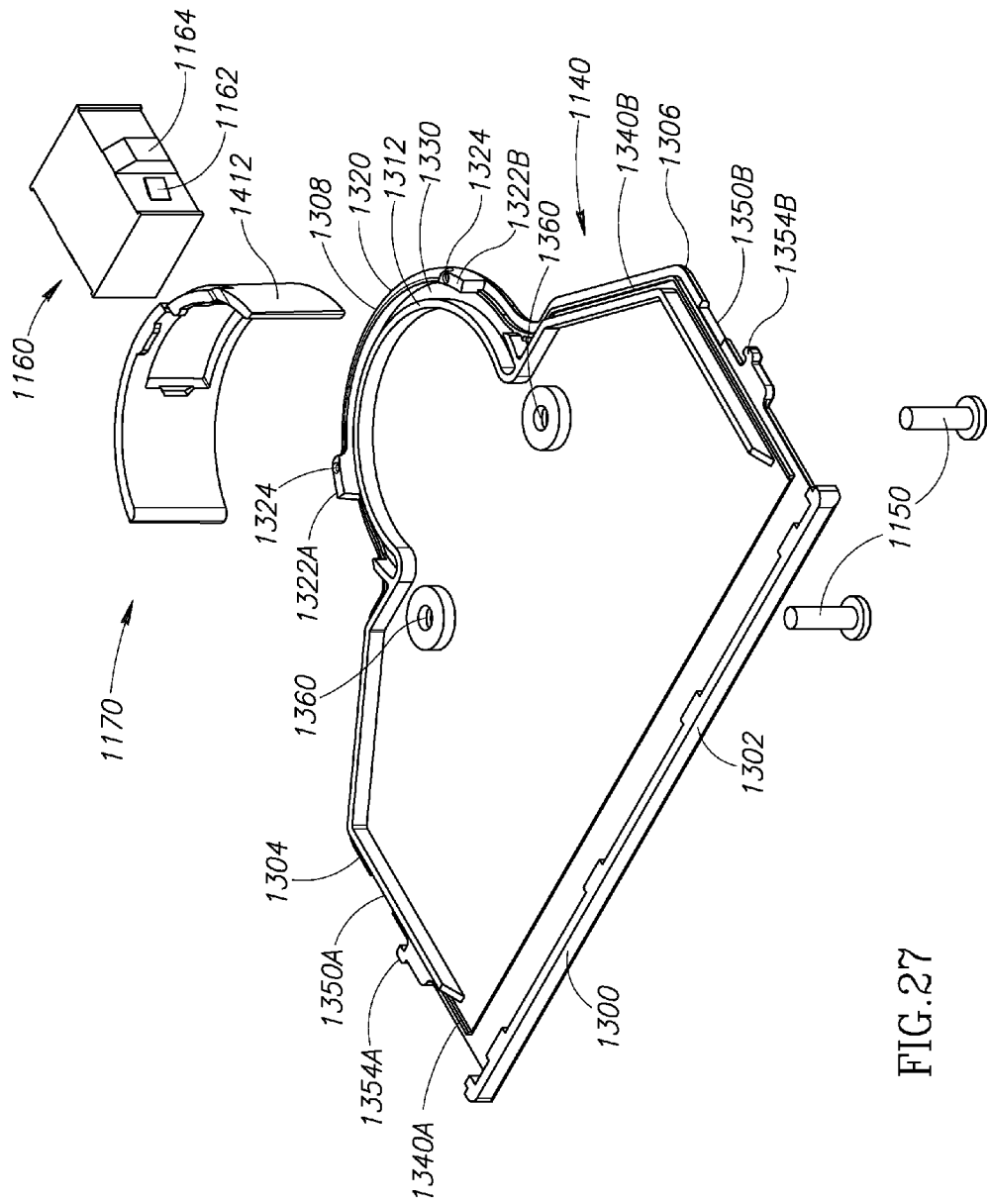
FIG. 27 is an exploded perspective view of the subassembly of FIG. 26.

Turning to FIGS. 26 and 27, the lower housing member 1140 has a lower base portion 1300 with a front portion 1302, a first side portion 1304, a second side portion 1306, and a back portion 1308. A continuous upwardly extending wall 1312 extends along a peripheral portion of the back portion 1308.

The back portion 1308 has a lip 1320. The wall 1312 is spaced inwardly from the lip 1320. First and second projections 1322A and 1322B extend upwardly from the lip 1320 and into the opening 1292 (see FIGS. 24 and 25) of the sidewall 1258 (see FIGS. 24 and 25) of the upper cassette housing member 1120. The projections 1322A and 1322B each include a recess 1324 configured to receive the projections 1284 (see FIGS. 24 and 25) formed on the sidewall 1258 (see FIGS. 24 and 25) of the upper cassette housing member 1120. Engagement of the projections 1284 with the recesses 1324 helps prevent lateral movement of the upper cassette housing member 1120 relative to the lower housing member 1140.

An upwardly opening contoured channel 1330 is defined between the wall 1312 and the lip 1320. The channel 1330 is aligned (or juxtaposed) with the downwardly opening channel 1286 (see FIGS. 24 and 25) of the upper cassette housing member 1120.

A first wall section 1340A adjacent the first side portion 1304 extends upwardly from the base portion 1300 to be received inside the first relieved edge portion 1288A (see FIGS. 24 and 25) of the sidewall 1258 of the upper cassette housing member 1120. A second wall section 1340B adjacent the second side portion 1306 extends upwardly from the base portion 1300 to be inside the second relieved edge portion 1288B (see FIGS. 24 and 25) of the sidewall 1258 of the upper cassette housing member 1120.

A first notch 1350A is formed in the base portion 1300 and positioned to receive the downwardly extending tab 1282A (see FIGS. 24 and 25) of the upper cassette housing member 1120. A second notch 1350B is formed in the base portion 1300 and positioned to receive the downwardly extending tab 1282B (see FIGS. 24 and 25) of the upper cassette housing member 1120.

A first tab 1354A extends outwardly from the first side portion 1304 of the base portion 1300 to engage the inwardly extending tab 540A (see FIG. 14) of the first side portion 512 (see FIG. 14) of the cover member 140. A second tab 1354B extends outwardly from the second side portion 1306 of the base portion 1300 to engage the inwardly extending tab 540B (see FIG. 14) of the second side portion 514 of the cover member 140. Engagement of the first and second tabs 1354A and 1354B with the tabs 540A and 540B, respectively, of the cover member 140 help prevent reward movement of the lower housing member 1140 relative to the cover member 140.

Optionally, the base portion 1300 includes one or more apertures 1360 configured to receive the fasteners 1150 (see FIG. 22). The apertures 1360 are positioned to align with the apertures 1299 (see FIGS. 24 and 25) formed in the projections 1298 of the upper cassette housing member 1120.

Multi-Fiber Connector

Turning to FIG. 27, the multi-fiber connector 1160 may be implemented using any type of optical fiber connector configured to terminate multiple optical fibers. Examples of suitable connectors include multiple fiber push-on/pull-off ("MPO") type connectors, such as MTP connectors. In the embodiment illustrated, the multi-fiber connector 1160 includes at least one outwardly extending tab 1162 spaced apart from a stop 1164.

As mentioned above, the multi-fiber connector 1160 is mounted inside the moveable housing member 1170.

Moveable Housing Member

The moveable housing member 1170 is positioned in the upwardly opening channel 1330 of the lower housing member 1140 and the downwardly opening channel 1286 (see FIGS. 24 and 25) of the upper cassette housing member 1120. The moveable housing member 1170 is slidable within the channels 1330 and 1286 to change the angle of the multi-fiber connector 1160 relative to the housing subassembly 1180.

Figure 28:
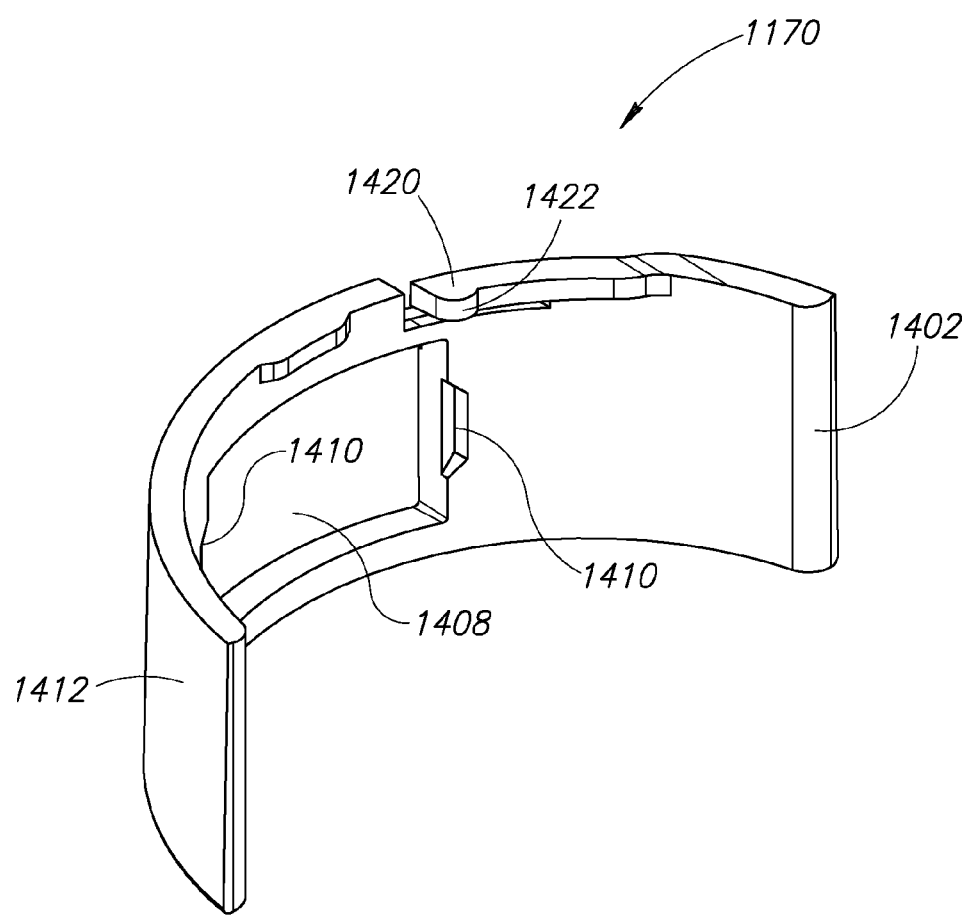
FIG. 28 is an enlarged perspective view of an upper portion of the moveable housing member of the cassette of FIG. 21

Turning to FIG. 28, the moveable housing member 1170 has a contoured or curved sidewall 1402 with an opening 1408 formed therein that is configured to receive the multi-fiber connector 1160. In the embodiment illustrated, the moveable housing member 1170 includes one or more recesses 1410 adjacent the opening 1408. The tabs 1162 (see FIG. 27) of the multi-fiber connector 1160 (see FIG. 27) may be receivable inside the recesses 1410. The stop 1164 (see FIG. 27) of the multi-fiber connector 1160 bears against an outwardly facing portion 1412 of the sidewall 1402.

A flexible finger 1420 is positioned along an upper edge of the sidewall 1402 to engage the guide 1296 (see FIGS. 24 and 25) of the upper cassette housing member 1120. As mentioned above, the guide 1296 may include one or more depressions 1297 (see FIGS. 24 and 25) configured to provide stops or markers along the guide. The finger 1420 may include a projection 1422 configured to be received inside one of the depressions 1297 to help position the moveable housing member 1170 relative to the upper cassette housing member 1120.

As mentioned above, the multi-fiber connector 1160 is mounted inside the moveable housing member 1170 and rotates therewith as a unit. By selectively rotating the multi-fiber connector 1160 and the moveable housing member 1170, the exit angle (or direction) of the multi-fiber connector 1160 relative to the housing subassembly 1180 may be determined. These components may be rotated by gripping the multi-fiber connector 1160 and pushing it toward a selected side of the housing assembly 1180.

FIG. 30 is a perspective view of the angled patch panel 101 mounted in the rack 1600. The rack 1600 includes a first upright member 1610 spaced apart from a second upright member 1612. The patch panel 101 is mounted to and extends between the first and second upright members 1610 and 1612. In FIG. 30, the first support bracket 62A is mounted to the first upright member 1610 and the second support bracket 62B is mounted to the second upright member 1612.

In FIG. 30, the patch panel 101 is illustrated being used for mixed transmission media (e.g., concurrent use of copper connectors and fiber optic connectors). Optionally, one or more blanks (e.g., a blank 3000), described below, may be mounted in the patch panel 101 at locations whereat a cassette is not mounted. In this manner, all of the locations may be occupied (by a cassette or blank) for full utilization of all of the available patching areas.

Alternate Embodiment

FIGS. 31 and 32 depict the cassette 2000 that is an alternate embodiment of the cassette 1000 illustrated in FIGS. 21 and 22. For ease of illustration, reference numbers identical to those used in FIGS. 1A, 2, and 3 and 6-20 with respect to the cassette 100 and FIGS. 21-23, 26, and 27 with respect to the cassette 1000 have been used in FIGS. 31 and 32 to identify like components of the cassette 2000.

The cassette 2000 may be configured for use with fiber optic cables as opposed to cables having metal wires (e.g., copper wire). The embodiment of the cassette 2000 illustrated is configured for use with a patch panel (e.g., the patch panel 101 depicted in FIG. 1A, the 4RU patch panel 112 depicted in FIGS. 1D and 1E, and the like), a cable 2102 including multiple optic fibers (not shown) terminated by a connector (not shown) that may be connected to a conventional multi-fiber connector 2160 (see FIG. 32), and one or more conventional fiber optic connectors (not shown) that may each be connected to at least one of a plurality of conventional fiber optic adapter or connector assemblies 2110 and each terminate a cable (not shown). The cassette 2000 may be configured for use with 24 optical fibers. In such embodiments, the 24 optical fibers may be included in the cable 2102.

The cassette 2000 may be configured to be mounted inside the patch panel 101, the 4RU patch panel 112 (see FIGS. 1D and 1E), a generally planar patch panel (not shown), and the like.

The cassette 2000 is receivable between the flanges "FL1" and "FL3" of a selected one of the vertically adjacent pairs of patching areas of the patch panel 101. The cassette 2000 includes a channel or groove 2104 configured to receive the flange "FL2" of the selected one of the vertically adjacent pairs of patching areas of the patch panel 101. The cassette 2000 includes the tabs "T1" to "T4" for selective insertion into the apertures 104-107, respectively, of the selected one of the vertically adjacent pairs of patching areas of the patch panel 101 (see FIG. 1A). Engagement of the tabs "T1" to "T4" with the apertures 104, 105, 106, and 107, respectively, maintains the cassette 2000 inside the patch panel 101 between the flanges "FL1" and "FL3" of the selected one of the vertically adjacent pairs of patching areas of the patch panel 101. When the tabs "T1" to "T4" are retracted, the cassette 2000 may be removed from the patch panel 101.

Turning to FIG. 31, the cassette 2000 includes the connector assemblies 2110, the upper cassette housing member 1120, the cover member 140, the pull member 150, the first latch member 160, the second latch member 162, fasteners 2150 (see FIG. 33), a conventional multi-fiber connector 2160, a moveable housing member 2170 (see FIG. 32), and a lower cassette housing member 2300. The connector assemblies 2110 include the connector assemblies 1110A-1110F and connector assemblies 2110A-2110F. Together the upper cassette housing member 1120, the lower cassette housing member 2300, the cover member 140, the moveable housing member 2170, and the fasteners 2150 may be characterized as forming a housing subassembly 2180 for the connector assemblies 1110A-1110F, the connector assemblies 2110A-2110F, and the multi-fiber connector 2160.

Inside the housing subassembly 2180, one or more fibers (not shown) fan-out from the multi-fiber connector 2160 to each of the connector assemblies 2110 as would be understood by those of ordinary skill in the art. As in the cassette 100, the pull member 150, the first latch member 160, and the second latch member 162 of the cassette 2000 form the latch mechanism subassembly 190 (see FIG. 32). The latch mechanism subassembly 190 is connected to the housing subassembly 2180 but is moveable relative thereto.

The embodiment of the cassette 2000 illustrated is configured to reduce bends and stress imposed on the optic fiber cable 2102 to thereby maintain bend radius control for optical fibers.

Referring to FIG. 42, cassettes 2000A and 2000B, which are each substantially identical to the cassette 2000, are illustrated installed in the angled patch panel 101 alongside the cassette 100, which is alongside the blank 3000 (described below). Optionally, one or both of the cassettes 2000A and 2000B may be replaced with one, two, three, or four of the cassettes 1000A-1000D illustrated in FIG. 29. The blank 3000 is illustrated installed in the patch panel 101 next to the cassette 100. However, this is not a requirement.

Figure 33:
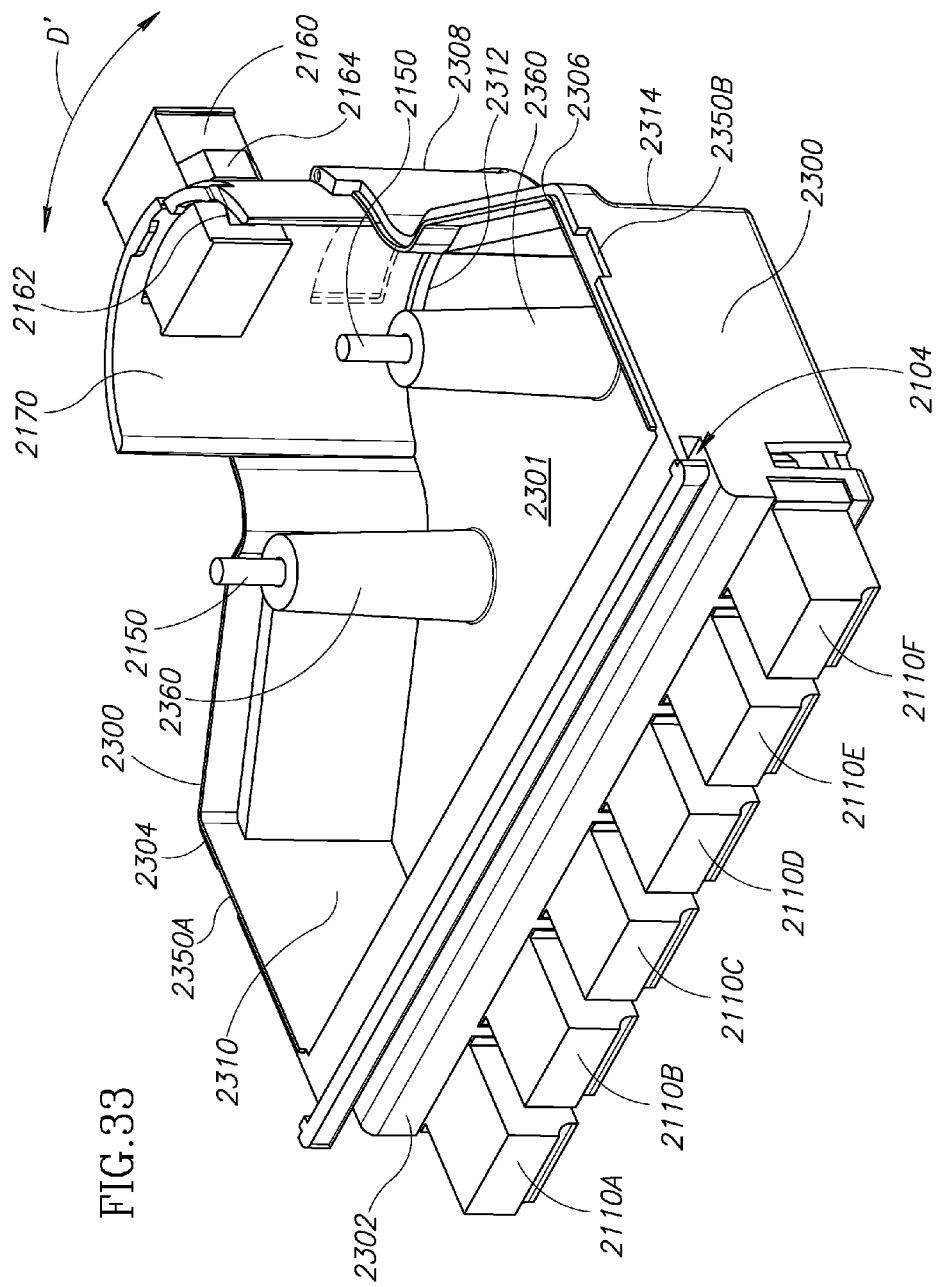
FIG. 33 is an enlarged perspective view of an upper portion of a subassembly of the cassette of FIG. 31 including a lower cassette housing member, a portion of the fiber optic connector assemblies, a multi-fiber connector, a moveable housing member, and fasteners.
Figure 38:
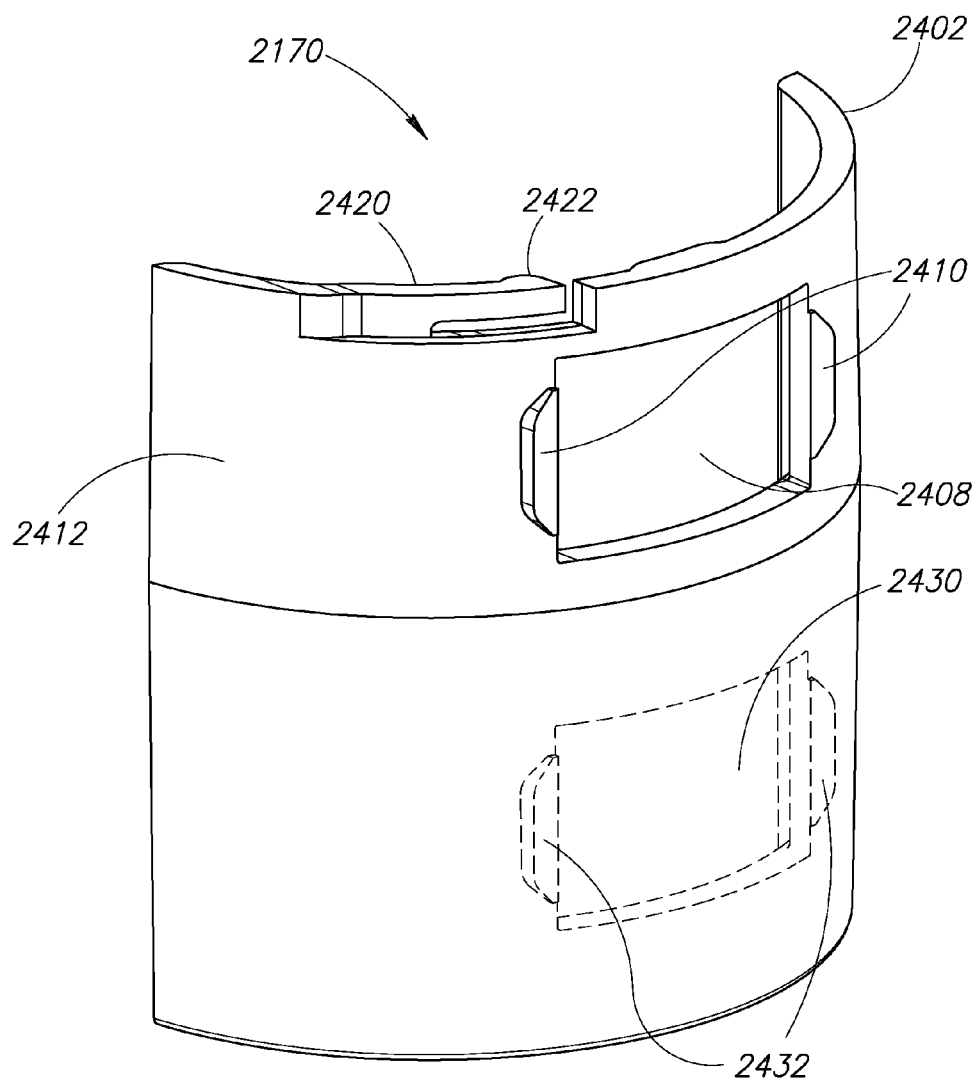
FIG. 38 is an enlarged perspective view of an outwardly facing portion of the moveable housing member of the cassette of FIG. 31.

The multi-fiber connector 2160 and the moveable housing member 2170 of the cassette 2000 may be rotated together as a unit to position the multi-fiber connector 2160 relative to the housing subassembly 2180 (see FIGS. 31, 33, and 38). By adjusting the exit angle (or direction) of the multi-fiber connector 2160 relative to the angled patch panel 101, the multi-fiber connector 2160 may be positioned orthogonally to the front face of the portion of the patch panel 101 to which the cassette 2000 is mounted (or the rack 1600 (see FIG. 30) in which the patch panel is mounted) regardless of where the cassette is installed in the patch panel.

Turning to FIG. 31, the connector assemblies 1110A-1110F are mounted inside the upper cassette housing member 1120 of the housing subassembly 2180 and the connector assemblies 2110A-2110F are mounted inside the lower cassette housing member 2300 of the housing subassembly 2180. The upper cassette housing member 1120 is coupled to the lower cassette housing member 2300 by the fasteners 2150 (see FIG. 33). The fasteners 2150 may be substantially identical to the fasteners 1150.

Turning to FIG. 33, the moveable housing member 2170 is positioned between and slidable relative to the upper and lower cassette housing members 1120 and 2300 along a curved path of motion indicated by double-headed arrow "D'." The multi-fiber connector 2160 is mounted in the moveable housing member 2170 and is slidable therewith as a unit relative to the upper and lower cassette housing members 1120 and 2300. Turning to FIG. 32, the pull member 150 is movably coupled to the upper cassette housing member 1120 by the first and second latch members 160 and 162. The pull member 150 is slideable relative to the housing subassembly 2180 in directions identified by arrows "A" and "B."

Connector Assemblies

Turning to FIG. 31, the cassette 2000 is not limited for use with any particular type of connector assembly or number of connector assemblies. In the embodiment illustrated, the connector assemblies 2110 include the six connector assemblies 1110A-1110F and the six connector assemblies 2110A-2110F. The connector assemblies 2110A-2110F may be implemented using any type of optical fiber connector suitable for constructing the connector assemblies 1110A-1110F. Examples of suitable connectors include snap-in connectors (e.g., Lucent Connector ("LC") and SC adapters or connectors), and the like.

Multi-Fiber Connector

Turning to FIGS. 31-32, the multi-fiber connector 2160 is mounted inside the moveable housing member 2170. The multi-fiber connector 2160 may be implemented using any type of optical fiber connector configured to terminate multiple optical fibers. Examples of suitable connectors include multiple fiber push-on/pull-off ("MPO") type connectors, such as MTP connectors. In the embodiment illustrated, the multi-fiber connector 2160 includes at least one outwardly extending tab 2162 (see FIG. 33) spaced apart from a stop 2164 (see FIGS. 32 and 33). The tab 2162 may be substantially identical to the tab 1162 (see FIGS. 26 and 27) of the multi-fiber connector 1160 of the cassette 1000, and the stop 2164 may be substantially identical to the stop 1164 (see FIGS. 26 and 27) of the multi-fiber connector 1160 of the cassette 1000.

Lower Cassette Housing Member

Turning to FIGS. 33-36, the lower cassette housing member 2300 has a lower base portion 2301 with a front portion 2302, a first side portion 2304, a second side portion 2306, and a back portion 2308. A continuous sidewall 2314 extends upwardly from the lower base portion 2301 along a peripheral portion of the front, first side, second side, and back portions 2302, 2304, 2306, and 2308. Together the lower base portion 2301 and the sidewall 2314 define an upwardly opening enclosure 2310.

Figure 34:
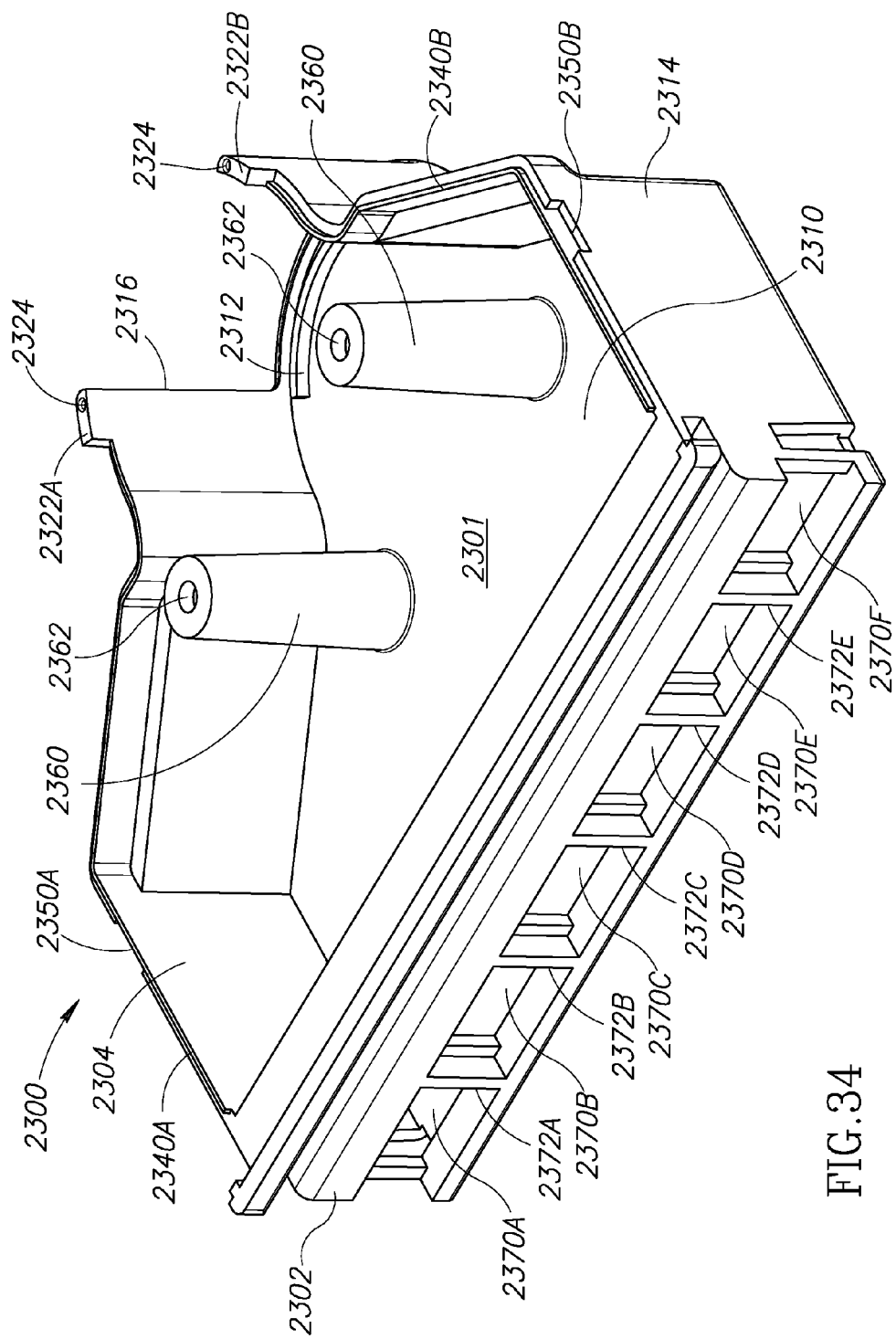
FIG. 34 is an enlarged perspective view of the lower cassette housing member of the cassette of FIG. 31.
Figure 35:
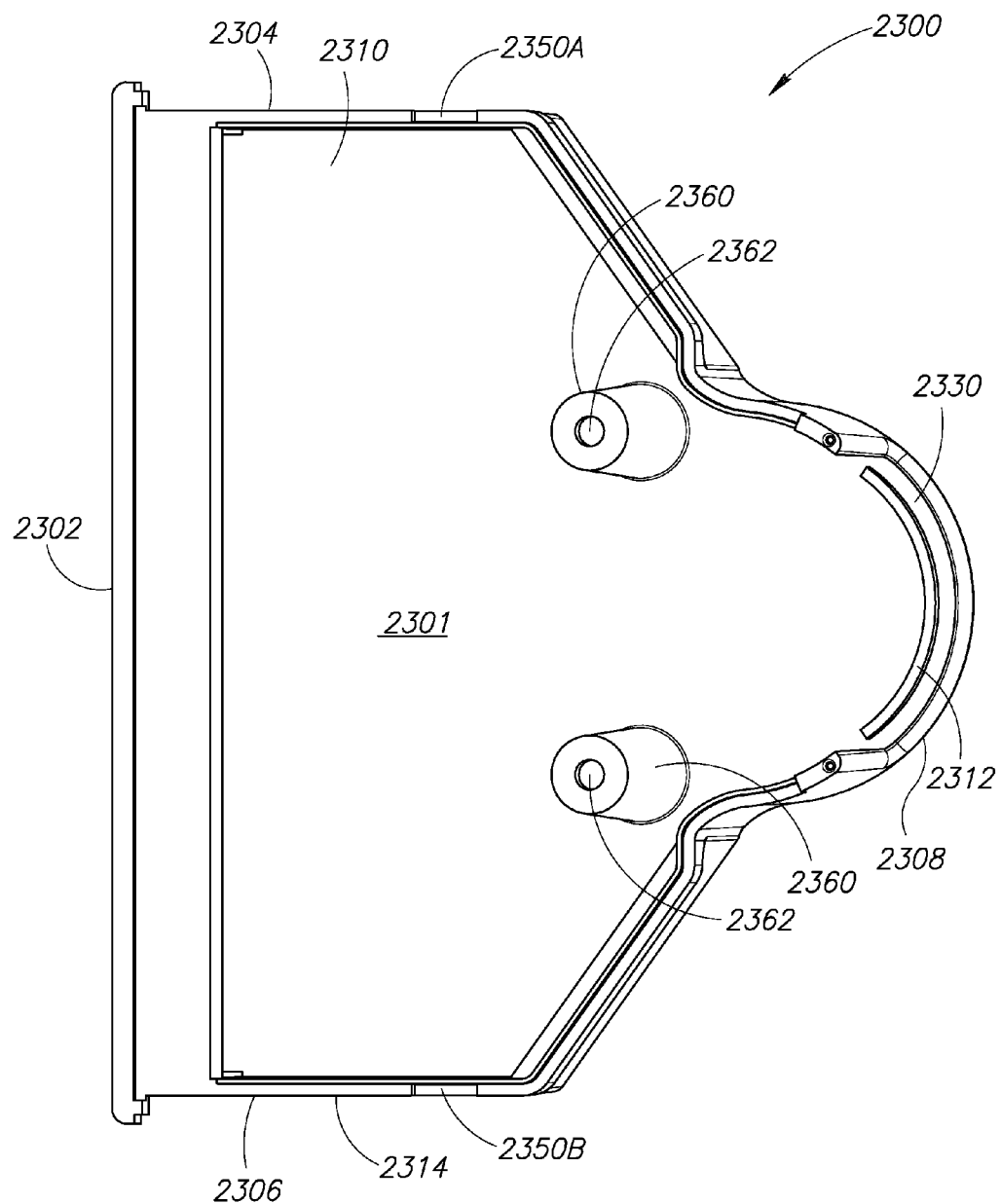
FIG. 35 is an enlarged view of the inside of the lower cassette housing member of the cassette of FIG. 31.

Turning to FIGS. 33-35, a wall 2312 positioned in the back portion 2308 and spaced inwardly from the sidewall 2314 extends upwardly from the lower base portion 2301. Turning to FIG. 34, an opening or cutout portion 2316 is formed in the sidewall 2314 along the back portion 2308. The wall 2312 extends along at least a portion of the cutout portion 2316.

First and second projections 2322A and 2322B that are substantially identical to the first and second projections 1322A and 1322B (see FIG. 27) of the lower housing member 1140 (see FIG. 27) extend upwardly from the sidewall 2314 and into the opening 1292 (see FIGS. 24 and 25) of the sidewall 1258 (see FIGS. 24 and 25) of the upper cassette housing member 1120. The projections 2322A and 2322B each include a recess 2324 (substantially identical to the recess 1324 illustrated in FIG. 27) configured to receive the projections 1284 (see FIGS. 24 and 25) formed on the sidewall 1258 (see FIGS. 24 and 25) of the upper cassette housing member 1120. Engagement of the projections 1284 with the recesses 2324 helps prevent lateral movement of the upper cassette housing member 1120 relative to the lower cassette housing member 2300.

Turning to FIG. 35, an upwardly opening contoured channel 2330 is defined between the wall 2312 and the sidewall 2314. The channel 2330 is aligned (or juxtaposed) with the downwardly opening channel 1286 (see FIGS. 24 and 25) of the upper cassette housing member 1120.

Returning to FIG. 34, a first wall section 2340A adjacent the first side portion 2304 extends upwardly from the sidewall 2314 to be received inside the first relieved edge portion 1288A (see FIGS. 24 and 25) of the sidewall 1258 of the upper cassette housing member 1120. A second wall section 2340B adjacent the second side portion 2306 extends upwardly from the sidewall 2314 to be inside the second relieved edge portion 1288B (see FIGS. 24 and 25) of the sidewall 1258 of the upper cassette housing member 1120.

A first notch 2350A is formed in an upper edge portion of the sidewall 2314 along the first side portion 2304 and positioned to receive the downwardly extending tab 1282A (see FIGS. 24 and 25) of the upper cassette housing member 1120. A second notch 1350B is formed in an upper edge portion of the sidewall 2314 along the second side portion 2306 and positioned to receive the downwardly extending tab 1282B (see FIGS. 24 and 25) of the upper cassette housing member 1120.

At least one projection 2360 extends upwardly from the lower base portion 2301. Each projection 2360 includes an aperture 2362 formed therein. The apertures 2362 are aligned with one of the apertures 1299 (see FIG. 24) formed in the projections 1298 of the upper cassette housing member 1120. Each aperture 2362 is configured to receive one of the fasteners 2150 and allow it to pass therethrough to couple the upper and lower cassette housing members 1120 and 2300 together.

Figure 36:
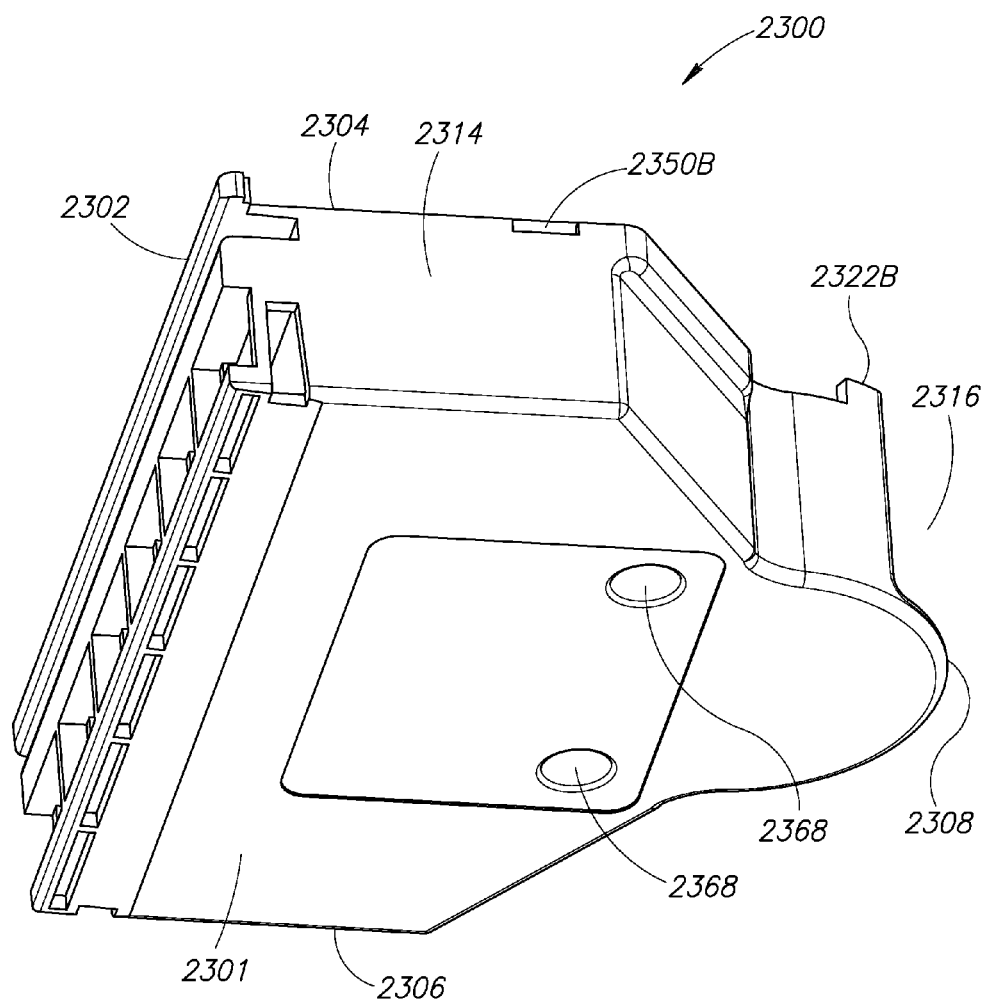
FIG. 36 is an enlarged view of the underside of the lower cassette housing member of the cassette of FIG. 31.

Turning to FIG. 36, the base portion 2301 includes one or more outwardly opening apertures 2368 configured to receive the fasteners 2150 (see FIG. 33). Each aperture 2368 is positioned to align with a different aperture 2362 (see FIGS. 34 and 35) formed in one of the projections 2360. Thus, one of the fasteners 2150 may be inserted into a selected aperture 2368, pass therethrough, enter a selected aperture 2362, and pass therethrough to enter the aperture 1299 (see FIG. 24) aligned with the selected aperture 2362. In this manner, the one of the fasteners 2150 may be used to removably couple the upper and lower cassette housing members 1120 and 2300 together.

Turning to FIG. 34, the front portion 2302 of the lower cassette housing member 2300 includes openings 2370A to 2370F for receiving the connector assemblies 2110A-2110F (see FIG. 33), respectively. The front portion 2302 includes a rib or divider that extends between each adjacent pair of the connector assemblies 2110A-2110F (see FIG. 33). In the embodiment illustrated, the front portion 2302 includes dividers 2372A-2372E. The divider 2372A is positioned between the opening 2370A (for the connector assembly 2110A) and the opening 2370B (for the connector assembly 2110B). The divider 2372B is positioned between the opening 2370B (for the connector assembly 2110B) and the opening 2370C (for the connector assembly 2110C). The divider 2372C is positioned between the opening 2370C (for the connector assembly 2110C) and the opening 2370D (for the connector assembly 2110D). The divider 2372D is positioned between the opening 2370D (for the connector assembly 2110D) and the opening 2370E (for the connector assembly 2110E). The divider 2372E is positioned between the opening 2370E (for the connector assembly 2110E) and the opening 2370F (for the connector assembly 2110F).

Turning to FIG. 37, the groove 2104 is formed in the front portion 2302 of the lower cassette housing member 2300. A cantilevered member 2380 extends above and defines an upper portion of the groove 2104. A rearwardly opening channel 2382 is formed in the cantilevered member 2380 and positioned to receive the forwardly extending projection 1266 of the upper cassette housing member 1120. The projection 1266 slides into the channel 2382 to position the upper and lower cassette housing members 1120 and 2300 with respect to one another and maintain engagement therebetween. Interengagement of the projection 1266 with the channel 2382 may lock the upper cassette housing member 1120 and the lower cassette housing member 2300 together.

Moveable Housing Member

Figure 39:
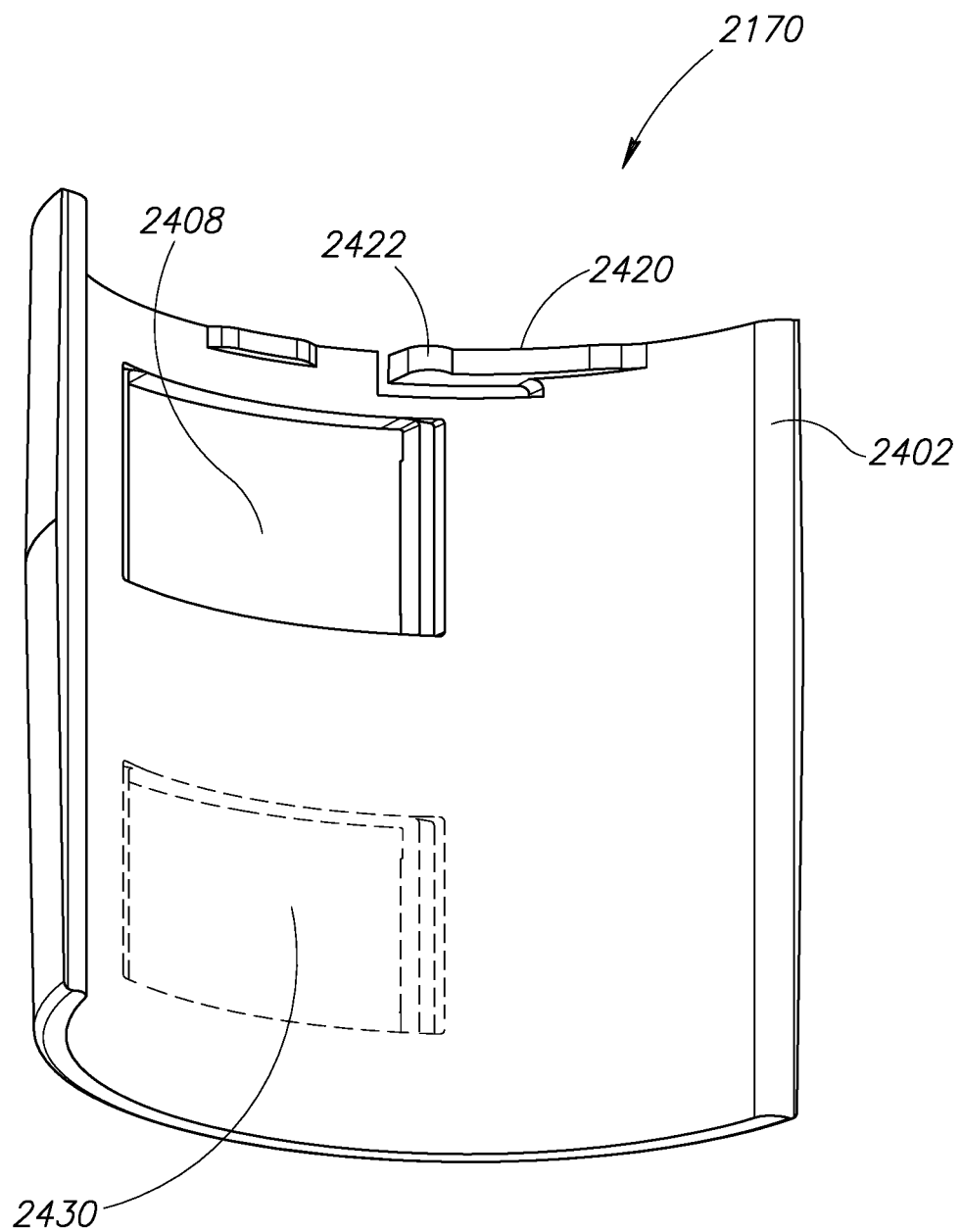
FIG. 39 is an enlarged perspective view of an inwardly facing portion of the moveable housing member of the cassette of FIG. 31.

Turning to FIGS. 38 and 39, the moveable housing member 2170 is positioned in the upwardly opening channel 2330 (see FIG. 35) of the lower cassette housing member 2300 and the downwardly opening channel 1286 (see FIGS. 24 and 25) of the upper cassette housing member 1120. The moveable housing member 2170 is slidable within the channels 2330 and 1286 to change the angle of the multi-fiber connector 2160 (see FIG. 33) relative to the housing subassembly 2180 (see FIG. 31).

Turning to FIG. 38, the moveable housing member 2170 has a contoured or curved sidewall 2402 with a first opening 2408 formed therein that is configured to receive the multi-fiber connector 2160 (see FIG. 33). In the embodiment illustrated, the moveable housing member 2170 includes one or more bosses 2410 adjacent the first opening 2408. The stop 2164 (see FIG. 33) of the multi-fiber connector 2160 (see FIG. 33) may be at least partially abut the bosses 2410. The stop 2164 of the multi-fiber connector 2160 bears against an outwardly facing portion 2412 of the sidewall 2402.

Optionally, the moveable housing member 2170 includes a second opening 2430 like the first opening 2408 that is configured to receive a second multi-fiber connector (like the multi-fiber connector 2160). In embodiments in which the moveable housing member 2170 is formed using an injection molding process, the second opening 2430 may be formed in the moveable housing member 2170 during the injection molding process. Alternatively, the second opening 2430 may be formed (e.g., by manually punching, or machining) after the injection molding process is completed. One or more bosses 2432 may be positioned adjacent to the second opening 2410. The bosses 2432 may be substantially identical to the bosses 2410.

A flexible finger 2420 is positioned along an upper edge of the sidewall 2402 to engage the guide 1296 (see FIGS. 24 and 25) of the upper cassette housing member 1120. As mentioned above, the guide 1296 may include one or more depressions 1297 (see FIGS. 24 and 25) configured to provide stops or markers along the guide. The finger 2420 may include a projection 2422 configured to be received inside one of the depressions 1297 to help position the moveable housing member 2170 relative to the upper cassette housing member 1120.

As mentioned above, the multi-fiber connector 2160 is mounted inside the moveable housing member 2170 and rotates therewith as a unit. By selectively rotating the multi-fiber connector 2160 and the moveable housing member 2170, the exit angle (or direction) of the multi-fiber connector 2160 relative to the housing subassembly 2180 may be determined. These components may be rotated by gripping the multi-fiber connector 2160 and pushing it toward a selected side of the housing assembly 2180.

Blank

Figure 40:
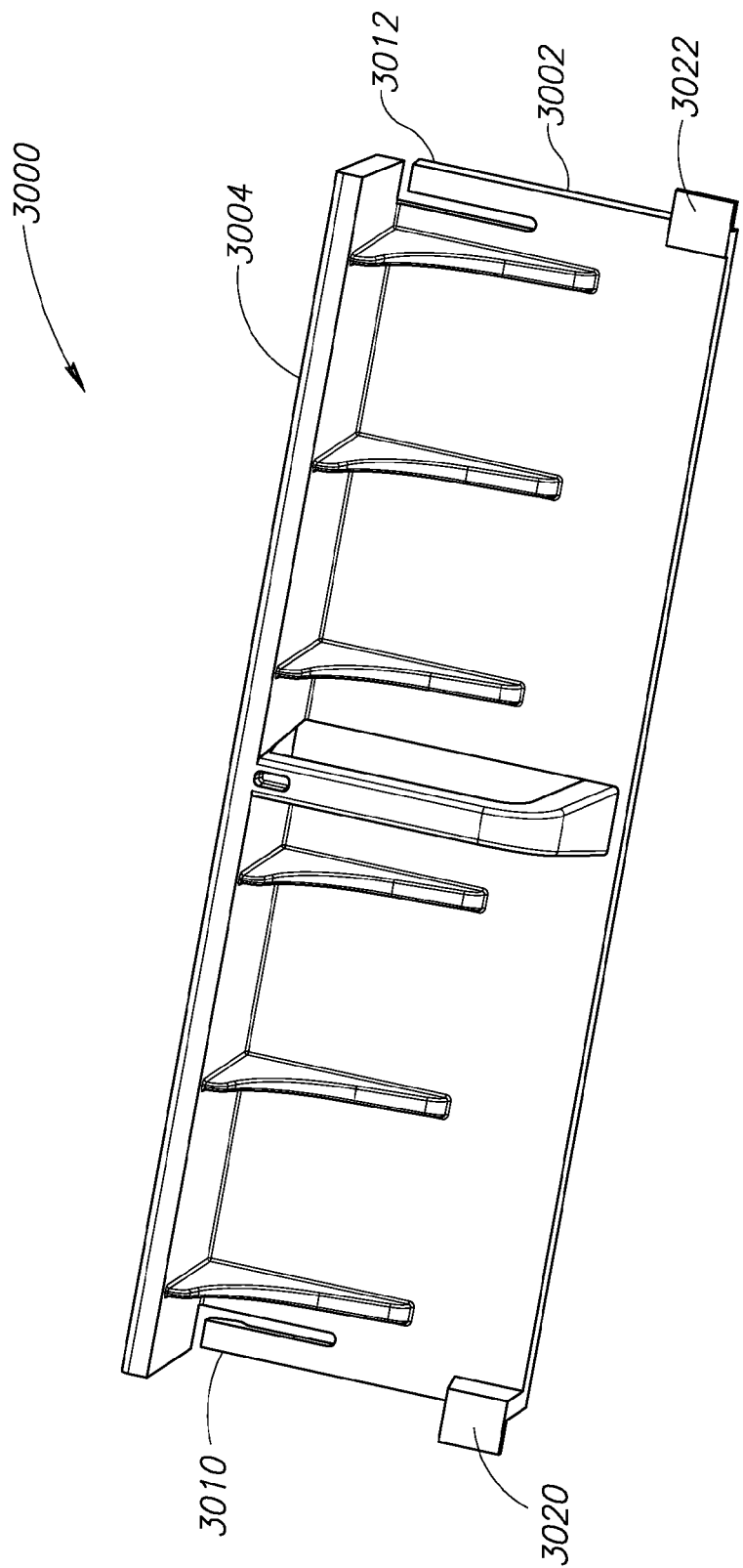
FIG. 40 is a perspective view of an underside of a blank member.
Figure 41:
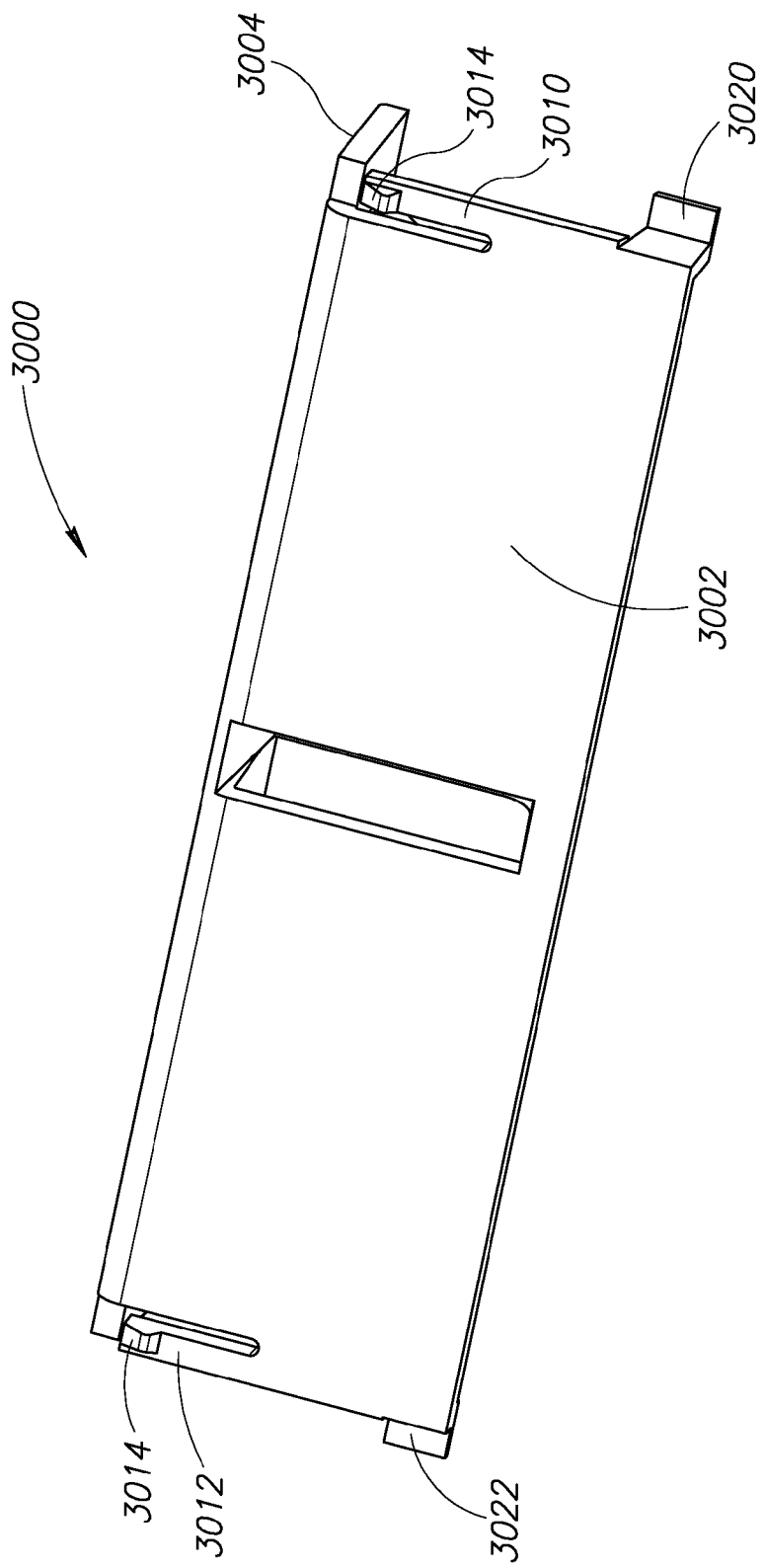
FIG. 41 is a perspective view of a frontwardly facing portion of the blank member of FIG. 40.

FIGS. 40 and 41 are perspective views of the blank 3000. The blank 3000 may be a single structure formed from any suitable material, such as plastic. The blank 3000 may be substantially L-shaped having an upwardly facing wall 3002 substantially orthogonal to a frontwardly facing wall 3004. First and second fingers 3010 and 3012 are formed in the upwardly facing wall 3002. Each of the fingers 3010 and 3012 includes an upwardly extending tab 3014.

The blank 3000 may be selectively and removably installed in one of the patching areas PA1, PA3, PA5, and PA7 between the flanges "FL1" and "FL2." When the blank 3000 is installed between the flanges "FL1" and "FL2," the tabs 3014 of the first and second fingers 3010 and 3012 are positioned to be received inside the apertures 104 and 105, respectively. Thus, the blank 3000 may be attached to the flange "FL1" and positioned between the flanges "FL1" and "FL2" of a selected one of the patching areas PA1, PA3, PA5, and PA7.

Alternatively, the blank 3000 may be selectively and removably installed in one of the patching areas PA2, PA4, PA6, and PA8 between the flanges "FL2" and "FL3." When the blank 3000 is installed between the flanges "FL2" and "FL3," the tabs 3014 of the first and second fingers 3010 and 3012 are positioned to be received inside the apertures 106 and 107, respectively. Thus, the blank 3000 may be attached to the flange "FL2" and positioned between the flanges "FL2" and "FL3" of a selected one of the patching areas PA2, PA4, PA6, and PA8.

The blank 3000 may include a first projection 3020 and a second projection 3022. The first and second projections 3020 and 3022 are positioned be received inside the slots 68 of whichever of the center support 56, the first support 60, the first support bracket 62A, and the second support bracket 62B are adjacent the selected one of the patching areas PA1-PA8 of the patch panel 101 in which the blank 3000 is mounted.

When the blank 3000 is positioned within the patching area PA3 or the patching area PA4 of the first angled side portion 52 defined between the center support 56 and the first support 60, the second projection 3022 is received inside one of the slots 68 of the first support 60 and the first projection 3020 is received inside one of the slots 68 of the center support 56. When positioned in the patching area PA3 (between the flanges "FL1" and "FL2"), the frontwardly facing wall 3004 of the blank 3000 fills an area defined between the flange "FL1," the flange "FL2," the center support 56, and the first support 60. When positioned in the patching area PA4 (between the flanges "FL2" and "FL3"), the frontwardly facing wall 3004 of the blank 3000 fills an area defined between the flange "FL2," the flange "FL3," the center support 56, and the first support 60.

On the other hand, when the blank 3000 is positioned within the patching area PA1 or the patching area PA2 of the first angled side portion 52 defined between the center support 56 and the second support bracket 62A, the second projection 3022 is received inside one of the slots 68 of the center support 56 and the first projection 3020 is received inside one of the slots 68 of the second support bracket 62A. When positioned in the patching area PA1 (between the flanges "FL1" and "FL2"), the frontwardly facing wall 3004 of the blank 3000 fills an area defined between the flange "FL1," the flange "FL2," the center support 56, and the second support bracket 62A. When positioned in the patching area PA2 (between the flanges "FL2" and "FL3"), the frontwardly facing wall 3004 of the blank 3000 fills an area defined between the flange "FL2," the flange "FL3," the center support 56, and the second support bracket 62A.

When the blank 3000 is positioned within the patching area PA5 or the patching area PA6 of the second angled side portion 54 defined between the center support 56 and the first support 60, the second projection 3022 is received inside one of the slots 68 of the center support 56 and the first projection 3020 is received inside one of the slots 68 of the first support 60. When positioned in the patching area PA5 (between the flanges "FL1" and "FL2"), the frontwardly facing wall 3004 of the blank 3000 fills an area defined between the flange "FL1," the flange "FL2," the center support 56, and the first support 60. When positioned in the patching area PA6 (between the flanges "FL2" and "FL3"), the frontwardly facing wall 3004 of the blank 3000 fills an area defined between the flange "FL2," the flange "FL3," the center support 56, and the first support 60.

On the other hand, when the blank 3000 is positioned within the patching area PA7 or the patching area PA8 of the second angled side portion 54 defined between the center support 56 and the second support bracket 62B, the first projection 3020 is received inside one of the slots 68 of the center support 56 and the second projection 3022 is received inside one of the slots 68 of the second support bracket 62B. When positioned in the patching area PA7 (between the flanges "FL1" and "FL2"), the frontwardly facing wall 3004 of the blank 3000 fills an area defined between the flange "FL1," the flange "FL2," the center support 56, and the second support bracket 62B. When positioned in the patching area PA8 (between the flanges "FL2" and "FL3"), the frontwardly facing wall 3004 of the blank 3000 fills an area defined between the flange "FL2," the flange "FL3," the center support 56, and the second support bracket 62B.

When positioned between the flanges "FL1" and "FL2," the blank 3000 may be moved from the patch panel 101 by depressing the fingers 3010 and 3012 to remove the tabs 3014 from the apertures 104 and 105, respectively, and sliding the blank rearwardly. Similarly, when positioned between the flanges "FL2" and "FL3," the blank 3000 may be moved from the patch panel 101 by depressing the fingers 3010 and 3012 to remove the tabs 3014 from the apertures 106 and 107, respectively, and sliding the blank rearwardly.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A device for use with a panel comprising a plurality of apertures, the device comprising:
   a plurality of outlet assemblies;
   a bezel member housing the outlet assemblies; and
   a latch mechanism configured to releasably secure the bezel member to the panel, the latch mechanism comprising a handle member and a latch member that is slidably coupled to the bezel member, the latch member comprising at least one tab biased to be receivable inside a corresponding one of the apertures of the panel, the handle member being coupled to the latch member and operable to overcome the biasing to remove the at least one tab from the corresponding aperture of the panel when the handle member is pulled in an unlatch direction.

2. The device of claim 1, wherein the plurality of outlet assemblies are arranged in adjacent pairs of outlet assemblies, and the bezel member has a different projection corresponding to each unique pair of adjacent outlet assemblies, each projection at least partially extending between the outlet assemblies corresponding to the projection, each projection being configured to at least partially shield each of the corresponding outlet assemblies from electrical interference generated by the other.

3. The device of claim 2, wherein the bezel member is constructed from an electrically conductive material.

4. The device of claim 3, wherein the bezel member is constructed from die cast metal.

5. The device of claim 2, further comprising:
   a cover member at least partially enclosing the bezel member, the cover member being constructed from an electrically conductive material.

6. The device of claim 1, wherein the at least one tab comprises a pair of tabs biased outwardly by a biasing portion, and
   the handle member is operable to overcome the biasing of the biasing portion to thereby retract the tabs of the first and second latch members inwardly.

7. The device of claim 1 for use with the panel having an opening, and the plurality of apertures of the panel comprising a first aperture, a second aperture, a third aperture, and a fourth aperture, wherein the outlet assemblies are mounted to the bezel member in a substantially linear series, the bezel member having a first end portion adjacent a first one of the outlet assemblies in the series, and a second end portion adjacent a last one of the outlet assemblies in the series,
   the latch member is a first latch member, and the at least one tab comprises a first tab and a second tab,
   the latch mechanism comprises a second latch member coupled to the handle member and slidably coupled to the bezel member,
   the second latch member comprises a first tab and a second tab,
   the first latch member is positioned adjacent the first end portion of the bezel member,
   the second latch member is positioned adjacent the second end portion of the bezel member,
   the bezel member is positionable inside the opening of the panel adjacent the first, second, third, and fourth apertures,
   the first tab of the first latch member is positionable inside the first aperture of the panel and a second tab of the first latch member is positionable inside the second aperture of the panel,
   the first tab of the second latch member is positionable inside the third aperture of the panel and the second tab of the second latch member is positionable inside the fourth aperture of the panel, and
   the first and second tabs of the first and second latch members are selectively retractable from the first, second, third, and fourth apertures of the panel by the handle member.

8. The device of claim 1, wherein the latch member is a first latch member,
   the at least one tab of the first latch member comprises a pair of tabs biased toward a latching position by a biasing portion,
   the latch mechanism comprises a second latch member connected to the handle member,
   the second latch member comprises a pair of tabs biased toward a latching position by a biasing portion,
   the bezel member is flanked by the first and second latch members, and
   the handle member is operable to overcome the biasing of the biasing portions of both the first and second latch members to move the pairs of tabs of the first and second latch members toward an unlatched position.

9. A device for use with a plurality of connectors, and a panel comprising a plurality of openings, the device comprising:
   a plurality of outlet assemblies each having an opening configured to receive one of the connectors;
   a housing subassembly housing the plurality of outlet assemblies; and
   a latch mechanism configured to releasably secure the housing subassembly to the panel, the latch mechanism comprising a handle member and a latch member slidably coupled to the housing subassembly, the latch member comprising at least one outwardly biased tab positioned to be received inside one of the openings of the panel, the handle member being coupled to the latch member and operable to retract the outwardly biased tab when the handle member is pulled in an unlatch direction.

10. The device of claim 9, wherein the at least one outwardly biased tab comprises a first tab and a second tab, the first and second tabs being biased outwardly away from one another,
    the handle member comprises first and second apertures each having a tapered surface, the tapered surfaces being closer together at one end than at the other,
    the latch member comprises a first projection spaced apart from the first tab, the first projection being positioned inside the first aperture of the handle member to slide along the tapered surface of the first aperture,
    the latch member comprises a second projection spaced apart from the second tab, the second projection being positioned inside the second aperture of the handle member to slide along the tapered surface of the second aperture, and
    moving the handle member in a selected direction relative to the housing subassembly slides the tapered surface of the first aperture along the first projection and slides the tapered surface of the second aperture along the second projection pushing the first and second projections toward one another to thereby pull the first and second tabs toward one another.

11. The device of claim 10, wherein the housing subassembly comprises a first guide projection and a second guide projection,
the latch member comprises a first end portion having an aperture configured to receive and slide along the first guide projection, the first tab being positioned on the first end portion, and
the latch member comprises a second end portion having an aperture configured to receive and slide along the second guide projection, the second tab being positioned on the second end portion.

12. The device of claim 9, wherein the housing subassembly comprises an electrically conductive projection positioned between adjacent ones of the plurality of outlet assemblies.

13. A cassette mountable in a patch panel to receive a plurality of fiber optic connectors, the cassette comprising:
a plurality of outlet assemblies each having an opening configured to receive one of the fiber optic connectors;
a housing subassembly housing the plurality of outlet assemblies;
a connector member rotatably coupled to the housing subassembly; and
a cable connector coupled to the connector member and rotatable therewith as a unit, the connector member being rotatable to determine an angle of the cable connector relative to the panel.

14. The cassette of claim 13, wherein the connector member is rotatable to position the cable connector orthogonal to the panel.

15. The cassette of claim 13, wherein the cable connector is a multiple fiber push-on/pull-off connector.

16. The cassette of claim 13 for use with the panel comprising a plurality of openings, the cassette further comprising:
a latch mechanism configured to releasably secure the housing subassembly to the panel, the latch mechanism comprising a handle member and a latch member slidably coupled to the housing subassembly, the latch member comprising at least one outwardly biased tab positioned to be received inside one of the openings of the panel, the handle member being coupled to the latch member and operable to retract the outwardly biased tab when the handle member is pulled in an unlatch direction.

17. The cassette of claim 16, wherein the at least one outwardly biased tab comprises a first tab and a second tab, the first and second tabs being biased outwardly away from one another,
the handle member comprises first and second apertures each having a tapered surface, the tapered surfaces being closer together at one end than at the other,
the latch member comprises a first projection spaced apart from the first tab, the first projection being positioned inside the first aperture of the handle member to slide along the tapered surface of the first aperture,
the latch member comprises a second projection spaced apart from the second tab, the second projection being positioned inside the second aperture of the handle member to slide along the tapered surface of the second aperture, and
moving the handle member in a selected direction relative to the housing subassembly slides the tapered surface of the first aperture along the first projection and slides the tapered surface of the second aperture along the second projection pushing the first and second projections toward one another to thereby pull the first and second tabs toward one another.

18. The cassette of claim 13, wherein the housing subassembly comprises an upper housing member having a downwardly opening channel and a lower housing member having an upwardly opening channel juxtaposed with the downwardly opening channel of the upper housing member, and
the connector member is positioned in both the downwardly opening channel and the upwardly opening channel and slides therein to position the cable connector.

19. The cassette of claim 18, wherein the connector member comprises a flexible finger positioned within at least one of the downwardly opening channel and the upwardly opening channel,
the finger comprises a outwardly extending projection, and
at least one of the downwardly opening channel and the upwardly opening channel comprising depressions configured to at least partially receive the outwardly extending projection of the finger to thereby help maintain the connector member in a selected position relative to the housing subassembly.

20. The cassette of claim 13 for use with the panel comprising a plurality of openings, the cassette further comprising:
a latch mechanism configured to releasably secure the housing subassembly to the panel, the latch mechanism comprising a handle member and a latch member slidably coupled to the housing subassembly, the latch member comprising at least one tab biased to be receivable inside a corresponding one of the openings of the panel, the handle member being coupled to the latch member and operable to overcome the biasing and remove the at least one tab from the corresponding opening of the panel when the handle member is pulled in an unlatch direction.

* * * * *